(12) United States Patent
Arrouye et al.

(10) Patent No.: US 8,060,514 B2
(45) Date of Patent: Nov. 15, 2011

(54) METHODS AND SYSTEMS FOR MANAGING COMPOSITE DATA FILES

(75) Inventors: Yan Arrouye, Mountain View, CA (US); Dominic Giampaolo, Mountian View, CA (US)

(73) Assignee: Apple Inc., Cupertino, CA (US)

( * ) Notice: Subject to any disclaimer, the term of this patent is extended or adjusted under 35 U.S.C. 154(b) by 612 days.

(21) Appl. No.: 11/499,128

(22) Filed: Aug. 4, 2006

(65) Prior Publication Data

US 2008/0040359 A1 Feb. 14, 2008

(51) Int. Cl.
*G06F 7/00* (2006.01)

(52) U.S. Cl. ........ 707/741; 707/711; 707/758; 709/201; 715/210

(58) Field of Classification Search ................. 707/711, 707/741, 758; 709/201; 715/200
See application file for complete search history.

(56) References Cited

U.S. PATENT DOCUMENTS

| | | | |
|---|---|---|---|
| 6,523,046 B2 * | 2/2003 | Liu et al. ................. 707/104.1 |
| 6,785,688 B2 * | 8/2004 | Abajian et al. ................. 707/102 |
| 7,685,083 B2 * | 3/2010 | Fairweather ................. 706/45 |
| 2003/0140035 A1 * | 7/2003 | Burrows ................. 707/3 |
| 2005/0228787 A1 * | 10/2005 | Linden et al. ................. 707/3 |
| 2005/0289133 A1 * | 12/2005 | Arrouye et al. ................. 707/4 |
| 2007/0174852 A1 * | 7/2007 | Smirnov et al. ................. 719/328 |

* cited by examiner

*Primary Examiner* — Wilson Lee
*Assistant Examiner* — Tuan-Khanh Phan
(74) *Attorney, Agent, or Firm* — Blakely, Sokoloff, Taylor & Zafman LLP

(57) ABSTRACT

Systems and methods for managing data, such as metadata or non-metadata such as content. In one exemplary method, a composite document is received and it is determined whether the composite document contains at least one subdocument and if it does, the method captures metadata and/or content from the subdocument and stores the captured metadata and/or content for use in future searches (or an immediate search). The metadata and/or content from the composite document is typically combined together with information about the hierarchy of the subdocuments in the document. The type of information in metadata for one type of file differs from the type of information in metadata for another type of file. Other methods are described and data processing systems and machine readable media are also described.

36 Claims, 51 Drawing Sheets

JPEG Image File Metadata — 301

ISO Setting            Image Width

Flash Setting          Image Height f/ Stop                Image Color Space

Camera Brand Information    Bits/Pixel

User Added Keywords    Other Fields...

FIG. 3A

MP3 Music File Metadata — 331

Artist                 Song Play Times

Genre                  Other Fields...

Album

Song names

FIG. 3B

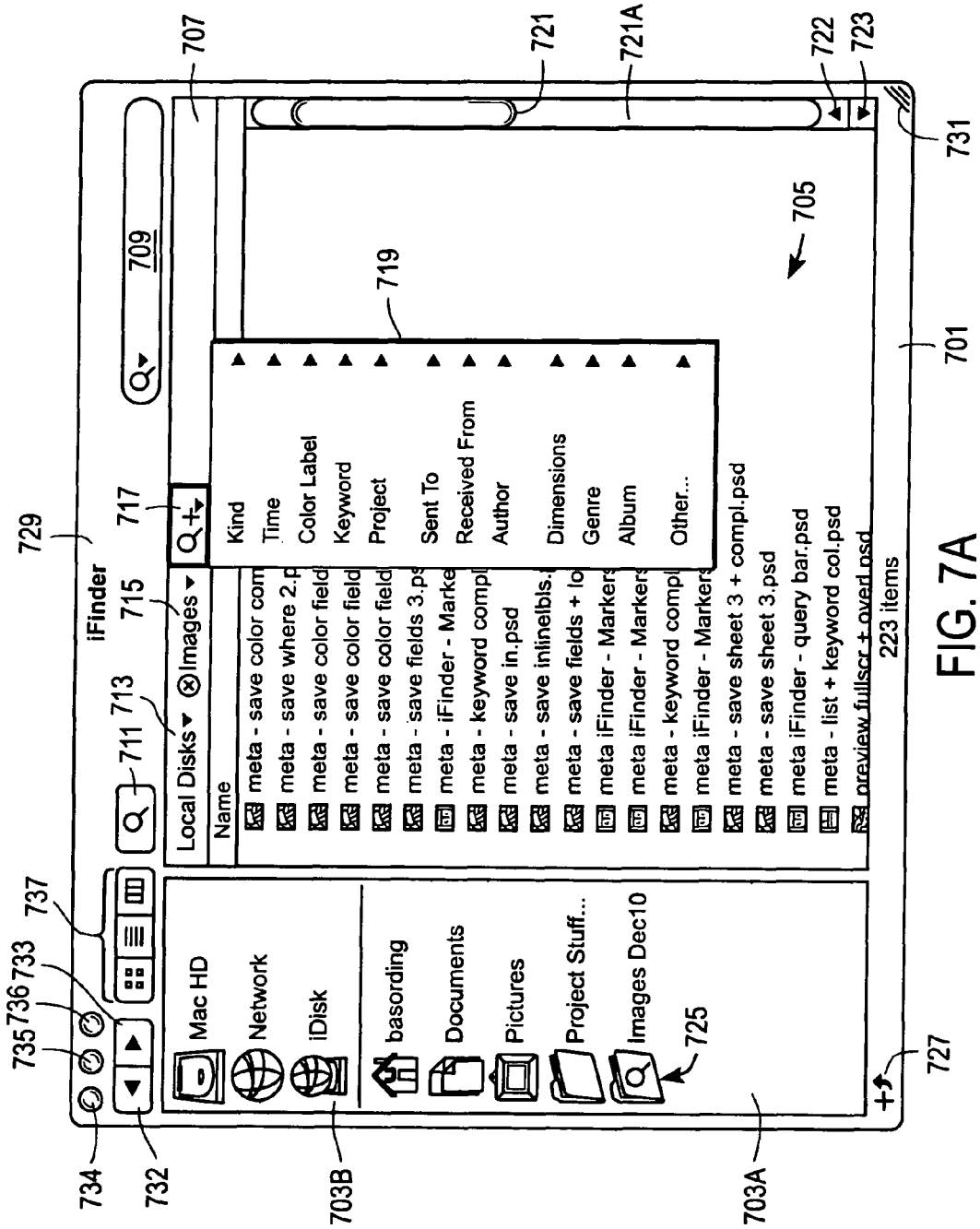

| Name | Parent | Date Modified ▼ | Kind |
|---|---|---|---|
| ▼ Today | | | |
| 📁 FindBrowse | Finder | 2/11/04 | Folder |
| 📄 findBrowse sequence2 | FindBrowse | 2/4/04 | Macromedia Director Movie |
| ▼ Yesterday | | | |
| 📄 findBrowse multi 3.dir | FindBrowse | 2/4/04 | Macromedia Director Movie |
| 📄 FindBrowse.dir | Find Starting Point | 2/2/04 | Macromedia Director Movie |
| 📄 findBrowse.sequence | FindBrowse | 2/2/04 | Macromedia Director Movie |
| 📄 browse by date5 header5 copy.tif | assets | 2/2/04 | Adobe Photoshop TIFF file |
| 📁 findBrowse sequ assets | FindBrowse | 2/2/04 | Folder |
| ▼ before Yesterday | | | |
| 📁 findBrowse assets | FindBrowse | 2/2/04 | Folder |
| 📄 find Browse multi 2.dir | FindBrowse | 2/2/04 | Macromedia Director Movie |
| 📄 find Browse multi 1.dir | FindBrowse | 2/2/04 | Macromedia Director Movie |
| 📄 browse by keyword map + SB2.psd | Finder | 1/12/04 | Adobe Photoshop file |
| 📄 browse by keyword map + SB.psd | Finder | 1/9/04 | Adobe Photoshop file |
| ▼ over a Week ago | | | |
| 📄 Browse by keyword map.psd | Finder | 12/17/03 | Adobe Photoshop file |
| 📄 Browse by date5 + info2.psd | Finder | 12/15/03 | Adobe Photoshop file |
| 📄 Browse by folder + info.psd | Finder | 12/15/03 | Adobe Photoshop file |
| 📄 Browse by date5 + info.psd | Finder | 12/12/03 | Adobe Photoshop file |
| 📄 Browse by date5 + actions2.psd | Finder | 12/12/03 | Adobe Photoshop file |
| 📄 Browse by date5 + actions.psd | Finder | 12/11/03 | Adobe Photoshop file |
| 📄 Browse by date5 header5.psd | Finder | 12/10/03 | Adobe Photoshop file |
| 📄 Browse by date5 header4.psd | Finder | 12/10/03 | Adobe Photoshop file |
| 📄 Browse by date5 header3.psd | Finder | 12/10/03 | Adobe Photoshop file |
| 📄 Browse by date5 header2.psd | Finder | 12/10/03 | Adobe Photoshop file |
| 📄 Browse by date5 header.psd | Finder | 12/10/03 | Adobe Photoshop file |
| 📄 Browse by date5.psd | Finder | 12/10/03 | Adobe Photoshop file |
| 📄 Browse by day4.psd | Finder | 12/10/03 | Adobe Photoshop file |
| 📄 Browse by day3.psd | Finder | 12/10/03 | Adobe Photoshop file |
| 📄 Browse by day2.psd | Finder | 12/9/03 | Adobe Photoshop file |
| 📄 Browse by day.psd | Finder | 12/9/03 | Adobe Photoshop file |

FIG. 8A

| Name | Parent | Date Modified | Kind |
|---|---|---|---|
| Adobe Photoshop file | | | |
| browse by date5 + actions.psd | Finder | 12/12/03 | Adobe Photoshop file |
| browse by date5 + actions2.psd | Finder | 12/12/03 | Adobe Photoshop file |
| browse by date5 + info.psd | Finder | 12/15/03 | Adobe Photoshop file |
| browse by date5 + info2.psd | Finder | 12/15/03 | Adobe Photoshop file |
| browse by date5 + header.psd | Finder | 12/10/03 | Adobe Photoshop file |
| browse by date5 + header2.psd | Finder | 12/10/03 | Adobe Photoshop file |
| browse by date5 + header3.psd | Finder | 12/10/03 | Adobe Photoshop file |
| browse by date5 + header4.psd | Finder | 12/11/03 | Adobe Photoshop file |
| browse by date5 + header5.psd | Finder | 12/10/03 | Adobe Photoshop file |
| browse by date5.psd | Finder | 12/10/03 | Adobe Photoshop file |
| browse by day.psd | Finder | 12/9/03 | Adobe Photoshop file |
| browse by day2.psd | Finder | 12/9/03 | Adobe Photoshop file |
| browse by day3.psd | Finder | 12/10/03 | Adobe Photoshop file |
| browse by day4.psd | Finder | 12/10/03 | Adobe Photoshop file |
| browse by folder + info.psd | Finder | 12/15/03 | Adobe Photoshop file |
| browse by keyword map + SB.psd | Finder | 12/9/04 | Adobe Photoshop file |
| browse by keyword map + SB2.psd | Finder | 12/12/04 | Adobe Photoshop file |
| browse by keyword map.psd | Finder | 12/17/03 | Adobe Photoshop file |
| Adobe Photoshop TIFF file | | | |
| browse by date5 header5 copy.tif | assets | 2/2/04 | Adobe Photoshop TIFF file |
| Folder | | | |
| FindBrowse | Finder | 2/11/04 | Folder |
| findBrowse assets | FindBrowse | 2/2/04 | Folder |
| findBrowse sequ asets | FindBrowse | 2/2/04 | Folder |
| Macromedia Director Movie | | | |
| find browse multi 1.dir | FindBrowse | 2/2/04 | Macromedia Director Movie |
| find browse multi 2.dir | FindBrowse | 2/2/04 | Macromedia Director Movie |
| find browse multi 3.dir | FindBrowse | 2/4/04 | Macromedia Director Movie |
| findBrowse sequence | FindBrowse | 2/2/04 | Macromedia Director Movie |
| findBrowse sequence2 | FindBrowse | 2/4/04 | Macromedia Director Movie |
| FindBrowse.dir | Find Starting Point | 2/2/04 | Macromedia Director Movie |

Spotlight: forstall

524 Results — forstall

Contacts — 1973

| | | |
|---|---|---|
| Freya Forstall | Today | 3:30 pm |
| Molly Forstall | Today | 2:57 pm |
| Nils Forstall | Yesterday | 4:30 pm |
| Scott Forstall | Tuesday | 2:23 pm |
| Olaf Forstall | June 15 | 1:47 pm |

Documents — 1975

| | | |
|---|---|---|
| The Forstall Report | Today | 8:07 am |
| Scott Forstall Speech Transcript | Today | 8:05 am |
| Budget 2004 | Today | 8:03 am |
| Meeting Notes | Yesterday | 3:55 pm |
| Product Rollout 2004 | Yesterday | 2:34 pm |

102 more...

iCal Events — 1977

| | | |
|---|---|---|
| Rock Climbing Competition | Today | 8:00 am |
| Freya Forstall's Birthday | Monday | 3:30 pm |
| User Experience meeting | June 1 | 2:58 pm |
| SF Film Festival (Finding Forstall) | April 24 | 7:00 pm |
| Nils Forstall Graduation | April 23 | 4:00 pm |

344 more...

Mail Messages — 1979

| | | | |
|---|---|---|---|
| Scott Forstall | Ready for the conference? | Today | 9:30 am |
| Olaf Forstall | Madonna tickets on sale! | Today | 9:25 am |
| Molly Forstall | Next week's Dinner Party | Yesterday | 2:13 pm |
| Scott Forstall | You've got to see this... | Yesterday | 5:56 pm |
| Jimmie Page | Playing Forstall's house tonight | June 24 | 11:07 pm |

56 more...

Group By: — 1905
Category
Kind
Date
People
Flat List

Sort Within Group by: — 1907
Name
Date
Kind
People
Popularity

When: — 1972
Any Date
Today
Since Yesterday
This Week
This Month
This Year

Where:
Everywhere
Home
My Hard Drive
Firewire Hard Drive
iPod

METHODS AND SYSTEMS FOR MANAGING COMPOSITE DATA FILES

BACKGROUND OF THE INVENTION

Modern data processing systems, such as general purpose computer systems, allow the users of such systems to create composite data files which include a variety of different types of data formats. The information often has a composite nature, and the modern computer system allows the integration of these components into a composite data file. For example, a typical document contains text, generated from a text editing program or a word processing program such as Microsoft Word, and may also contain images, generated from an image processing program such as Adobe's PhotoShop program. The document can also contain an embedded document, thus creating an arbitrarily deep hierarchy of data storage. Other examples include a drawing or CAD document containing text objects, a video project containing multiple audio and video clips, an audio/video clip containing information about persons such as the copyright holders, an archive document containing multiple documents, which themselves may be composite documents and multiple directories, which contain multiple documents. In addition, there are numerous other types of files and formats that are capable of being created or modified, edited, and otherwise used for a typical data processing system. The arbitrarily deep level of information storage within a document can present a challenge to a typical user who is seeking to find particular information.

Modern data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file, and even the file content. However, this search capability searches through information only at the top level and for a particular type. Thus, for example, the searchable data for a Microsoft Word file is the text contained in the document, or other related data such as the file name, the type of file, the date of creation, the date of last modification, the size of the file and certain other parameters which may be maintained for the file by the file management system. The searchable data do not include information about embedded files such as a drawing or a image file in the Microsoft Word file.

Further, certain presently existing application programs allow a user to maintain data about a particular file. This data about a particular file may be considered metadata because it is data about other data. This metadata for a particular file may include information about the author of a file, a summary of the document, and various other types of information. A program such as Microsoft Word may automatically create some of this data when a user creates a file and the user may add additional data or edit the data by selecting the "property sheet" from a menu selection in Microsoft Word. The property sheets in Microsoft Word allow a user to create metadata for a particular file or document. However, in existing systems, a user is not able to search for information deep within the document using one search request from the user. Furthermore, existing systems can perform one search for data files, but this search does not also include searching through metadata for those files.

SUMMARY OF THE DESCRIPTION

Methods for managing data in a data processing system and systems for managing data are described herein.

A method of managing data in one exemplary embodiment includes capturing metadata and/or content from a composite document successively to all levels (or at least a plurality of levels) of subdocuments within the composite document. "Document" should be understood to mean any storable information in some tangible medium and a composite document should be understood to include a document that has at least two parts which are different from each other. A document includes, for example, an item such as a vCard or a web page or a database record, etc. The subdocuments may have different file formats, and can have an arbitrarily deep level of document hierarchy. In one embodiment, the metadata from the subdocuments are captured and stored in a database, such as a metadata database. In another embodiment, the hierarchical information of the composite document is maintained in the metadata database. In another embodiment, the method of capturing metadata of the composite document comprises a recursive process to capture all metadata from the subdocuments within all hierarchical levels (or at least a plurality of levels) of the composite document.

In another exemplary embodiment, a method of managing data includes indexing information from a composite document successively to all levels (or at least a plurality of levels) of subdocuments within the composite document. The indexing process can index through an arbitrarily deep level of document hierarchy and through a variety of different file formats of the subdocuments. In one embodiment, the index from the subdocuments are captured and stored in a database. In another embodiment, the hierarchical information of the composite document is maintained in the index database containing the indexed full content of at least a set of documents on a system. In another embodiment, the method of indexing a composite document comprises a recursive process to capture information from all subdocuments within all hierarchical levels (or at least a plurality of levels) of the composite document.

In one aspect of the invention, the composite metadata and index can be captured selectively. Since not all subdocuments are necessarily interesting or relevant, the present invention data management method, in one exemplary embodiment, includes the ability to exclude portions of a document such as non-relevant or non-interesting information. For example, a company logo or a presentation graphical theme is usually not relevant information, and can be excluded from being captured in metadata or index database. The determination of the relevancy of the information, in an embodiment, can be based on the usage or location of the information on the document or based on selection by a user for a particular document or based on a general preference setting, selected by a user, for a plurality of documents.

Further, the objects (e.g. embedded image, chart, or document) are typically encoded in the parent object or document in proprietary ways, making it impossible for a generic program to extract the embedded information. Thus in one aspect of the invention, the data managing method according to the present invention can invoke appropriate importer plug-ins of other software to read the embedded information and files, and to interpret its structure. After determining that the information in a subdocument is relevant, the subdocuments are classified in standard formats based on their types, which allows them to be imported through an appropriate importer plug-in. In an embodiment, a document is divided into parts which are indexed (e.g. indexed into an inverted index of the full text content of files stored on a system).

Another aspect of the present invention relates to various user interfaces such as search input interfaces and interfaces for the presentation of search results, to allow a user to search through the metadata and index of content. In one embodiment, this search may occur concurrently or hierarchically for all the metadata/index with different levels of the composite documents. For example, the search results may be displayed in multiple different formats with headers to separate the different subdocuments within a document which is shown in a search result, or be limited to a predetermined number for each category. Another user interface feature provides multiple views for different portions of a search results window.

Another aspect of the present invention relates to a software architecture for managing metadata and non-metadata databases such as an indexed database of the full text content of the data files. The maintaining of composite metadata and indexed content allows proper management of the index and the document database with the linkage between a document and its parent and its children. Search queries may be directed concurrently to metadata and non-metadata sources in response to a single search query.

Another aspect of the inventions described herein relates to one or more importers which interact with new or modified files created by different application programs. For example, an importer is called by the application programs or by a metadata processing software in response to a notification from the application programs or from an operating system (OS) kernel that a new file has been created or an existing file has been modified. An importer will typically specify a file path name for the extracted metadata and specify selected data to be extracted and written into the file path name of the file containing the extracted metadata.

Another aspect of the inventions described herein relates to performing a search through a system while receiving input from a user. In an exemplary method of this aspect, the data processing system begins a search through the plurality of data files as the user enters input and before the user completes the entry of the search query. This search may be performed through the plurality of data files as well as the metadata and non-metadata databases, where the metadata includes metadata extracted from subdocuments within a document and the non-metadata database (e.g. an indexed content database containing full text, or other, content of documents) includes non-metadata (e.g. content) extracted from subdocuments. The search results may be sorted by relevancy or organized by categories, and the system may display a partial list of matches with options for displaying additional information.

Other aspects of the present invention include various data processing systems which perform these methods and machine readable media which perform various methods described herein.

BRIEF DESCRIPTION OF THE DRAWINGS

The present invention is illustrated by way of example and not limitation in the figures of the accompanying drawings in which like references indicate similar elements.

FIG. 3A shows an example of the content of the particular type of metadata for a particular type of file.

FIG. 3B shows another example of a particular type of metadata for another particular type of file.

FIGS. 7A-7E show a sequence of graphical user interfaces provided by one exemplary embodiment in order to allow searching of metadata and/or other data in a data processing system.

FIGS. 8A and 8B show two examples of formats for displaying search results according to one exemplary embodiment of the invention.

FIG. 17 shows an aspect of certain embodiments of user interfaces according to the present invention.

FIGS. 19A, 19B, 19C, 19D, and 19E show further illustrative embodiments of user interfaces according to the present invention.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2003.

Figure 1:
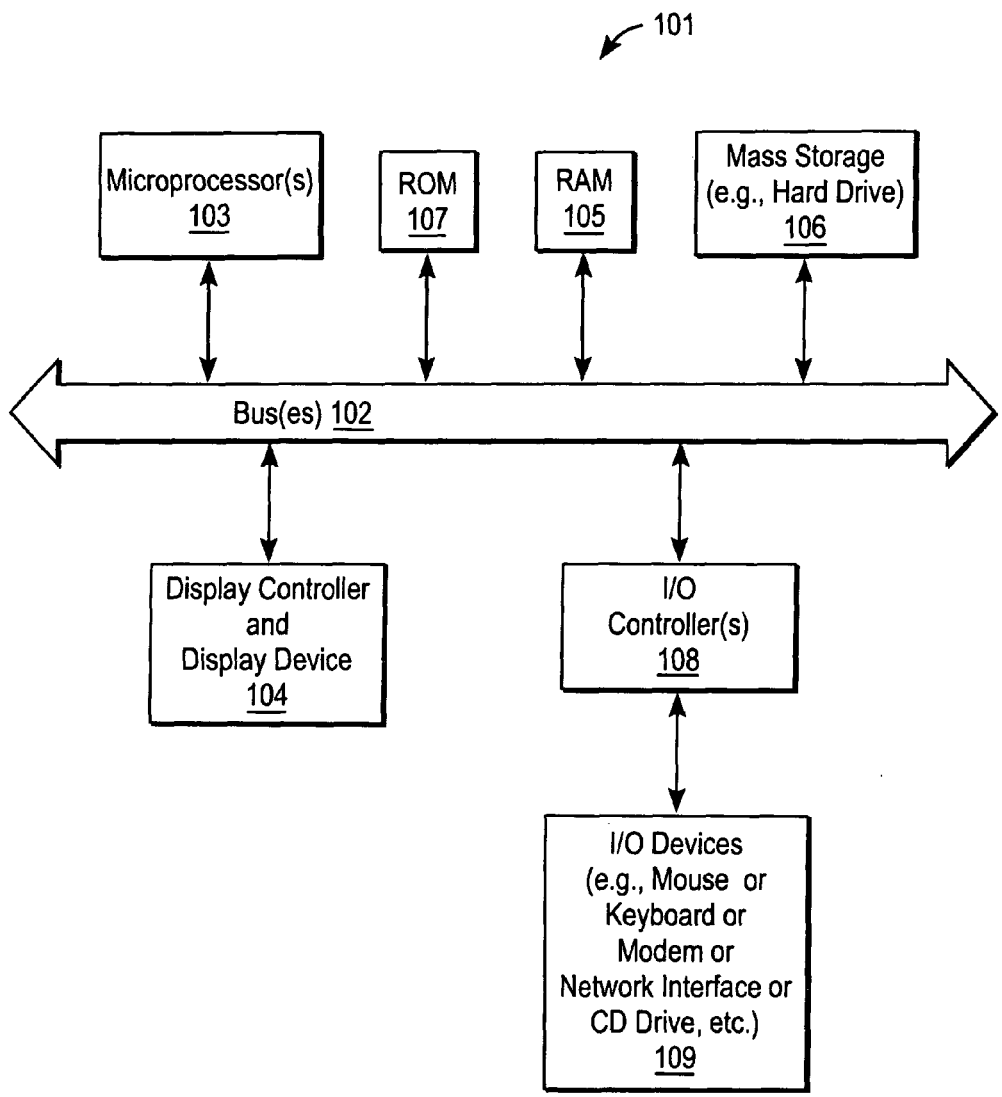
FIG. 1 shows an exemplary embodiment of a data processing system, which may be a general purpose computer system and which may operate in any of the various methods described herein.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that personal digital assistants (PDAs), cellular telephones, media players (e.g. an iPod), devices which combine aspects or functions of these devices (e.g. a media player combined with a PDA and a cellular telephone in one device), an embedded processing device within another device, network computers and other data processing systems which have fewer components or perhaps more components may also be used with or to implement one or more embodiments of the present invention. The computer system of FIG. 1 may, for example, be a Macintosh computer from Apple Computer, Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a microprocessor from Intel or a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Capturing and Use of Metadata Across a Variety of Application Programs

Figure 2:
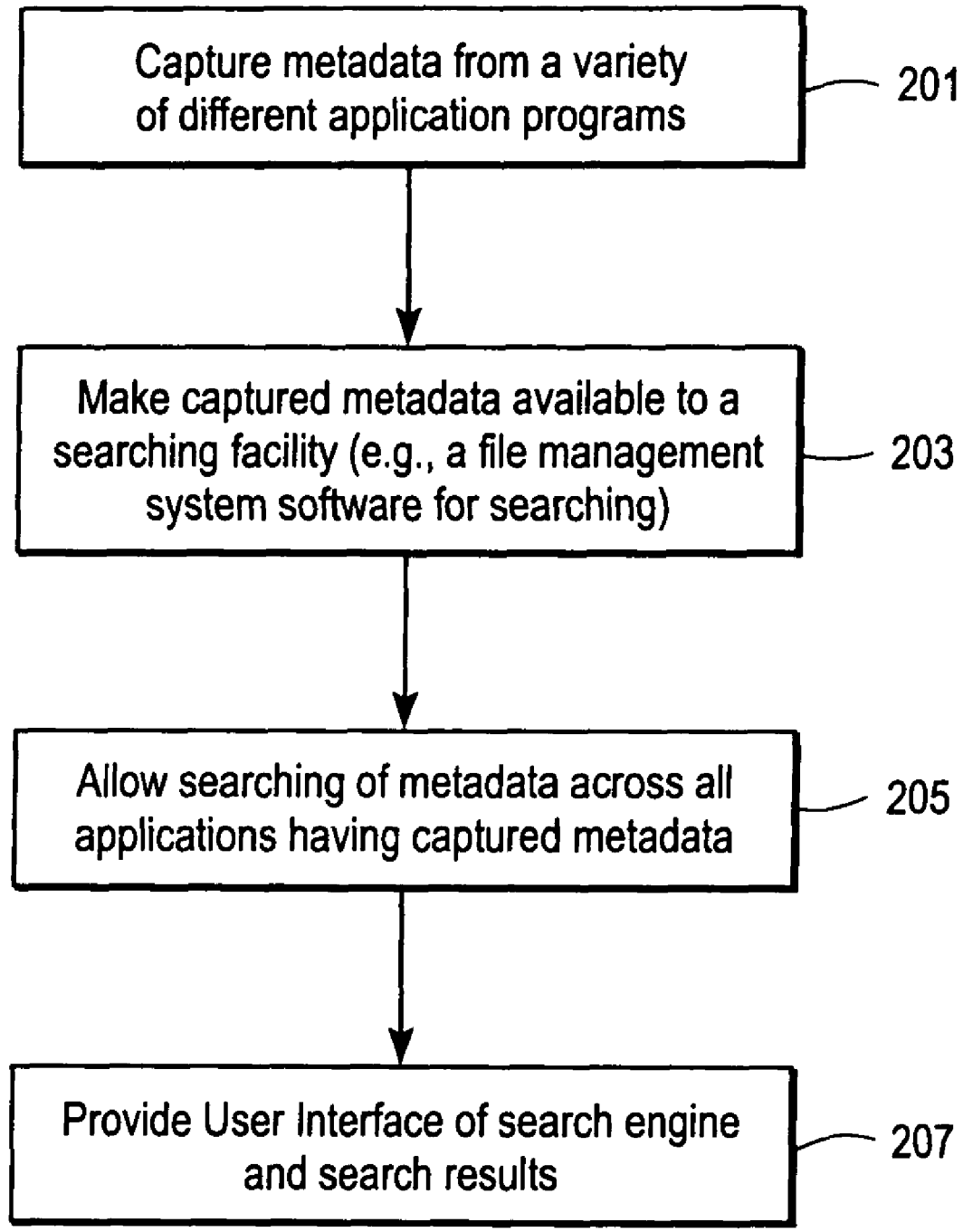
FIG. 2 shows a general example of one exemplary method of one aspect of the invention.
Figure 5:
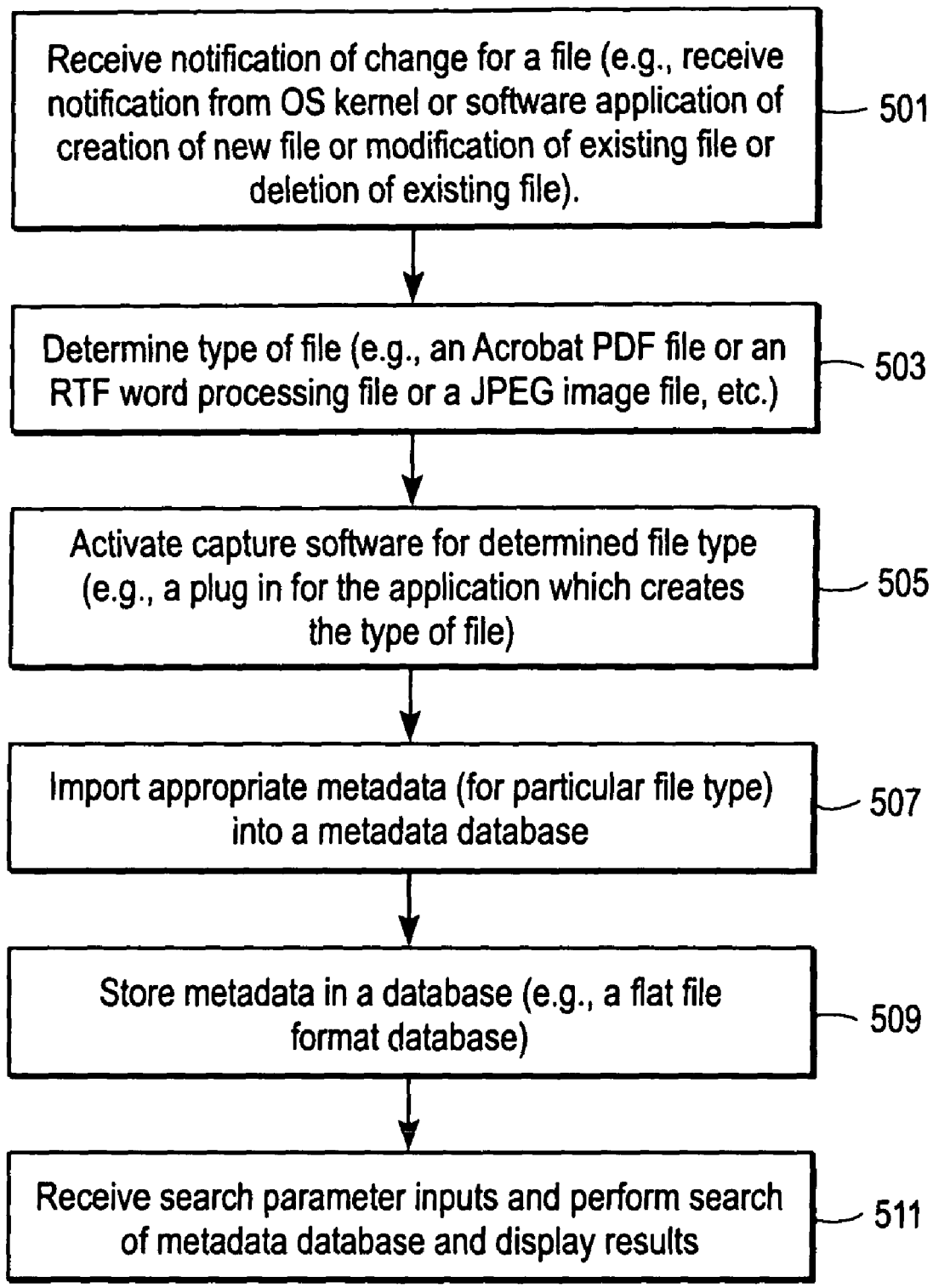
FIG. 5 is a flowchart showing another exemplary method of the present invention.

FIG. 2 shows a generalized example of one embodiment of the present invention. In this example, captured metadata is made available to a searching facility, such as a component of the operating system which allows concurrent searching of all metadata for all applications having captured metadata (and optionally for all non-metadata of the data files). The method of FIG. 2 may begin in operation 201 in which metadata is captured from a variety of different application programs. This captured metadata is then made available in operation 203 to a searching facility, such as a file management system software for searching. This searching facility allows, in operation 205, the searching of metadata across all applications having captured metadata. The method also provides, in operation 207, a user interface of a search engine and the search results which are obtained by the search engine. There are numerous possible implementations of the method of FIG. 2. For example, FIG. 5 shows a specific implementation of one exemplary embodiment of the method of FIG. 2. Alternative implementations may also be used. For example, in an alternative implementation, the metadata may be provided by each application program to a central source which stores the metadata for use by searching facilities and which is managed by an operating system component, which may be, for example, the metadata processing software. The user interface provided in operation 207 may take a variety of different formats, including some of the examples described below as well as user interfaces which are conventional, prior art user interfaces. The metadata may be stored in a database which may be any of a variety of formats including a B tree format or, as described below, in a flat file format according to one embodiment of the invention.

The method of FIG. 2 may be implemented for programs which do not store or provide metadata. In this circumstance, a portion of the operating system provides for the capture of the metadata from the variety of different programs even though the programs have not been designed to provide or capture metadata. For those programs which do allow a user to create metadata for a particular document, certain embodiments of the present invention may allow the exporting back of captured metadata back into data files for applications which maintain metadata about their data files.

Figure 4:
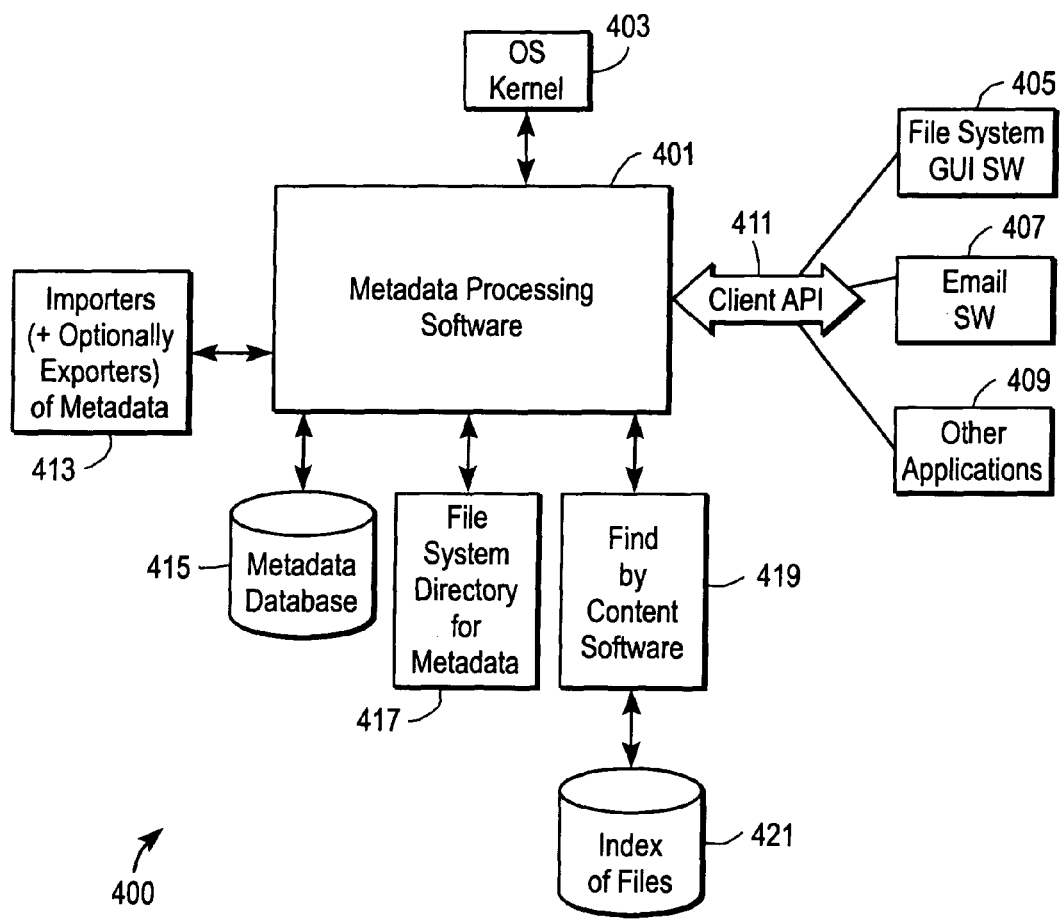
FIG. 4 shows an example of an architecture for managing metadata according to one exemplary embodiment of the invention.

The method of FIG. 2 allows information about a variety of different files created by a variety of different application programs to be accessible by a system wide searching facility, which is similar to the way in which prior art versions of the Finder or Windows Explorer can search for file names, dates of creation, etc. across a variety of different application programs. Thus, the metadata for a variety of different files created by a variety of different application programs can be accessed through an extension of an operating system, and an example of such an extension is shown in FIG. 4 as a metadata processing software which interacts with other components of the system and will be described further below.

FIGS. 3A and 3B show two different metadata formats for two different types of data files. Note that there may be no overlap in any of the fields; in other words, no field in one type of metadata is the same as any field in the other type of metadata. Metadata format 301 may be used for an image file such as a JPEG image file. This metadata may include information such as the image's width, the image's height, the image's color space, the number of bits per pixel, the ISO setting, the flash setting, the F/stop of the camera, the brand name of the camera which took the image, user added keywords and other fields, such as a field which uniquely identifies the particular file, which identification is persistent through modifications of the file. Metadata format 331 shown in FIG. 3B may be used for a music file such as an MP3 music file. The data in this metadata format may include an identification of the artist, the genre of the music, the name of the album, song names in the album or the song name of the particular file, song play times or the song play time of a particular song and other fields, such as a persistent file ID number which identifies the particular MP3 file from which the metadata was captured. Other types of fields may also be used. The following chart shows examples of the various fields which may be used in metadata for various types of files.

One particular field which may be useful in the various metadata formats would be a field which includes an identifier of a plug-in or other software element which may be used to capture metadata from a data file and/or export metadata back to the creator application.

Various different software architectures may be used to implement the functions and operations described herein. The following discussion provides one example of such an architecture, but it will be understood that alternative architectures may also be employed to achieve the same or similar results. The software architecture shown in FIG. 4 is an example which is based upon the Macintosh operating system. The architecture 400 includes a metadata processing software 401 and an operating system (OS) kernel 403 which is operatively coupled to the metadata processing software 401 for a notification mechanism which is described below. The metadata processing software 401 is also coupled to other software programs such as a file system graphical user interface software 405 (which may be the Finder), an email software 407, and other applications 409. These applications are coupled to the metadata processing software 401 through client application program interface 411 which provide a method for transferring data and commands between the metadata processing software 401 and the software 405, 407, and 409. These commands and data may include search parameters specified by a user as well as commands to perform searches from the user, which parameters and commands are passed to the metadata processing software 401 through the interface 411. The metadata processing software 401 is also coupled to a collection of importers 413 which extract data from various applications. In particular, in one exemplary embodiment, a text importer is used to extract text and other information from word processing or text processing files created by word processing programs such as Microsoft Word, etc. This extracted information is the metadata for a particular file. Other types of importers extract metadata from other types of files, such as image files or music files. In this particular embodiment, a particular importer is selected based upon the type of file which has been created and modified by an application program. For example, if the data file was created by PhotoShop, then an image importer for PhotoShop may be used to input the metadata from a PhotoShop data file into the metadata database 415 through the metadata processing software 401. On the other hand, if the data file is a word processing document, then an importer designed to extract metadata from a word processing document is called upon to extract the metadata from the word processing data file and place it into the metadata database 415 through the metadata processing software 401. Typically, a plurality of different importers may be required in order to handle the plurality of different application programs which are used in a typical computer system. The importers 413 may optionally include a plurality of exporters which are capable of exporting the extracted metadata for particular types of data files back to property sheets or other data components maintained by certain application programs. For example, certain application programs may maintain some metadata for each data file created by the program, but this metadata is only a subset of the metadata extracted by an importer from this type of data file. In this instance, the exporter may export back additional metadata or may simply insert metadata into blank fields of metadata maintained by the application program.

The software architecture 400 also includes a file system directory 417 for the metadata. This file system directory keeps track of the relationship between the data files and their metadata and keeps track of the location of the metadata object (e.g. a metadata file which corresponds to the data file from which it was extracted) created by each importer. In one exemplary embodiment, the metadata database is maintained as a flat file format as described below, and the file system directory 417 maintains this flat file format. One advantage of a flat file format is that the data is laid out on a storage device as a string of data without references between fields from one metadata file (corresponding to a particular data file) to another metadata file (corresponding to another data file). This arrangement of data will often result in faster retrieval of information from the metadata database 415.

The software architecture 400 of FIG. 4 also includes find by content software 419 which is operatively coupled to a database 421 which includes an index of files. The index of files represents at least a subset of the data files in a storage device and may include all of the data files in a particular storage device (or several storage devices), such as the main hard drive of a computer system. The index of files may be a conventional indexed representation of the content of each document. The find by content software 419 searches for words in that content by searching through the database 421 to see if a particular word exists in any of the data files which have been indexed. The find by content software functionality is available through the metadata processing software 401 which provides the advantage to the user that the user can search concurrently both the index of files in the database 421 (for the content within a file) as well as the metadata for the various data files being searched. The software architecture shown in FIG. 4 may be used to perform the method shown in FIG. 5 or alternative architectures may be used to perform the method of FIG. 5.

The method of FIG. 5 may begin in operation 501 in which a notification of a change for a file is received. This notification may come from the OS kernel 403 which notifies the metadata processing software 401 that a file has been changed. This notification may come from sniffer software elements which detect new or modified files and deletion of files. This change may be the creation of a new file or the modification of an existing file or the deletion of an existing file. The deletion of an existing file causes a special case of the processing method of FIG. 5 and is not shown in FIG. 5. In the case of a deletion, the metadata processing software 401, through the use of the file system directory 417, deletes the metadata file in the metadata database 415 which corresponds to the deleted file. The other types of operations, such as the creation of a new file or the modification of an existing file, causes the processing to proceed from operation 501 to operation 503 in which the type of file which is the subject of the notification is determined. The file may be an Acrobat PDF file or an RTF word processing file or a JPEG image file, etc. In any case, the type of the file is determined in operation 503. This may be performed by receiving from the OS kernel 403 the type of file along with the notification or the metadata processing software 401 may request an identification of the type of file from the file system graphical user interface software 405 or similar software which maintains information about the data file, such as the creator application or parent application of the data file. It will be understood that in one exemplary embodiment, the file system graphical user interface software 405 is the Finder program which operates on the Macintosh operating system. In alternative embodiments, the file system graphical user interface system may be Windows Explorer which operates on Microsoft's Windows operating system. After the type of file has been determined in operation 503, the appropriate capture software (e.g. one of the importers 413) is activated for the determined file type. The importers may be a plug-in for the particular application which created the type of file about which notification is received in operation 501. Once activated, the importer or capture software imports the appropriate metadata (for the particular file type) into the metadata database, such as metadata database 415 as shown in operation 507. Then in operation 509, the metadata is stored in the database. In one exemplary embodiment, it may be stored in a flat file format. Then in operation 511, the metadata processing software 401 receives search parameter inputs and performs a search of the metadata database (and optionally also causes a search of non-metadata sources such as the index of files 421) and causes the results of the search to be displayed in a user interface. This may be performed by exchanging information between one of the applications, such as the software 405 or the software 407 or the other applications 409 and the metadata processing software 401 through the interface 411. For example, the file system software 405 may present a graphical user interface, allowing a user to input search parameters and allowing the user to cause a search to be performed. This information is conveyed through the interface 411 to the metadata processing software 401 which causes a search through the metadata database 415 and also may cause a search through the database 421 of the indexed files in order to search for content within each data file which has been indexed. The results from these searches are provided by the metadata processing software 401 to the requesting application which, in the example given here, was the software 405, but it will be appreciated that other components of software, such as the email software 407, may be used to receive the search inputs and to provide a display of the search results. Various examples of the user interface for inputting search requests and for displaying search results are described herein and shown in the accompanying drawings.

It will be appreciated that the notification, if done through the OS kernel, is a global, system wide notification process such that changes to any file will cause a notification to be sent to the metadata processing software. It will also be appreciated that in alternative embodiments, each application program may itself generate the necessary metadata and provide the metadata directly to a metadata database without the requirement of a notification from an operating system kernel or from the intervention of importers, such as the importers 413. Alternatively, rather than using OS kernel notifications, an embodiment may use software calls from each application to a metadata processing software which receives these calls and then imports the metadata from each file in response to the call.

Figure 6:
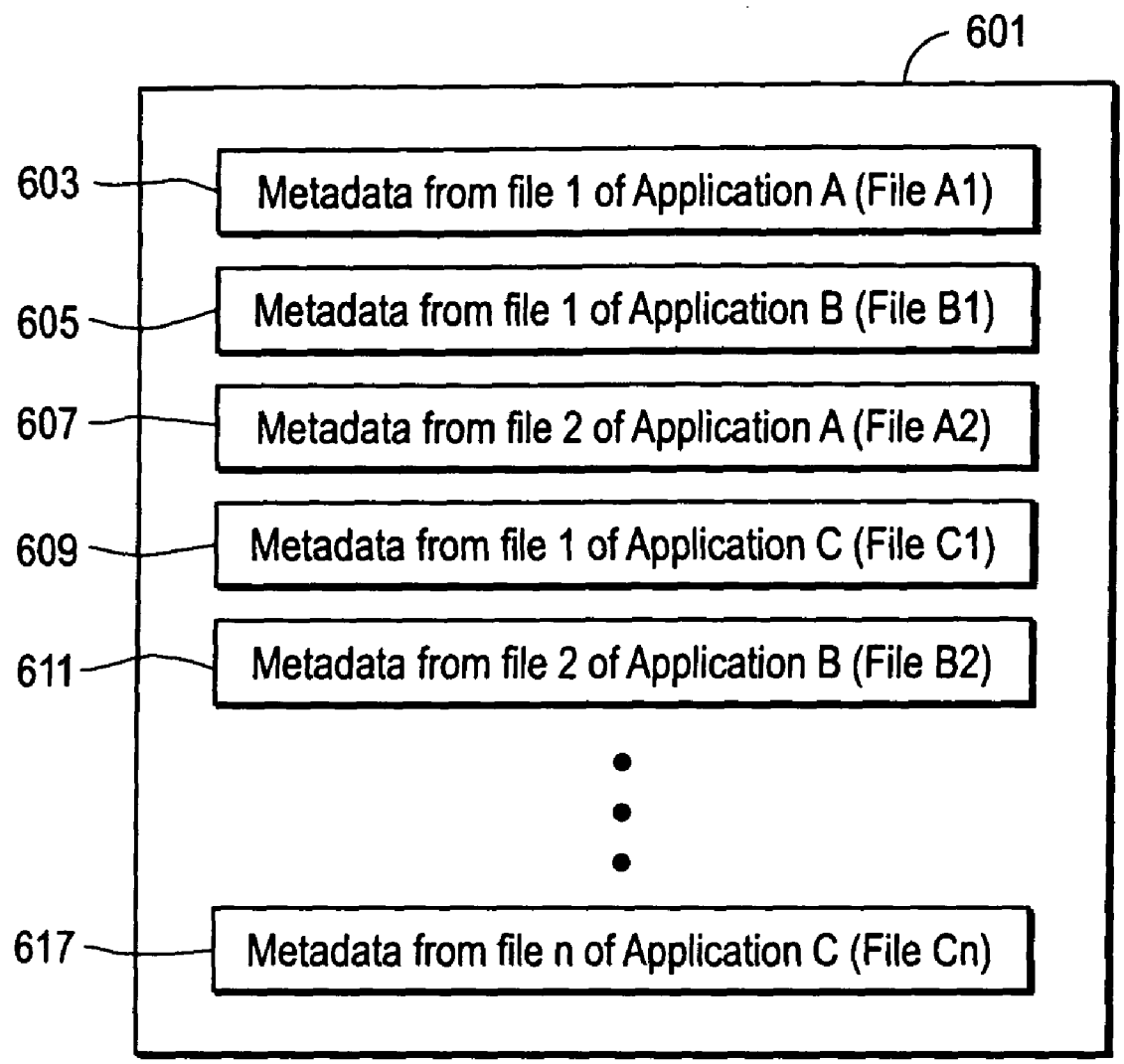
FIG. 6 shows an example of a storage format which utilizes a flat file format for metadata according to one exemplary embodiment of the invention.

As noted above, the metadata database 415 may be stored in a flat file format in order to improve the speed of retrieval of information in most circumstances. The flat file format may be considered to be a non-B tree, non-hash tree format in which data is not attempted to be organized but is rather stored as a stream of data. Each metadata object or metadata file will itself contain fields, such as the fields shown in the examples of FIGS. 3A and 3B. However, there will typically be no relationship or reference or pointer from one field in one metadata file to the corresponding field (or another field) in the next metadata file or in another metadata file of the same file type. FIG. 6 shows an example of the layout in a flat file format of metadata. The format 601 includes a plurality of metadata files for a corresponding plurality of data files. As shown in FIG. 6, metadata file 603 is metadata from file 1 of application A and may be referred to as metadata file A1. Similarly, metadata file 605 is metadata from file 1 of application B and may be referred to as metadata file B1. Each of these metadata files typically would include fields which are not linked to other fields and which do not contain references or pointers to other fields in other metadata files. It can be seen from FIG. 6 that the metadata database of FIG. 6 includes metadata files from a plurality of different applications (applications A, B, and C) and different files created by each of those applications. Metadata files 607, 609, 611, and 617 are additional metadata files created by applications A, B, and C as shown in FIG. 6.

A flexible query language may be used to search the metadata database in the same way that such query languages are used to search other databases. The data within each metadata file may be packed or even compressed if desirable. As noted above, each metadata file, in certain embodiments, will include a persistent identifier which uniquely identifies its corresponding data file. This identifier remains the same even if the name of the file is changed or the file is modified. This allows for the persistent association between the particular data file and its metadata.

User Interface Aspects

Various different examples of user interfaces for inputting search parameters and for displaying search results are provided herein. It will be understood that some features from certain embodiments may be mixed with other embodiments such that hybrid embodiments may result from these combinations. It will be appreciated that certain features may be removed from each of these embodiments and still provide adequate functionality in many instances.

FIG. 7A shows a graphical user interface which is a window which may be displayed on a display device which is coupled to a data processing system such as a computer system. The window 701 includes a side bar having two regions 703A, which is a user-configurable region, and 703B, which is a region which is specified by the data processing system. Further details in connection with these side bar regions may be found in co-pending U.S. patent application Ser. No. 10/873,661 filed Jun. 21, 2004, and entitled "Methods and Apparatuses for Operating a Data Processing System," by inventors Donald Lindsay and Bas Ording. The window 701 also includes a display region 705 which in this case displays the results of searches requested by the user. The window 701 also includes a search parameter menu bar 707 which includes configurable pull down menus 713, 715, and 717. The window 701 also includes a text entry region 709 which allows a user to enter text as part of the search query or search parameters. The button 711 may be a start search button which a user activates in order to start a search based upon the selected search parameters. Alternatively, the system may perform a search as soon as it receives any search parameter inputs or search queries from the user rather than waiting for a command to begin the search. The window 701 also includes a title bar 729 which may be used in conjunction with a cursor control device to move, in a conventional manner, the window around a desktop which is displayed on a display device. The window 701 also includes a close button 734, a minimize button 735, and a resize button 736 which may be used to close or minimize or resize, respectively, the window. The window 701 also includes a resizing control 731 which allows a user to modify the size of the window on a display device. The window 701 further includes a back button 732 and a forward button 733 which function in a manner which is similar to the back and forward buttons on a web browser, such as Internet Explorer or Safari. The window 701 also includes view controls which include three buttons for selecting three different types of views of the content within the display region 705. When the contents found in a search exceed the available display area of a display region 705, scroll controls, such as scroll controls 721, 722, and 723, appear within the window 701. These may be used in a conventional manner, for example, by dragging the scroll bar 721 within the scroll region 721A using conventional graphical user interface techniques.

The combination of text entry region 709 and the search parameter menu bar allow a user to specify a search query or search parameters. Each of the configurable pull down menus presents a user with a list of options to select from when the user activates the pull down menu. As shown in FIG. 7A, the user has already made a selection from the configurable pull down menu 713 to specify the location of the search, which in this case specifies that the search will occur on the local disks of the computer systems. Configurable pull down menu 715 has also been used by the user to specify the kind of document which is to be searched for, which in this case is an image document as indicated by the configurable pull down menu 715 which indicates "images" as the selected configuration of this menu and hence the search parameter which it specifies. The configurable pull down menu 717, as shown in FIG. 7A, represents an add search parameter pull down menu. This add search parameter pull down menu allows the user to add additional criteria to the search query to further limit the search results. In the embodiment shown in FIG. 7A, each of the search parameters is logically ANDed in a Boolean manner. Thus the current search parameter specified by the user in the state shown in FIG. 7A searches all local disks for all images, and the user is in the middle of the process of selecting another search criteria by having selected the add search criteria pull down menu 717, resulting in the display of the pull down menu 719, which has a plurality of options which may be selected by the user.

Figure 7B:
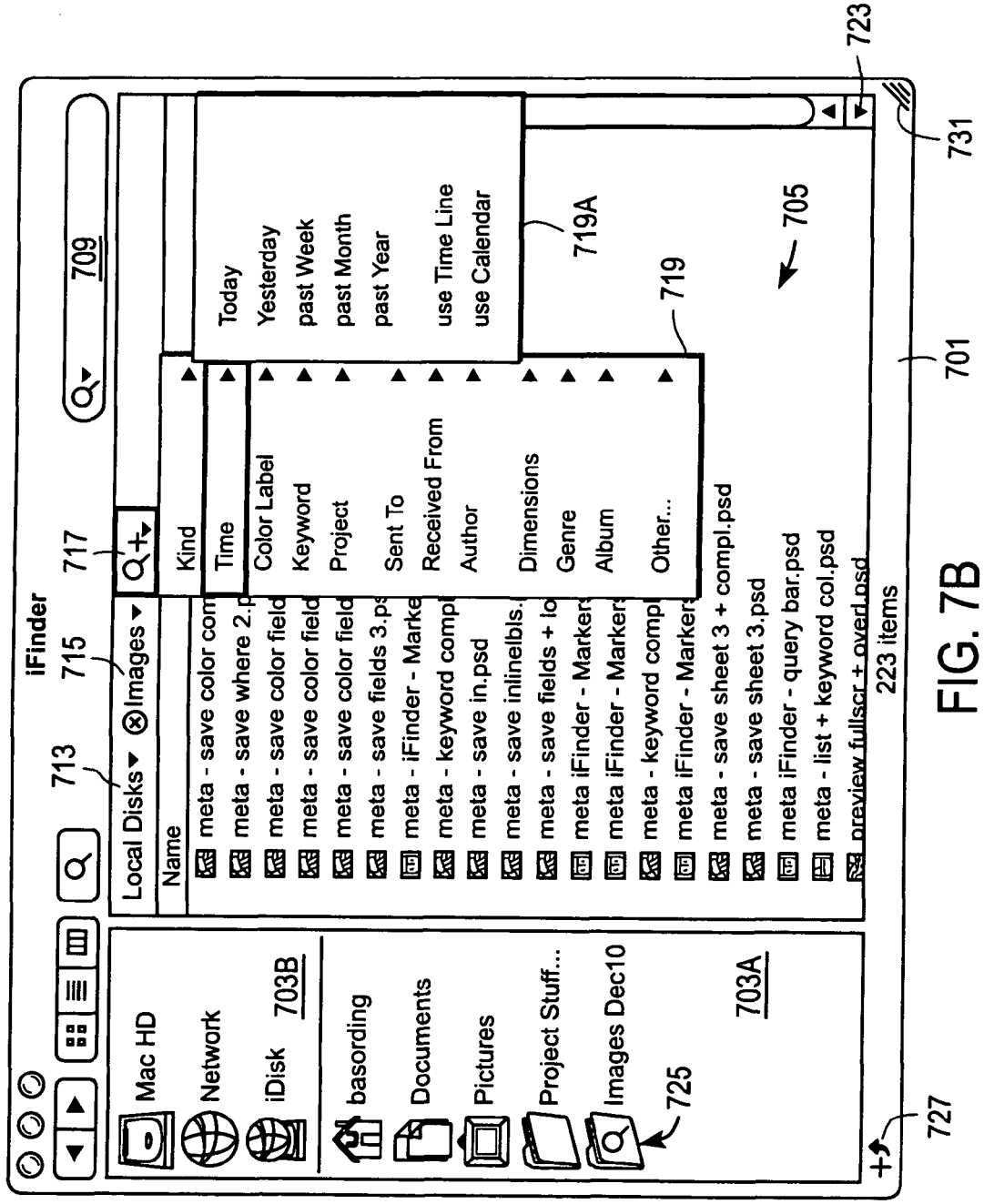

FIG. 7B shows the window 701 after the user has caused the selection of the time option within pull down menu 719, thereby causing the display of a submenu 719A which includes a list of possible times which the user may select from. Thus it appears that the user wants to limit the search to all images on all local disks within a certain period of time which is to be specified by making a selection within the submenu 719A.

Figure 7C:
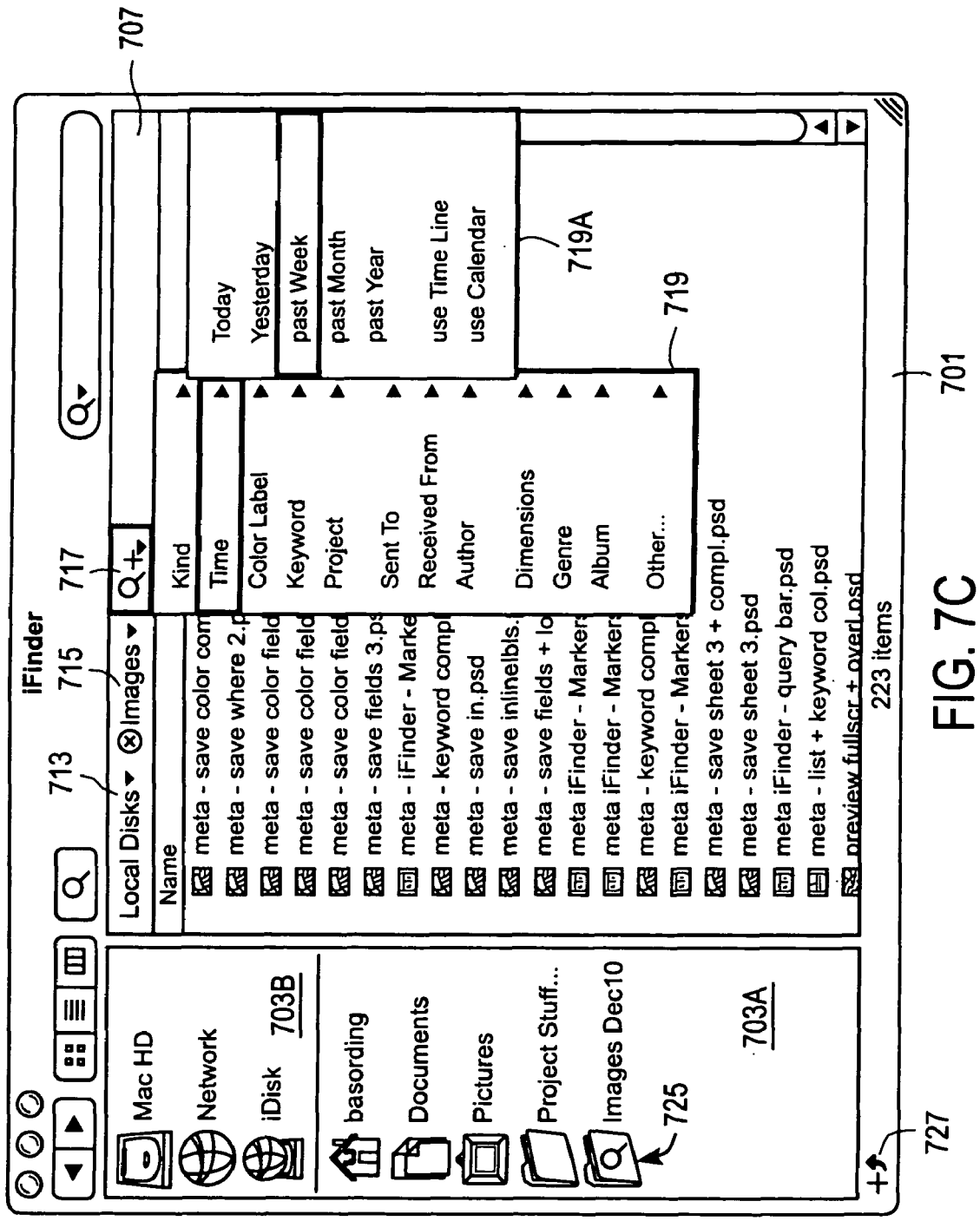
Figure 7D:
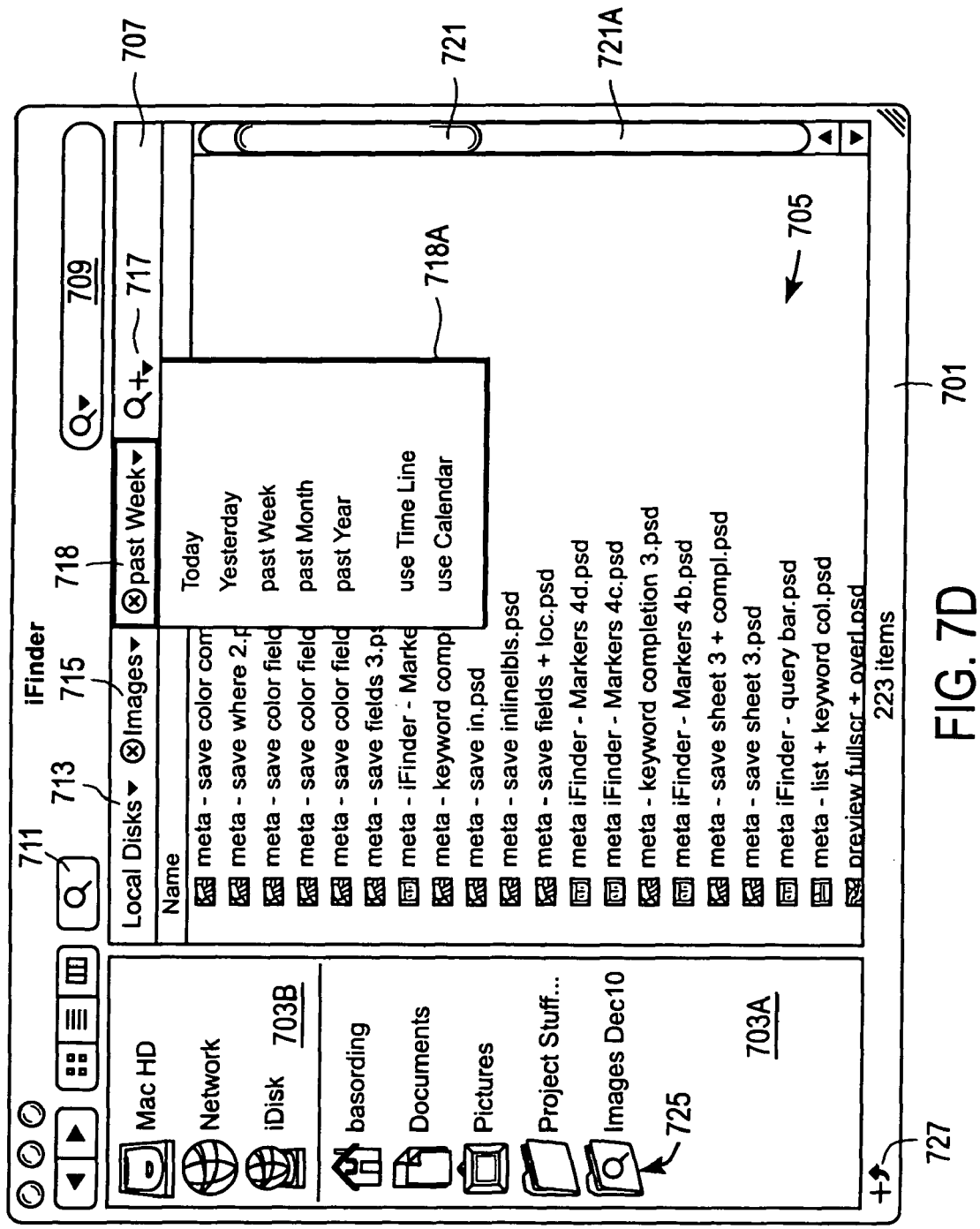
Figure 7E:
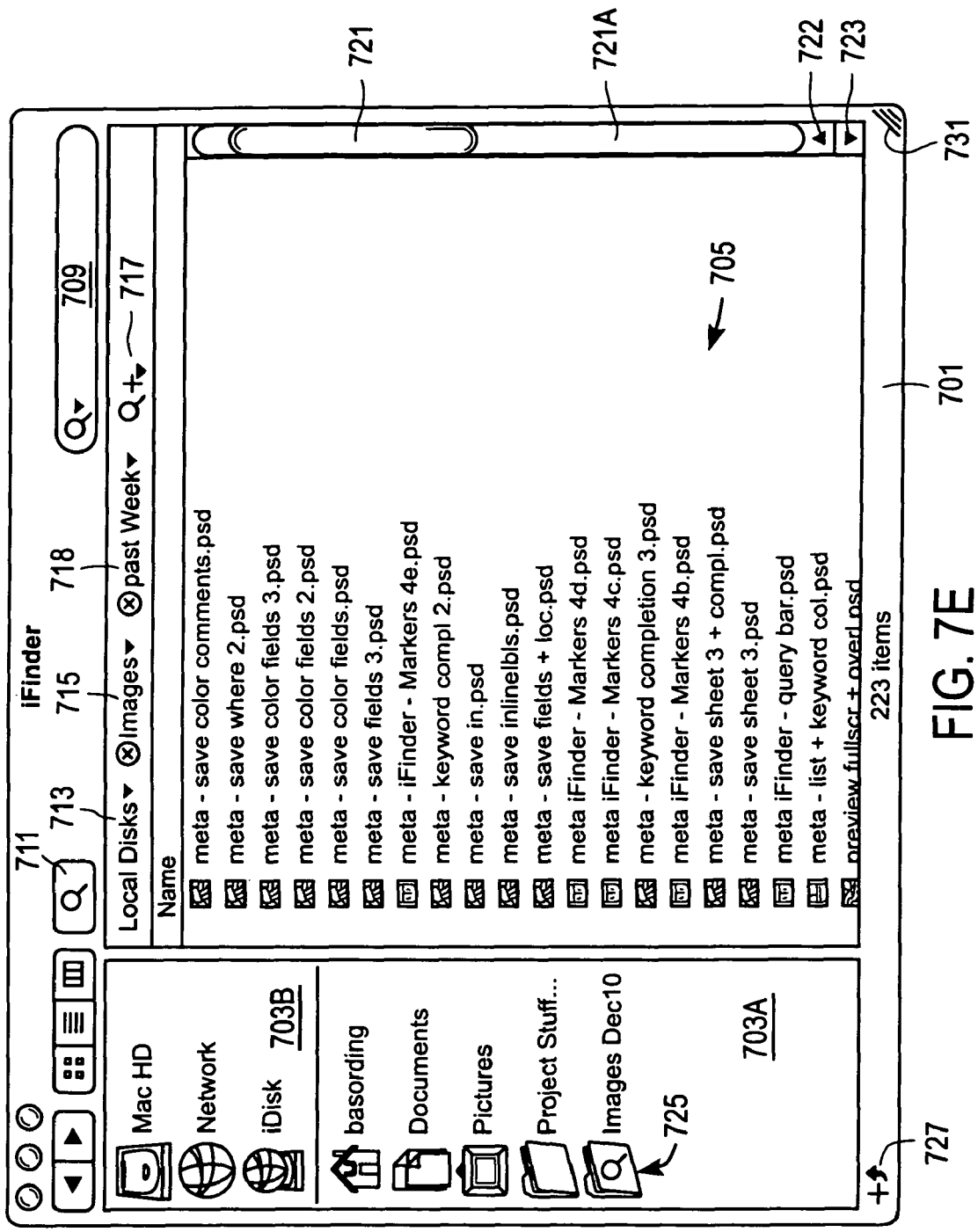

FIG. 7C shows the window 701 on the display of a data processing system after the user has selected a particular option (in this case "past week") from the submenu 719A. If the user accepts this selection, then the display shown in FIG. 7D results in which the configurable pull down menu 718 is displayed showing that the user has selected as part of the search criteria files that have been created or modified in the past week. It can be seen from FIG. 7D that the user can change the particular time selected from this pull down menu 718 by selecting another time period within the pull down menu 718A shown in FIG. 7D. Note that the configurable pull down menu 717, which represents an add search parameter menu, has now moved to the right of the configurable pull down menu 718. The user may add further search parameters by pressing or otherwise activating the configurable pull down menu 717 from the search parameter menu bar 707. If the user decides that the past week is the proper search criteria in the time category, then the user may release the pull down menu 718A from being displayed in a variety of different ways (e.g. the user may release the mouse button which was being depressed to keep the pull down menu 718A on the display). Upon releasing or otherwise dismissing the pull down menu 718A, the resulting window 701 shown in FIG. 7E then appears. There are several aspects of this user interface shown in FIG. 7A-7E which are worthy of being noted. The search parameters or search query is specified within the same window as the display of the search results. This allows the user to look at a single location or window to understand the search parameters and how they affected the displayed search results, and may make it easier for a user to alter or improve the search parameters in order to find one or more files. The configurable pull down menus, such as the add search parameter pull down menu, includes hierarchical pull down menus. An example of this is shown in FIG. 7B in which the selection of the time criteria from the pull down menu 717 results in the display of another menu, in this case a submenu 719A which may be selected from by the user. This allows for a compact presentation of the various search parameters while keeping the initial complexity (e.g. without submenus being displayed) at a lower level. Another useful aspect of the user interface shown in FIG. 7A-7E is the ability to reconfigure pull down menus which have previously been configured. Thus, for example, the configurable pull down menu 713 currently specifies the location of the search (in this case, all local disks), however, this may be modified by selecting the pull down region associated with the configurable pull down menu 713, causing the display of a menu of options indicating alternative locations which may be selected by the user. This can also be seen in FIG. 7D in which the past week option has been selected by the user (as indicated by "past week" being in the search parameter menu bar 707), but a menu of options shown in the pull down menu 718A allows the user to change the selected time from the "past week" to some other time criteria. Another useful aspect of this user interface is the ability to continue adding various search criteria by using the add search criteria pull down menu 717 and selecting a new criteria.

It will also be appreciated that the various options in the pull down menus may depend upon the fields within a particular type of metadata file. For example, the selection of "images" to be searched may cause the various fields present in the metadata for an image type file to appear in one or more pull down menus, allowing the user to search within one or more of those fields for that particular type of file. Other fields which do not apply to "images" types of files may not appear in these menus in order reduce the complexity of the menus and to prevent user confusion.

Another feature of the present invention is shown in FIGS. 7A-7E. In particular, the side bar region 703A, which is the user-configurable portion of the side bar, includes a representation of a folder 725 which represents the search results obtained from a particular search, which search results may be static or they may be dynamic in that, in certain instances, the search can be performed again to obtain results based on the current files in the system. The folder 725 in the example shown in FIGS. 7A-7E represents a search on a local disk for all images done on December 10th. By selecting this folder in the side bar region 703A, the user may cause the display in the display region 705 of the results of that search. In this way, a user may retrieve a search result automatically by saving the search result into the side bar region 703A. One mechanism for causing a search result or a search query to be saved into the side bar region 703A is to select the add folder button 727 which appears in the bottom portion of the window 701. By selecting this button, the current search result or search query is saved as a list of files and other objects retrieved in the current search result. In the case where the search query is saved for later use rather than the saving of a search result, then the current search query is saved for re-use at a later time in order to find files which match the search query at that later time. The user may select between these two functionalities (saving a search result or saving a search query) by the selection of a command which is not shown.

FIGS. 8A and 8B show another aspect of a user interface feature which may be used with certain embodiments of the present invention. The window 801 of FIG. 8A represents a display of the search results which may be obtained as a result of using one of the various different embodiments of the present invention. The search results are separated into categories which are separated by headers 805, 807, 809, and 811 which in this case represent periods of time. This particular segmentation with headers was selected by the user's selecting the heading "date modified" using the date modified button 803 at the top of the window 801. An alternative selection of the kind category by selecting the button 802 at the top of the window 801A shown in FIG. 8B results in a different formatting of the search results which are now categorized by headers which indicate the types of files which were retrieved in the search and are separated by the headings 815, 817, 819, and 821 as shown in FIG. 8B. The use of these headings in the search results display allows the user to quickly scan through the search results in order to find the file.

Figure 9:
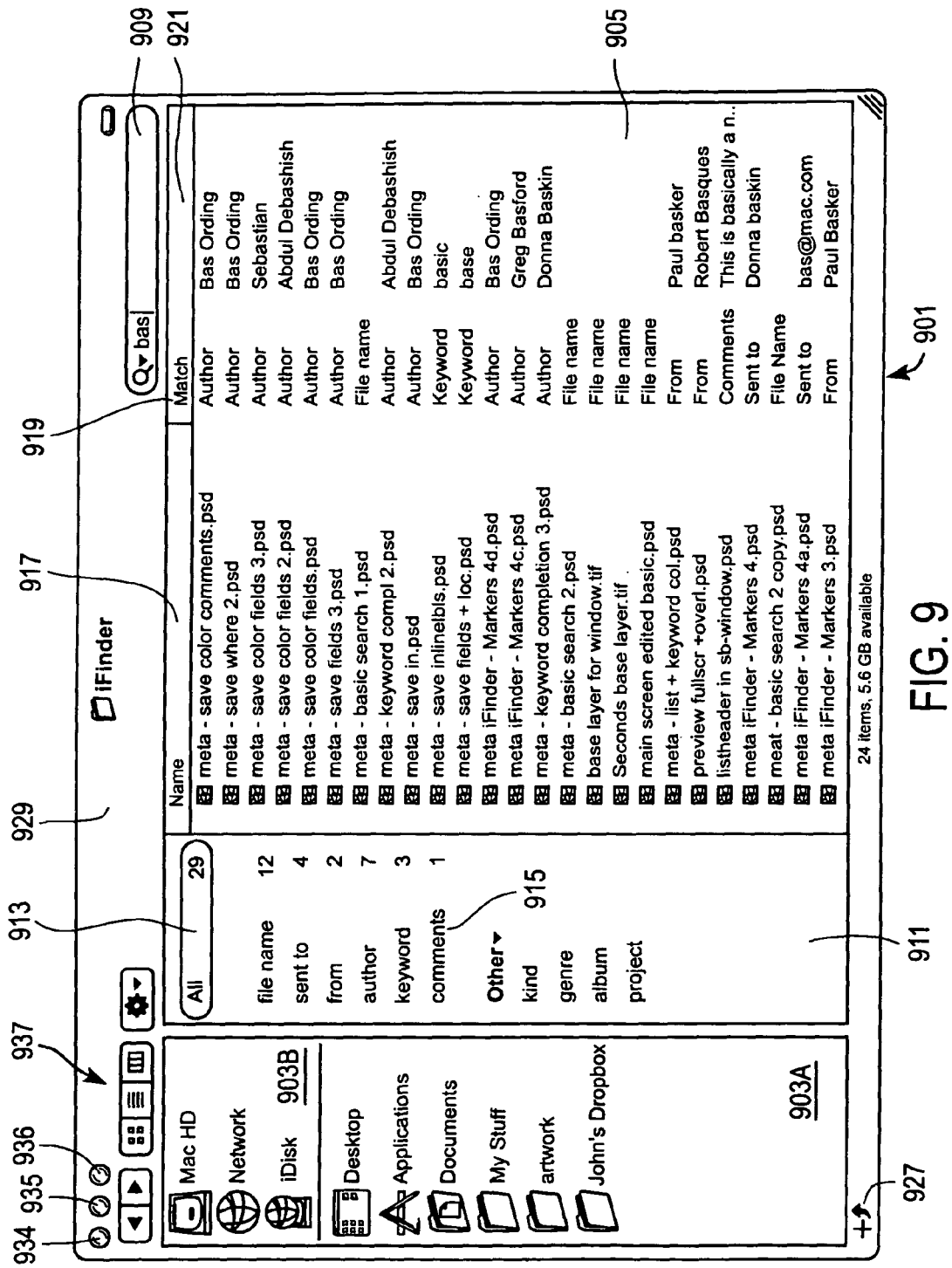
FIG. 9 shows another exemplary user interface of the present invention.

FIG. 9 shows another aspect of the present invention that is illustrated as part of the window 901 shown in FIG. 9. This window includes a display region 905 which shows the results of the search and the window also includes two side bar regions 903A and 903B, where the side bar region 903A is the user-configurable portion and the side bar region 903B is the system controlled portion. A folder add button 927 may be selected by the user to cause the addition of a search result or a search query to be added to the user-configurable portion of the side bar. The window 901 also includes conventional window controls such as a title bar or region 929 which may be used to move the window around a display and view select buttons 937 and maximize, minimize and resize buttons 934, 935, and 936 respectively. The window 901 shows a particular manner in which the results of a text-based search may be displayed. A text entry region 909 is used to enter text for searching. This text may be used to search through the metadata files or the indexed files or a combination of both. The display region 905 shows the results of a search for text and includes at least two columns, 917 and 919, which provide the name of the file that was found and the basis for the match. As shown in column 919, the basis for the match may be the author field or a file name or a key word or comments or other data fields contained in metadata that was searched. The column 921 shows the text that was found which matches the search parameter typed into the text entry field 909. Another column 911 provides additional information with respect to the search results. In particular, this column includes the number of matches for each particular type of category or field as well as the total number of matches indicated in the entry 913. Thus, for example, the total number of matches found for the comments field is only 1, while other fields have a higher number of matches.

Figure 10:
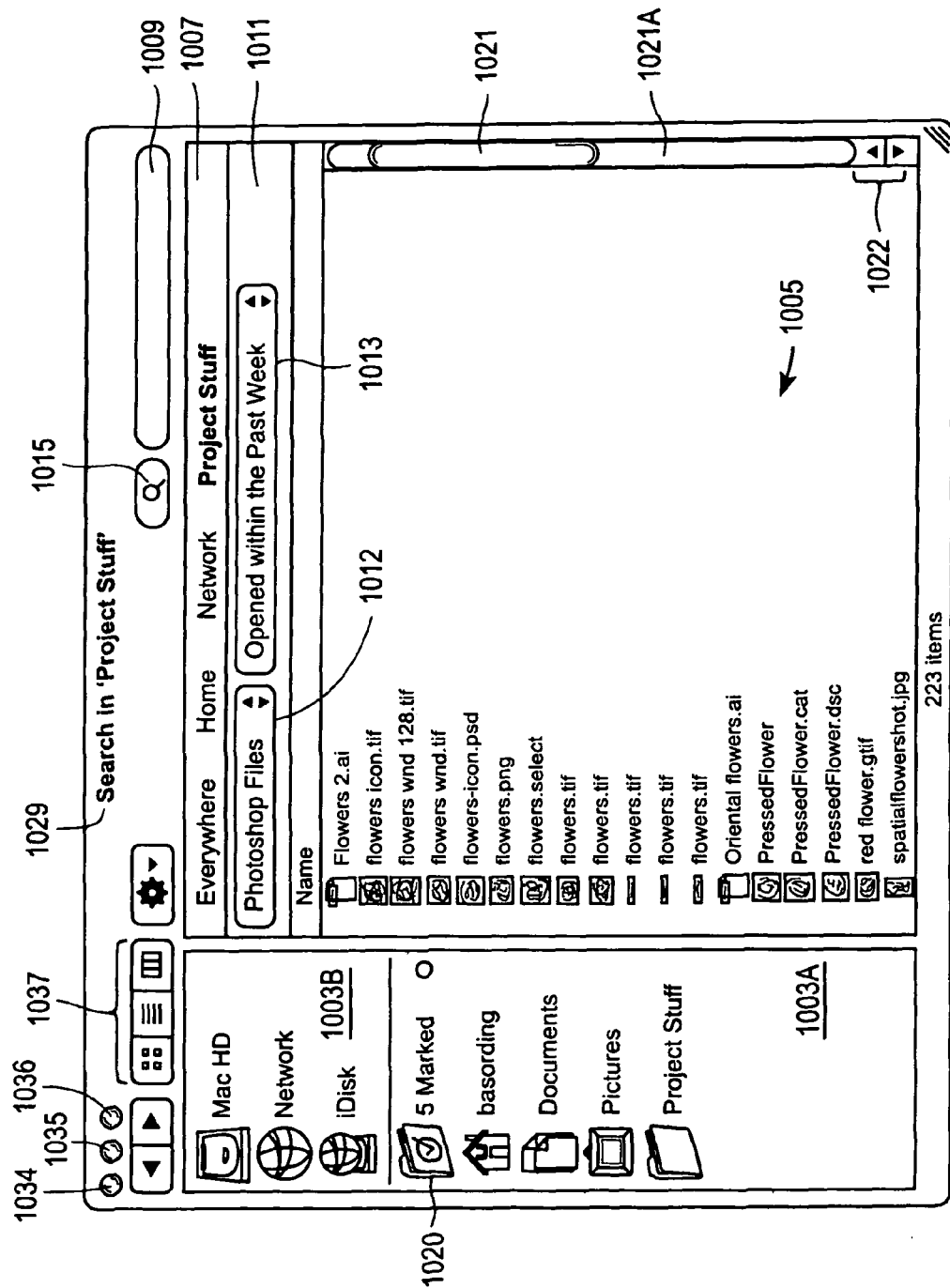
FIG. 10 shows another exemplary user interface of the present invention.

FIG. 10 shows certain other aspects of some embodiments of the present invention. Window 1001 is another search result window which includes various fields and menus for a user to select various search parameters or form a search query. The window 1001 includes a display region 1005 which may be used to display the results of a search and a user-configurable side bar portion 1003A and a system specified side bar portion 1003B. In addition, the window 1001 includes conventional scrolling controls such as controls 1021 and 1022 and 1021A. The window further includes conventional controls such as a title bar 1029 which may be used to move the window and view control buttons 1637 and maximize, minimize, and resize buttons 1034, 1035, and 1036. A start search button 1015 is near a text entry region 1009. A first search parameter menu bar 1007 is displayed adjacent to a second search parameter bar 1011. The first search parameter search bar 1007 allows a user to specify the location for a particular search while two menu pull down controls in the second search parameter menu bar 1011 allow the user to specify the type of file using the pull down menu 1012 and the time the file was created or last modified using the menu 1013.

The window 1001 includes an additional feature which may be very useful while analyzing a search result. A user may select individual files from within the display region 1005 and associate them together as one collection. Each file may be individually marked using a specific command (e.g. pressing the right button on a mouse and selecting a command from a menu which appears on the screen, which command may be "add selection to current group") or similar such commands. By individually selecting such files or by selecting a group of files at once, the user may associate this group of files into a selected group or a "marked" group and this association may be used to perform a common action on all of the files in the group (e.g. print each file or view each file in a viewer window or move each file to a new or existing folder, etc.). A representation of this marked group appears as a folder in the user-configurable portion 1003A. An example of such a folder is the folder 1020 shown in the user-configurable portion 1003A. By selecting this folder (e.g. by positioning a cursor over the folder 1020 and pressing and releasing a mouse button or by pressing another button) the user, as a result of this selection, will cause the display within the display region 1005 of the files which have been grouped together or marked. Alternatively, a separate window may appear showing only the items which have been marked or grouped. This association or grouping may be merely temporary or it may be made permanent by retaining a list of all the files which have been grouped and by keeping a folder 1020 or other representations of the grouping within the user-configurable side bar, such as the side bar 1003A. Certain embodiments may allow multiple, different groupings to exist at the same time, and each of these groupings or associations may be merely temporary (e.g. they exist only while the search results window is displayed), or they may be made permanent by retaining a list of all the files which have been grouped within each separate group. It will be appreciated that the files within each group may have been created from different applications. As noted above, one of the groupings may be selected and then a user may select a command which performs a common action (e.g. print or view or move or delete) on all of the files within the selected group.

Figure 11A:
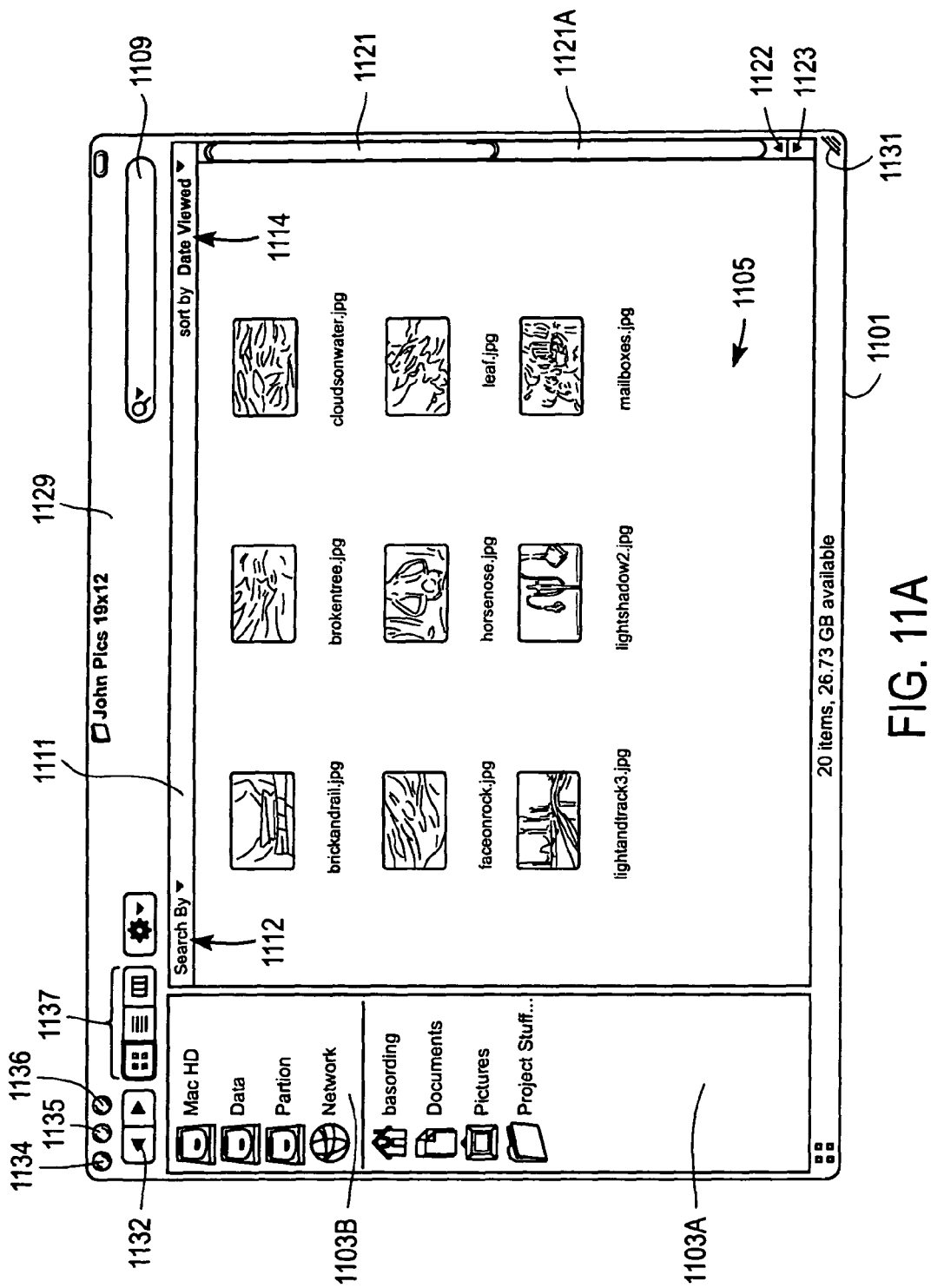
FIGS. 11A-11D show, in sequence, another exemplary user interface according to the present invention.
Figure 11B:
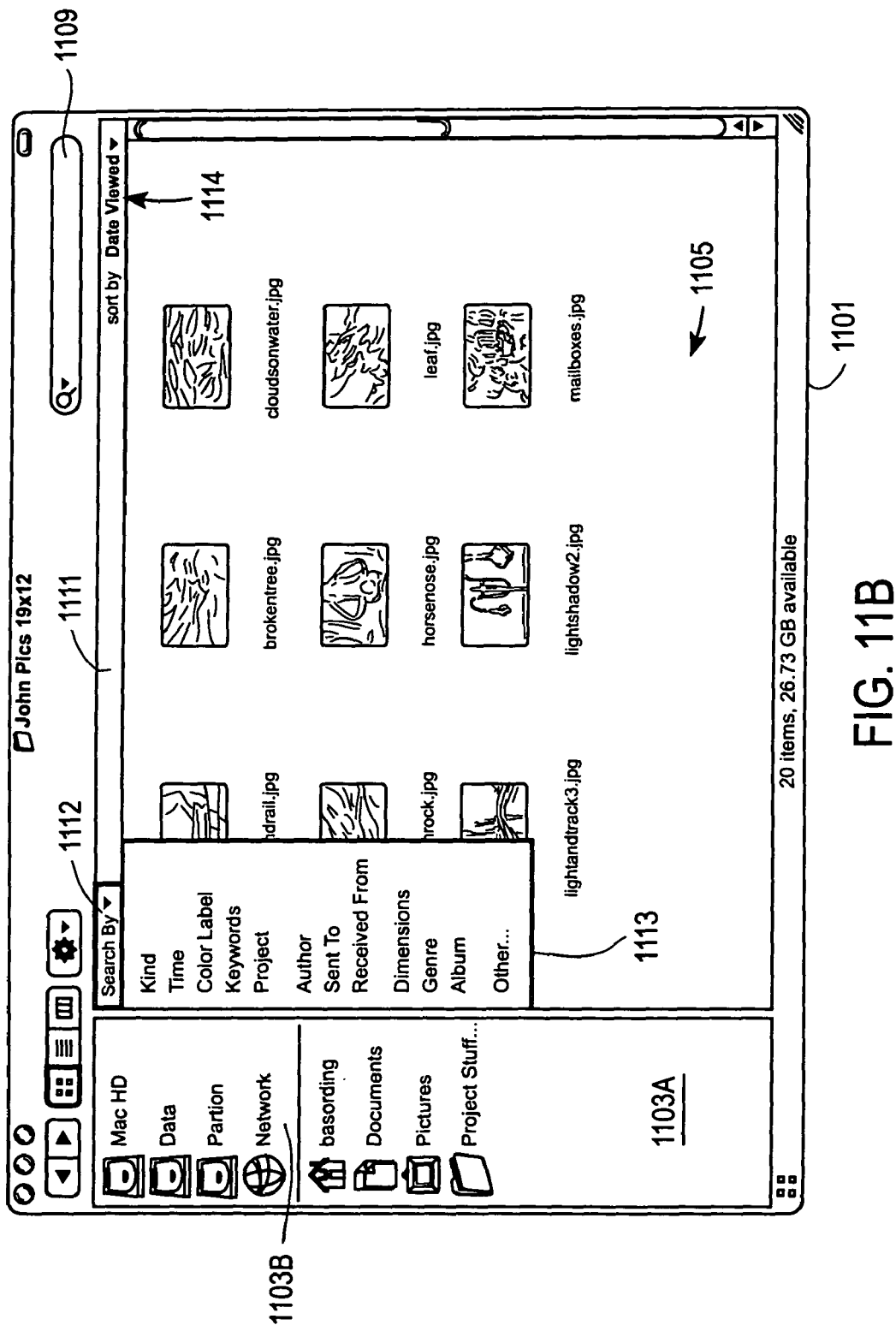

FIGS. 11A, 11B, 11C, and 11D show an alternative user interface for allowing a user to input search queries or search parameters. The user interface shown in these figures appears within the window 1101 which includes a user-configurable side bar region 1103A and a system specified side bar region 1103B. The window 1101 also includes traditional window controls such as a window resizing control 1131 which may be dragged in a conventional graphical user interface manner to resize the window, and the window further includes scrolling controls such as controls 1121, 1122, and 1123. The scrolling control 1121 may, for example, be dragged within the scrolling region 1121A or a scroll wheel on a mouse or other input device may be used to cause scrolling within a display region 1105. Further, traditional window controls include the title bar 1129 which may be used to move the window around a desktop which is displayed on a display device of a computer system and the window also includes view buttons 1137 as well as close, minimize, and resize buttons 1134, 1135 and 1136. A back and forward button, such as the back button 1132, are also provided to allow the user to move back and forth in a manner which is similar to the back and forth commands in a web browser. The window 1101 includes a search parameter menu bar 1111 which includes a "search by" pull down menu 1112 and a "sort by" pull down menu 1114. The "search by" pull down menu 1112 allows a user to specify the particular search parameter by selecting from the options which appear in the pull down menu once it is activated as shown in FIG. 11B. In particular, the pull down menu 1113 shows one example of a pull down menu when the "search by" pull down menu 1112 has been activated. The "sort by" pull down menu 1114 allows a user to specify how the search results are displayed within a display region 1105. In the example shown in FIGS. 11A-11D a user has used the "sort by" pull down menu 1114 to select the "date viewed" criteria to sort the search results by. It should also be noted that the user may change the type of view of the search results by selecting one of the three view buttons 1137. For example, a user may select an icon view which is the currently selected button among the view buttons 1137, or the user may select a list view or a column view.

Figure 11C:
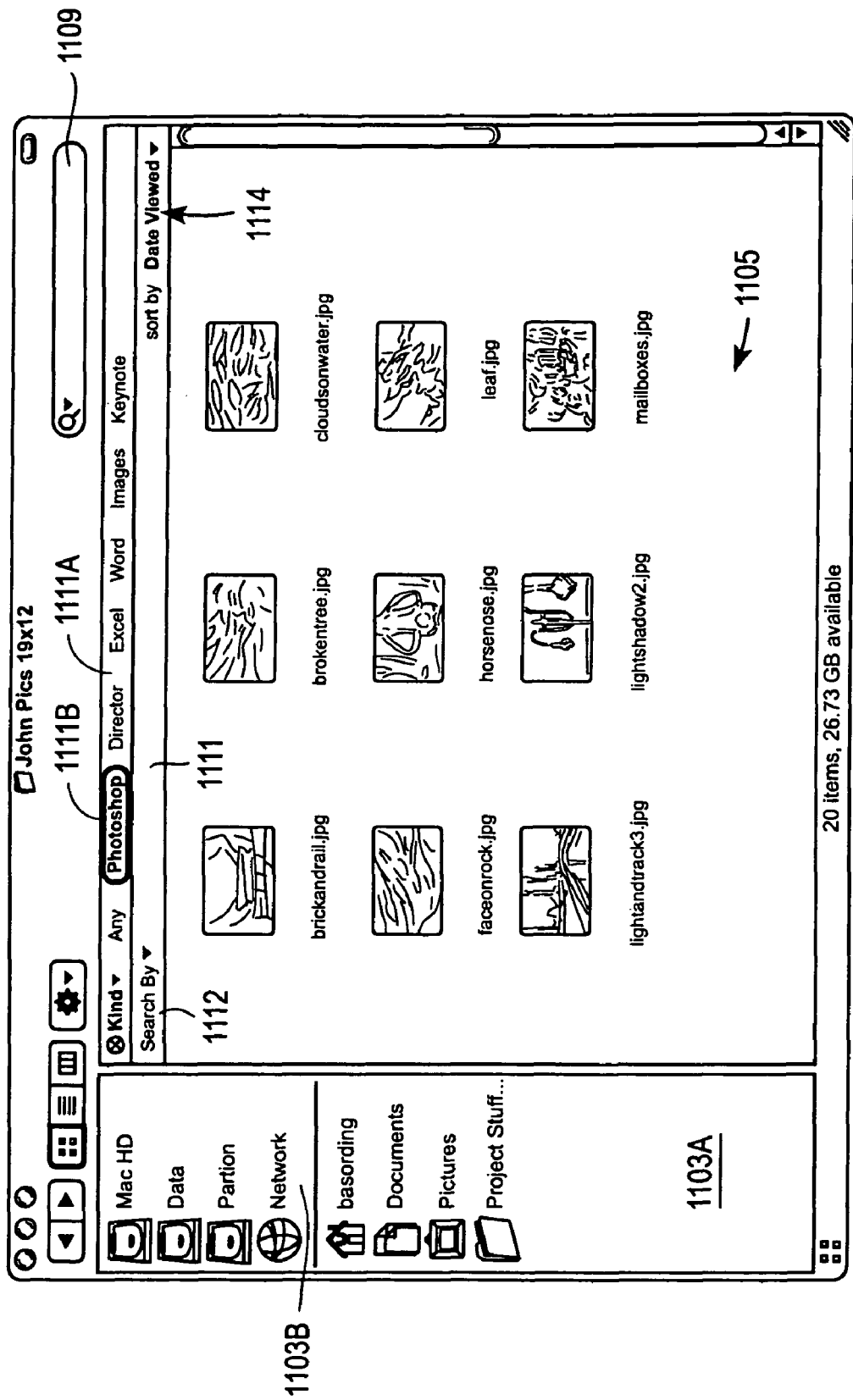
Figure 11D:
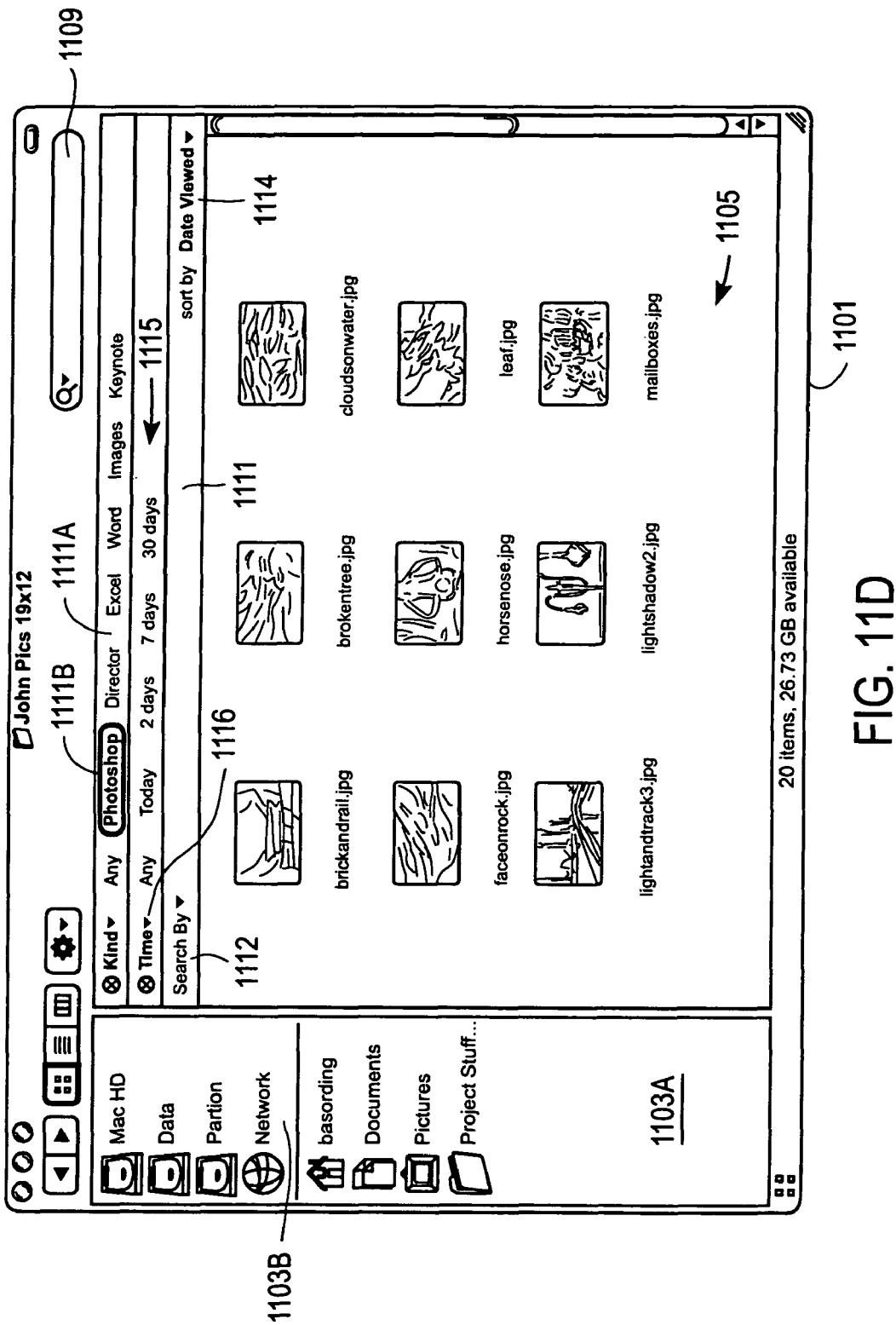

FIG. 11B shows the result of the user's activation of a "search by" pull down menu 1112 which causes the display of the menu 1113 which includes a plurality of options from which the user may choose to perform a search by. It will be appreciated that there are a number of different ways for a user to activate the "search by" pull down menu 1112. One way includes the use of a cursor, such as a pointer on a display which is controlled by a cursor control device, such as a mouse. The cursor is positioned over the region associated with the "search by" menu title (which is the portion within the search parameter menu bar 1111 which contains the words "search by") and then the user indicates the selection of the menu title by pressing a button, such as a mouse's button, to cause the pull down menu to appear, which in this case is the menu 1113 shown in FIG. 11B. At this point, the user may continue to move the cursor to point to a particular option within the menu, such as the "time" option. This may result in the display of a submenu to the left or to the right of the menu 1113. This submenu may be similar to the submenu 719A or to the menu 1214 shown in FIG. 12A. If the "kind" option is selected in the menu 1113, the submenu may include a generic list of the different kinds of documents, such as images, photos, movies, text, music, PDF documents, email documents, etc. or the list may include references to specific program names such as PhotoShop, Director, Excel, Word, etc. or it may include a combination of generic names and specific names. FIG. 11C shows the result of the user having selected PhotoShop type of documents from a submenu of the "kind" option shown in menu 1113. This results in the display of the search parameter menu bar 1111A shown in FIG. 11C which includes a highlighted selection 1111B which indicates that the PhotoShop type of documents will be searched for. The search parameter menu bar 1111 appears below the search parameter menu bar 1111A as shown in FIG. 11C. The user may then specify additional search parameters by again using the "search by" pull down menu 1112 or by typing text into the text entry field 1109. For example, from the state of the window 1101 shown in FIG. 11C, the user may select the "search by" pull down menu 1112 causing the display of a menu containing a plurality of options, such as the options shown within the menu 1113 or alternative options such as those which relate to PhotoShop documents (e.g. the various fields in the metadata for PhotoShop type of documents). A combination of such fields contained within metadata for PhotoShop type documents and other generic fields (e.g. time, file size, and other parameters) may appear in a menu, such as the menu 1113 which is activated by selecting the "search by" pull down menu. The user may then select another criteria such as the time criteria. In this case, the window 1101 displays a new search parameter menu bar 1115 which allows a user to specify a particular time. The user may select one of the times on the menu bar 1115 or may activate a pull down menu by selecting the menu title "time," which is shown as the menu title 1116. The state of the window 1101 shown in FIG. 11D would then search for all PhotoShop documents created in the last 30 days or 7 days or 2 days or today or at any time, depending on the particular time period selected by the user.

FIGS. 12A, 12B, 12C and 12D show another example of a user interface for allowing the creation of search queries for searching metadata and other data and for displaying the results of the search performed using a search query. The different implementation shown in FIGS. 12A-12D shows a user interface presentation in a column mode; this can be seen by noting the selection of the column button, which is the rightmost button in the view buttons 1237 shown in FIG. 12A. The window 1201 has two columns 1211 and the display region 1205, while the window 1251 of FIG. 12C has three columns which are columns 1257, 1259, and the display region 1255, and the window 1271 has three columns which are columns 1277, 1279, and the display region 1275.

Figure 12A:
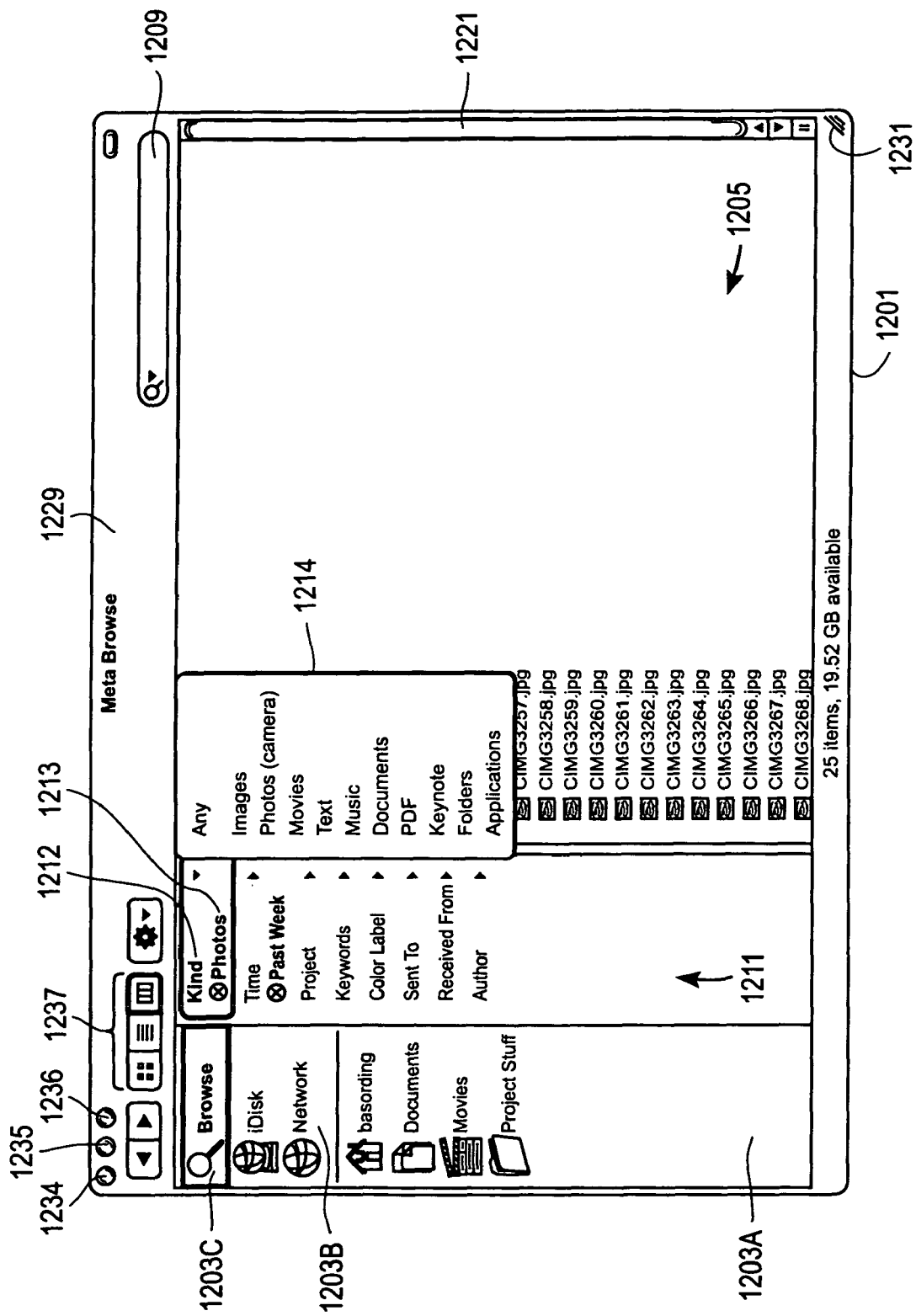
FIGS. 12A-12D show alternative embodiments of user interfaces according to the present invention.
Figure 12B:
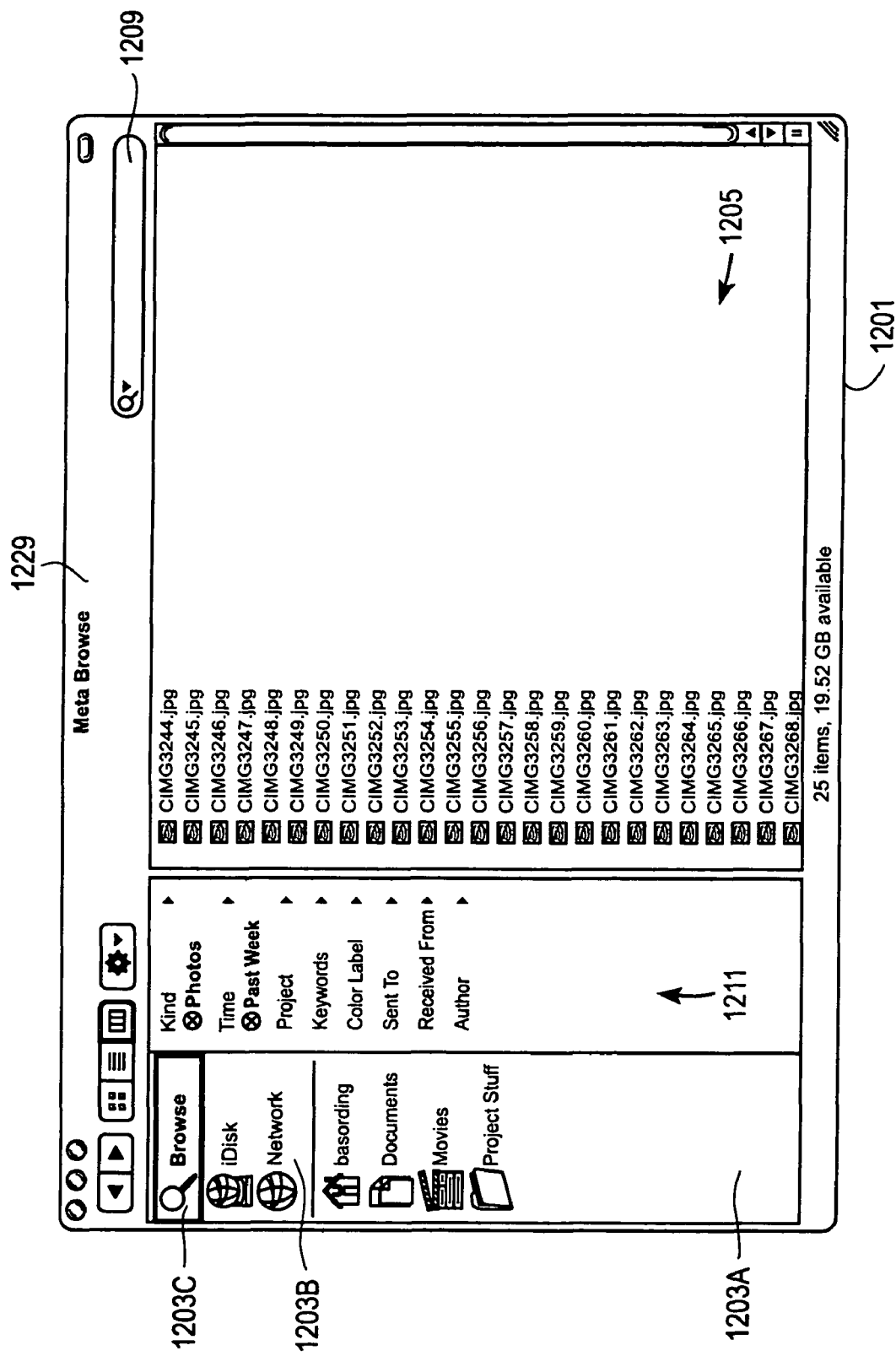

The window 1201 shown in FIGS. 12A and 12B includes a display region 1205 which shows the results of a search; these results may be shown dynamically as the user enters search parameters or the results may be shown only after the user has instructed the system to perform the search (e.g. by selecting a "perform search" command). The window 1201 includes conventional window controls, such as a resizing control 1231, a scrolling control 1221, a title bar 1229 which may be used to move the window, a window close button, a window minimize button, and a window resize button 1234, 1235, and 1236, respectively. The window 1201 also includes a user configurable side bar region 1203A and a system specified side bar region 1203B. It can be seen from FIG. 12A that a browse mode has been selected as indicated by the highlighted "browse" icon 1203C in the system specified side bar region 1203B. The window 1201 also includes a text entry region 1209, which a user may use to enter text for a search, and the window 1201 also includes view selector buttons 1237.

A column 1211 of window 1201 allows a user to select various search parameters by selecting one of the options which in turn causes the display of a submenu that corresponds to the selected option. In the case of FIG. 12A, the user has selected the "kind" option 1212 and then has used the submenu 1214 to select the "photos" option from the submenu, resulting in an indicator 1213 (photos) to appear in the column 1211 under the "kind" option as shown in FIG. 12A. It can also be seen that the user has previously selected the "time" option in the column 1211 and has selected from a submenu brought up when the "time" option was selected the "past week" search parameter. When the user has finished making selections of the various options and suboptions from both the column 1112 and any of the corresponding submenus which appear, then the display showed in FIG. 12B appears. Note that the submenus are no longer present and that the user has completed the selection of the various options and suboptions which specify the search parameters. Column 1211 in FIG. 12B provides feedback to the user indicating the exact nature of the search query (in this case a search for all photos dated in the past week), and the results which match the search query are shown in the display region 1205.

Figure 12C:
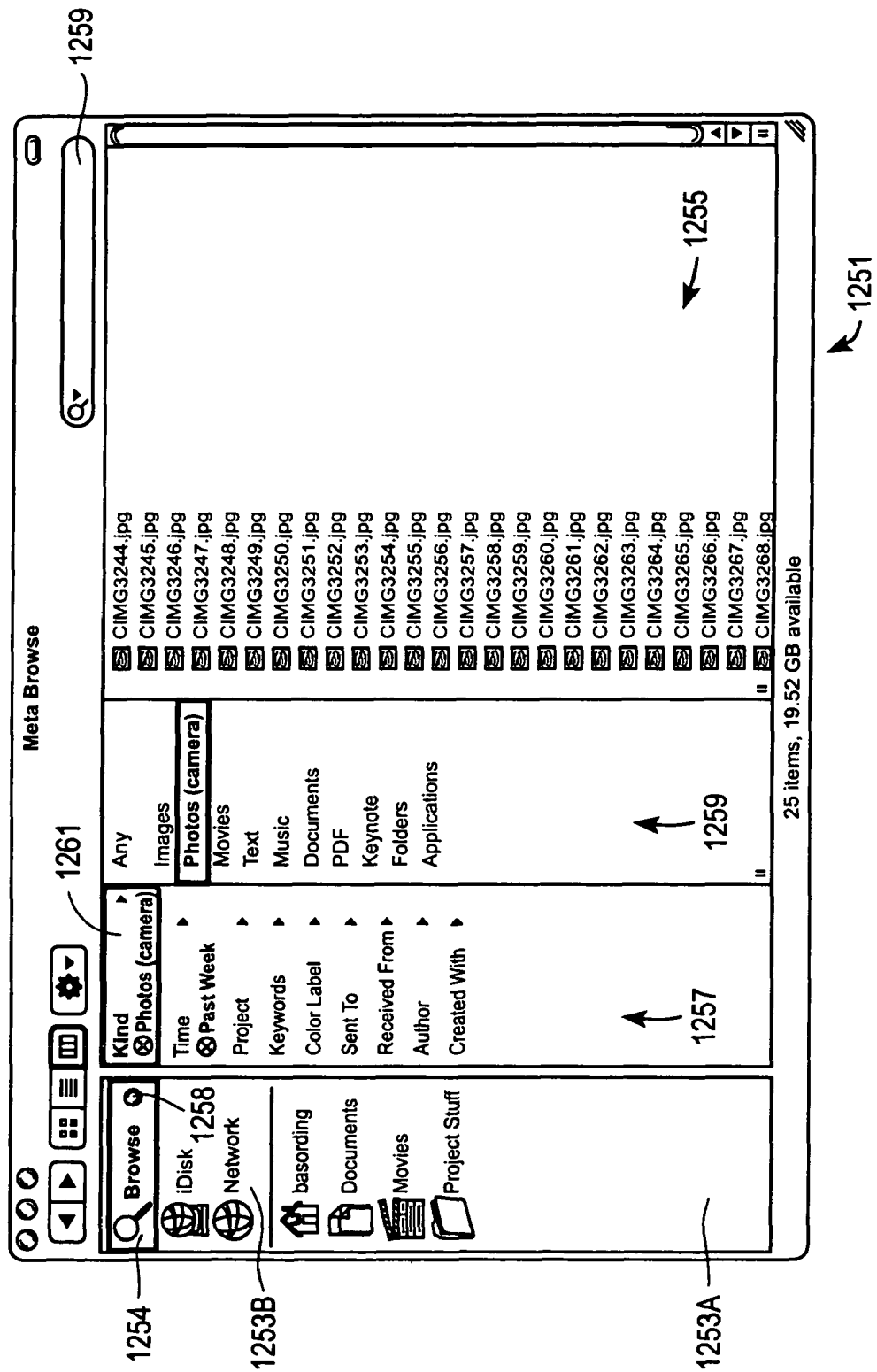
Figure 12D:
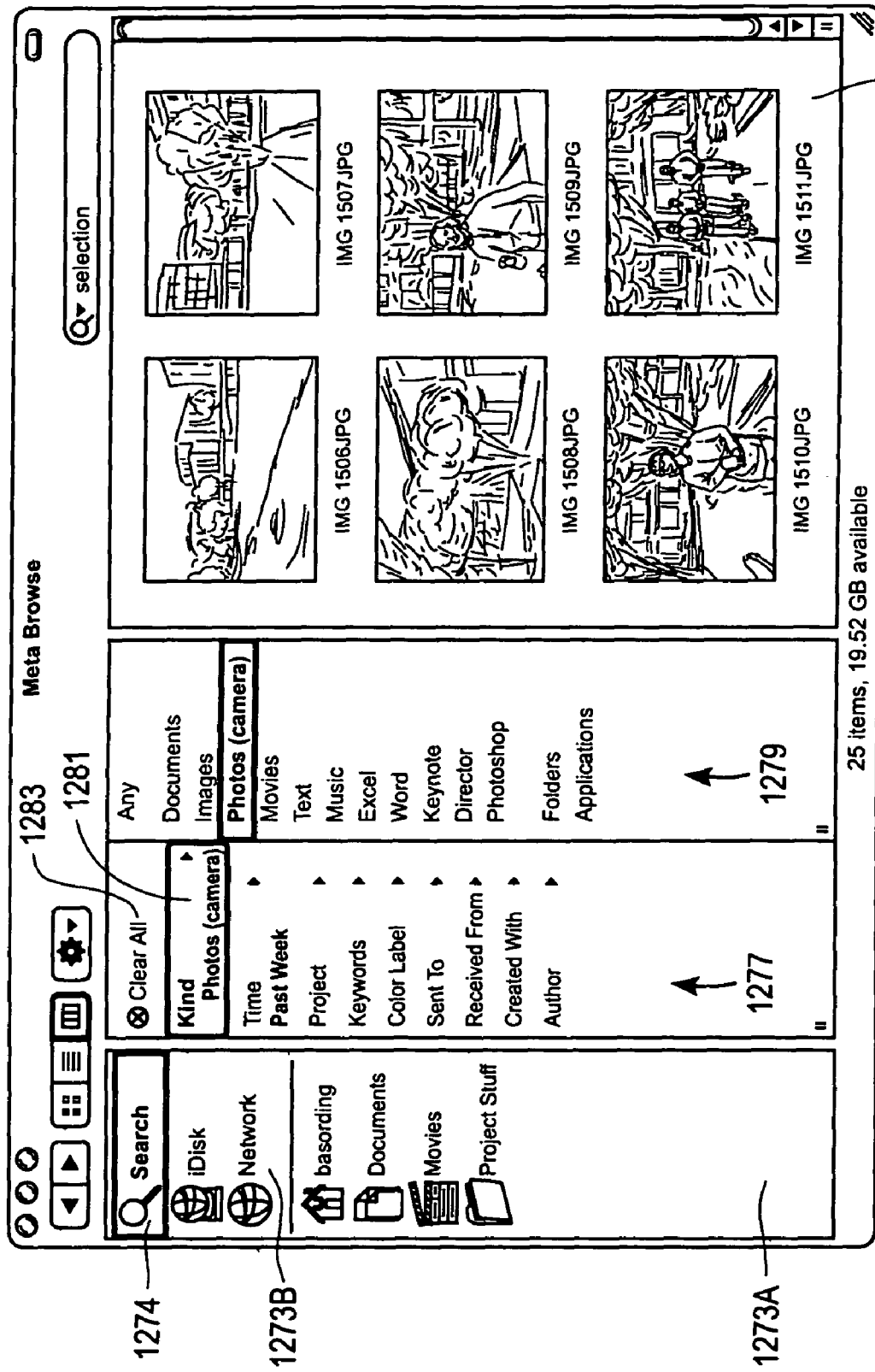

FIGS. 12C and 12D show an alternative embodiment in which the submenus which appear on a temporary basis in the embodiment of FIGS. 12A and 12B are replaced by an additional column which does not disappear after a selection is made. In particular, the column 1259 of the window 1251 functions in the same manner as the submenu 1214 except that it remains within the window 1251 after a selection is made (wherein the submenu 1214 is removed from the window after the user makes the selection from the submenu). The column 1279 of window 1271 of FIG. 12D is similar to the column 1259. The window 1251 includes a side bar which has a user configurable side bar region 1253A and a system defined side bar region 1253B. The system specified side bar region 1253B includes a "browse" selection region 1254 which has a clear button 1258 which the user may select to clear the current search query. The window 1271 of FIG. 12D provides an alternative interface for clearing the search query. The window 1271 also includes a user configurable side bar region 1273A and a system specified side bar region 1273B, but the clear button, rather than being with the "search" region 1274 is at the top of the column 1277. The user may clear the current search parameter by selecting the button 1283 as shown in FIG. 12D.

Figure 13A:
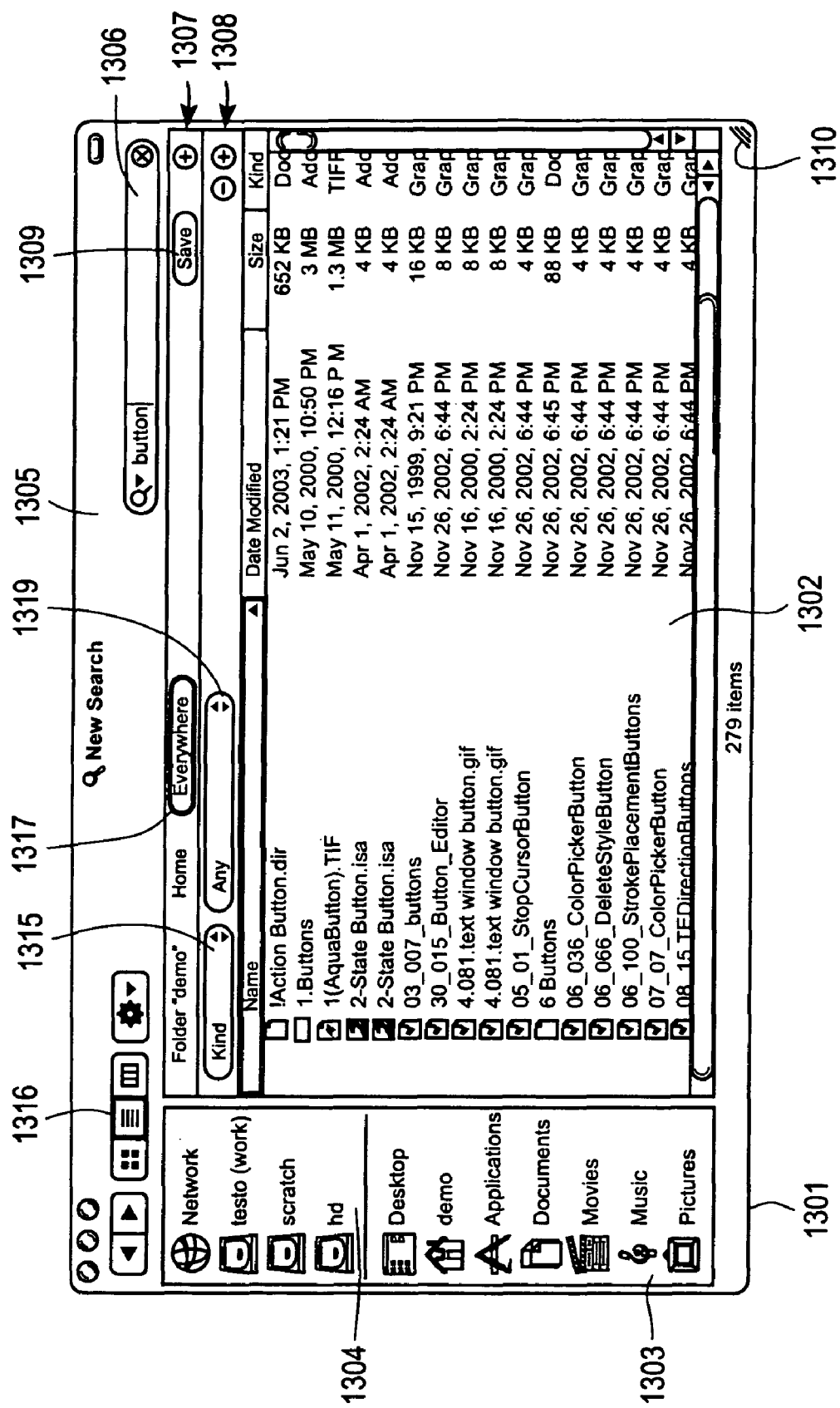
FIGS. 13A and 13B show further alternative embodiments of user interfaces according to the present invention.
Figure 13B:
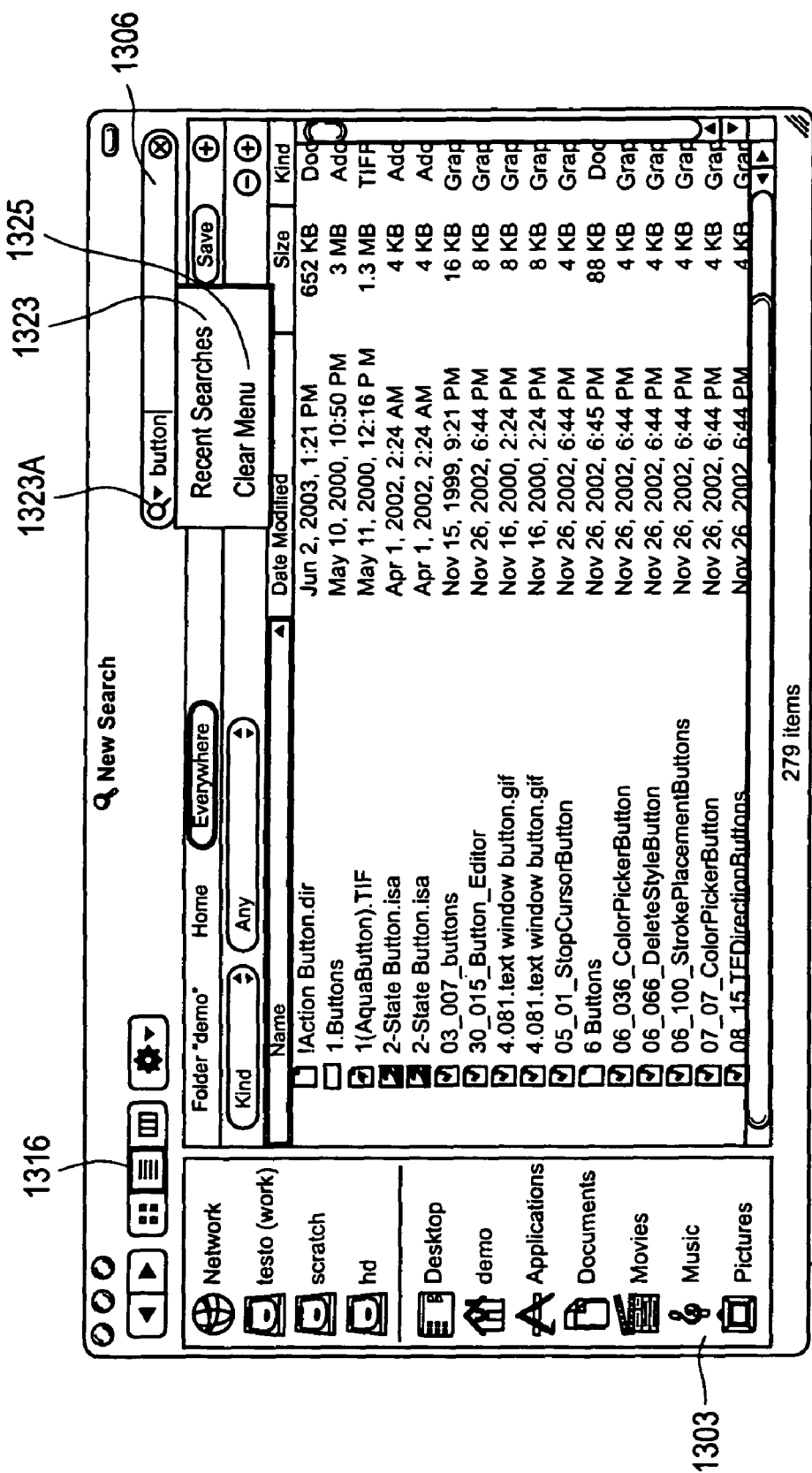

FIG. 13A shows another embodiment of a window 1301 which displays search results within a display region 1302. The window 1301 may be a closeable, minimizeable, resizeable, and moveable window having a resizing control 1310, a title bar 1305 which may be used to move the window, a text entry region 1306 and a user configurable portion 1303, and a system specified portion 1304. The window 1301 further includes buttons for selecting various views, including an icon view, a list view, and a column view. Currently, the list view button 1316 has been selected, causing the display of the search results in a list view manner within the display region 1302. It can be seen that the text ("button") has been entered into the text entry region 1306 and this has caused the system to respond with the search results shown in the display region 1302. The user has specified a search in every location by selecting "everywhere" button 1317. Further, the user has searched for any kind of document by selecting the "kind" option from the pull down menu 1315 and by selecting the "any" option in the pull down menu 1319. The where or location slice 1307 includes a "+" button which may be used to add further search parameters, and similarly, the slice 1308 includes a "+" and a "−" button for adding or deleting search parameters, respectively. The slice 1307 further includes a "save" button 1309 which causes the current search query to be saved in the form of a folder which is added to the user configurable portion 1303 for use later. This is described further below and may be referred to as a "smart folder." The search input user interface shown in FIGS. 13A and 13B is available within, in certain embodiments, each and every window controlled by a graphical user interface file management system, such as a Finder program which runs on the Macintosh or Windows Explorer which runs on Microsoft Windows. This interface includes the text entry region 1306 as well as the slices 1307 and 1308.

The window 1301 shown in FIG. 13B shows the activation of a menu by selecting the search button 1323A, causing a display of a menu having two entries 1323 and 1325. Entry 1323 displays recently performed searches so that a user may merely recall a prior search by selecting the prior search and cause the prior search to be run again. The menu selection 1325 allows the user to clear the list of recent searches in the menu.

Figure 14A:
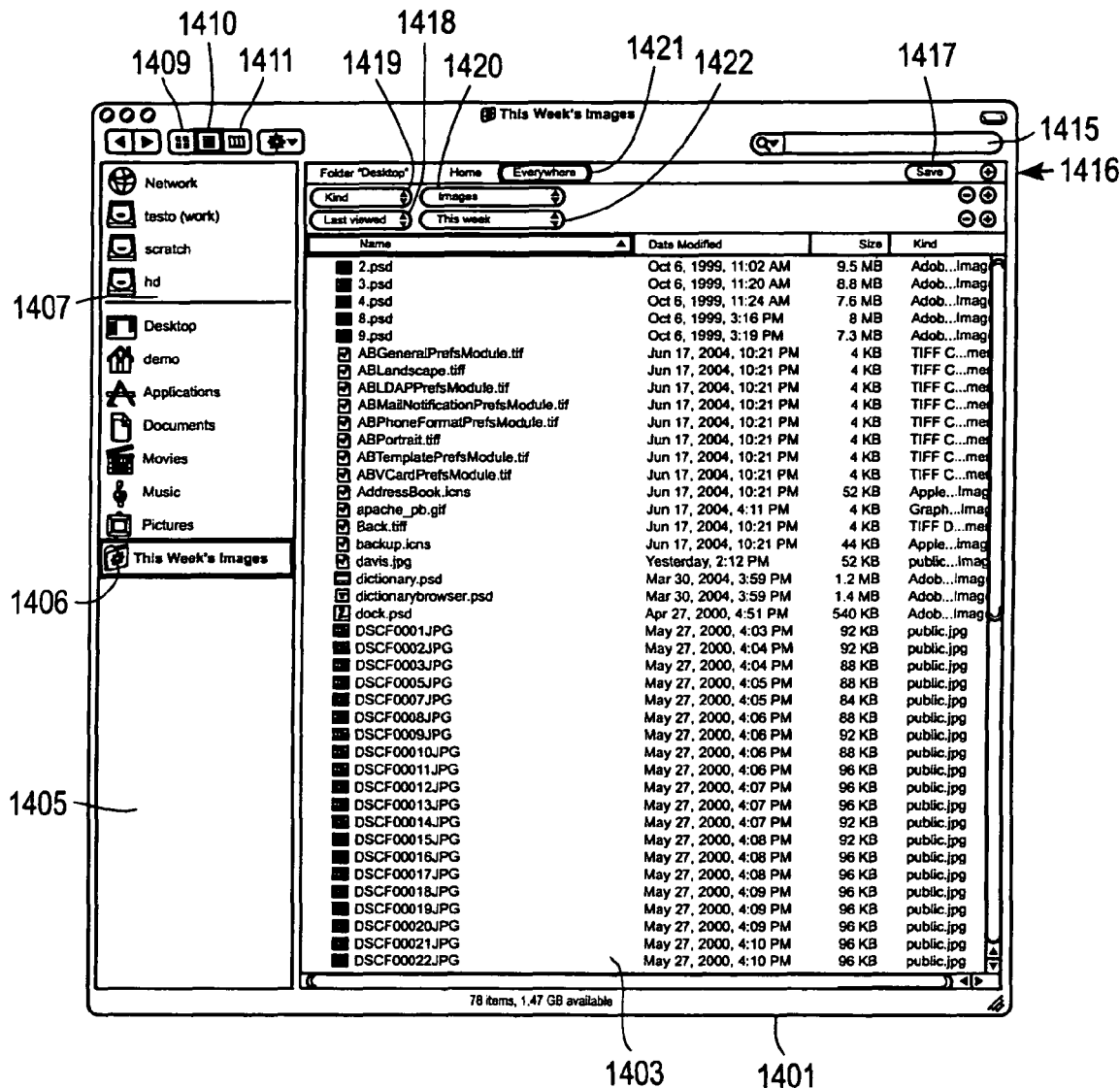
FIGS. 14A, 14B, 14C, and 14D show further alternative embodiments of user interfaces according to the present invention.
Figure 14B:
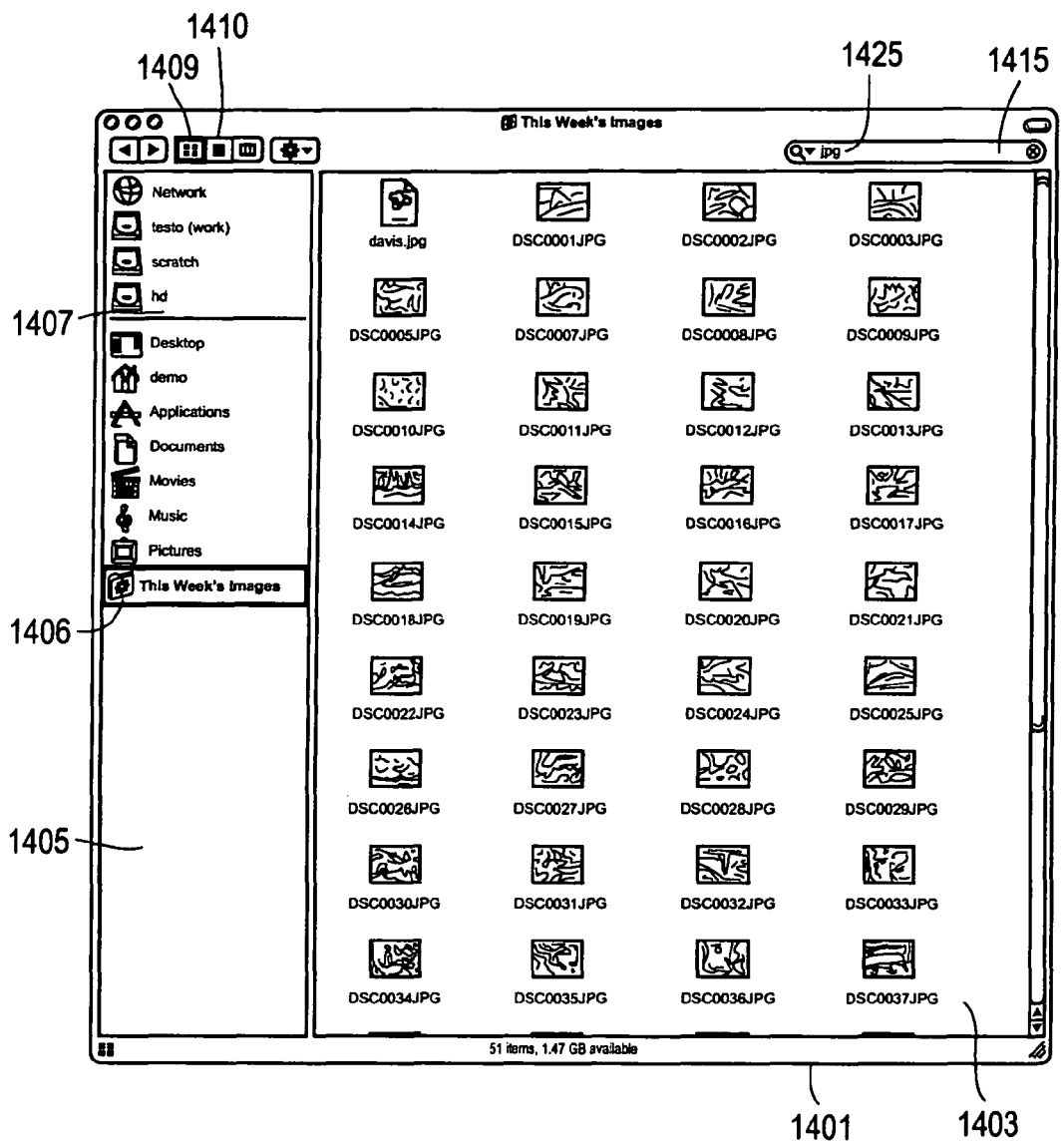
Figure 14C:
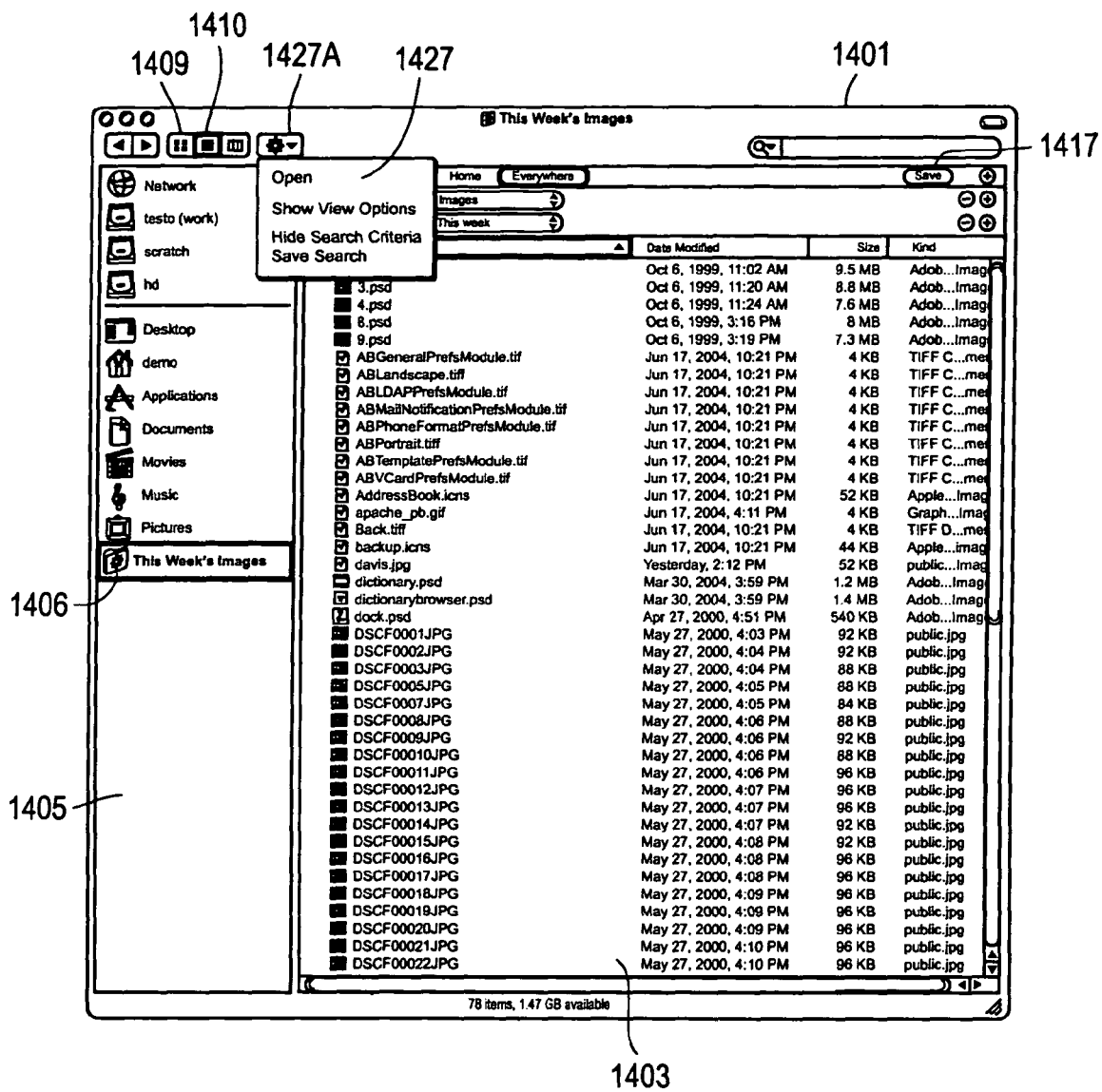

FIGS. 14A, 14B, and 14C show examples of another window in a graphical user interface file system, such as the Finder which runs on the Macintosh operating system. These windows show the results of a particular search and also the ability to save and use a smart folder which saves a prior search. The window 1401 shown in FIG. 14A includes a display region 1403, a user configurable region 1405, a smart folder 1406, a system specified region 1407, an icon view button 1409, a list view button 1410, and a column view button 1411. The window 1401 also includes a text entry region 1415 and a location slice 1416 which may be used to specify the location for the search, which slice also includes a save button 1417. Additional slices below the slice 1416 allow the user to specify further details with respect to the search, in this case specifying types of documents which are images which were last viewed this week. The user has set the search parameters in this manner by selecting the "kind" option from the pull down menu 1419 and by selecting the "images" type from the pull down menu 1420 and by selecting the "last viewed" option from pull down menu 1418 and by selecting "this week" from the pull down menu 1422. The user has also selected "everywhere" by selecting the button 1421 so that the search will be performed on all disks and storage devices connected to this system. The results are shown within the display region 1403. The user can then save the search query by selecting the "save" button 1417 and may name the saved search query as "this week's images" to produce the smart folder 1406 as shown in the user configurable portion 1405. This allows the user to repeat this search at a later time by merely selecting the smart folder 1406 which causes the system to perform a new search again, and all data which matches the search criteria will be displayed within the display region 1403. Thus, after several weeks, a repeating of this search by selecting the smart folder 1406 will produce an entirely different list if none of the files displayed in the display region 1403 of FIG. 14A are viewed in the last week from the time in which the next search is performed by selecting the smart folder 1406.

FIG. 14B shows a way in which a user may sort or further search within the search results specified by a saved search, such as a smart folder. In the case of FIG. 14B, the user has selected the smart folder 1406 and has then entered text "jpg" 1425 in the text entry region 1415. This has caused the system to filter or further limit the search results obtained from the search query saved as the smart folder 1406. Thus, PhotoShop files and other files such as TIF files and GIF files are excluded from the search results displayed within the display region 1403 of FIG. 14B because the user has excluded those files by adding an additional search criteria specified by the text 1425 in the text entry region 1415. It can be seen that the "jpg" text entry is ANDed logically with the other search parameters to achieve the search results displayed in the display region 1403. It can also be seen that the user has selected the icon view by selecting the icon view button 1409. Thus, it is possible for a user to save a search query and use it later and to further limit the results of the search query by performing a search on the results of the search query to further limit the search results.

FIG. 14C shows the window 1401 and shows the search results displayed within the display region 1403, where the results are based upon the saved search specified by the smart folder 1406. The user has caused a pull down menu 1427 to appear by selecting the pull down region 1427A. The pull down region 1427 includes several options which a user may select. These options include hiding the search criteria or saving the search (which is similar to selecting the button 1417) or showing view options or opening the selected file. This allows the user, for example, to hide the search criteria, thereby causing the slice 1416 and the other search parameters to be removed from the window 1401 which is a moveable, resizeable, minimizeable, and closeable window.

Figure 14D:
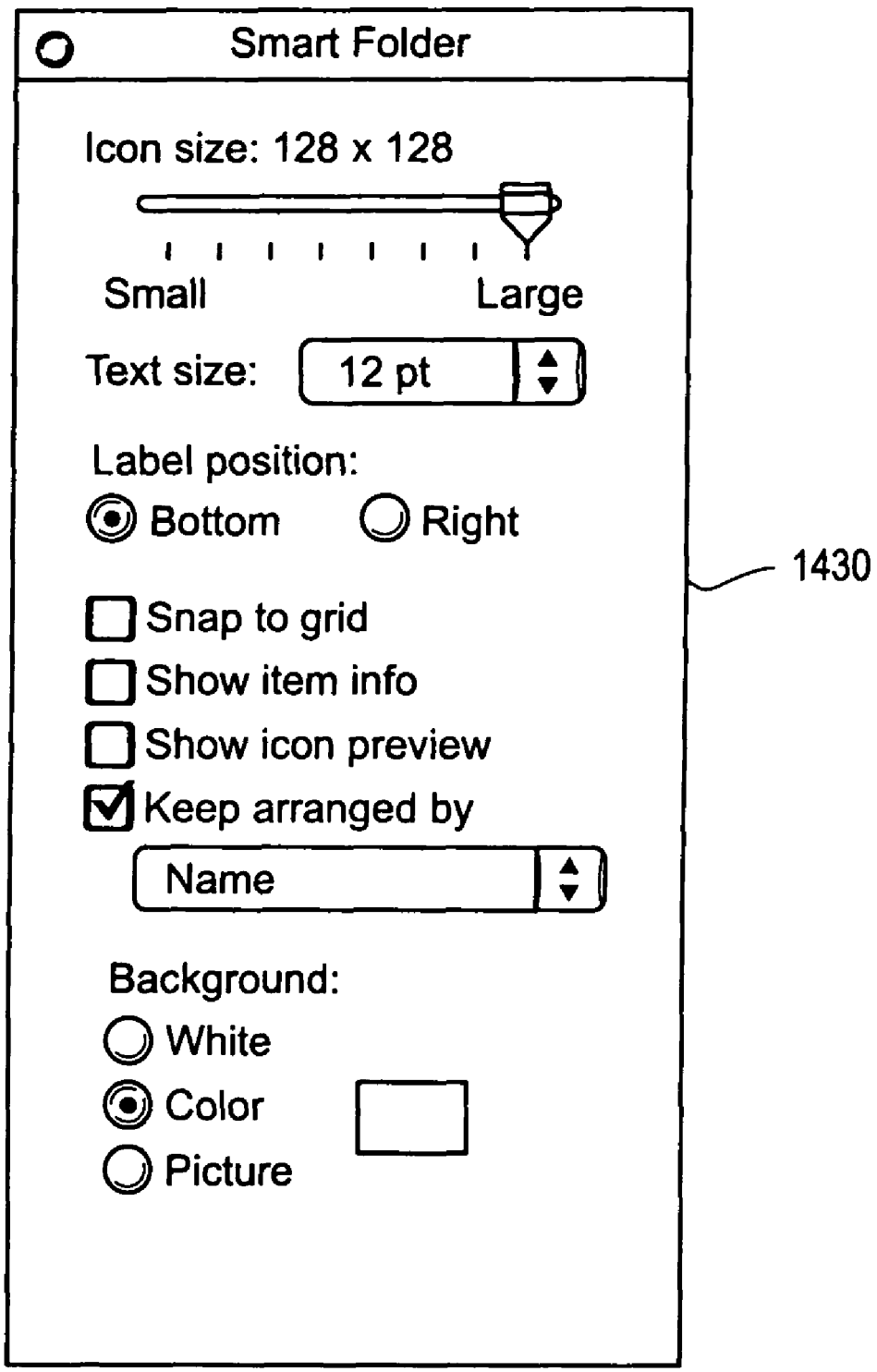

FIG. 14D shows an example of a user interface which allows the user to specify the appearance of a smart folder, such as the smart folder 1406.

Figure 15A:
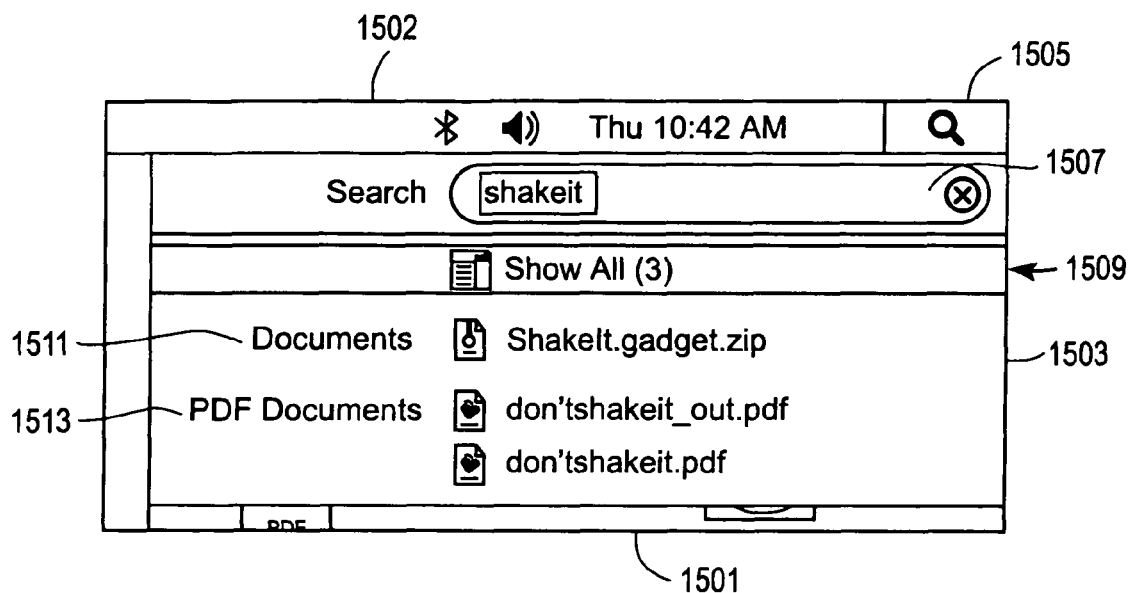
FIGS. 15A, 15B, 15C and 15D show another alternative embodiment of user interfaces according to the present invention.
Figure 15B:
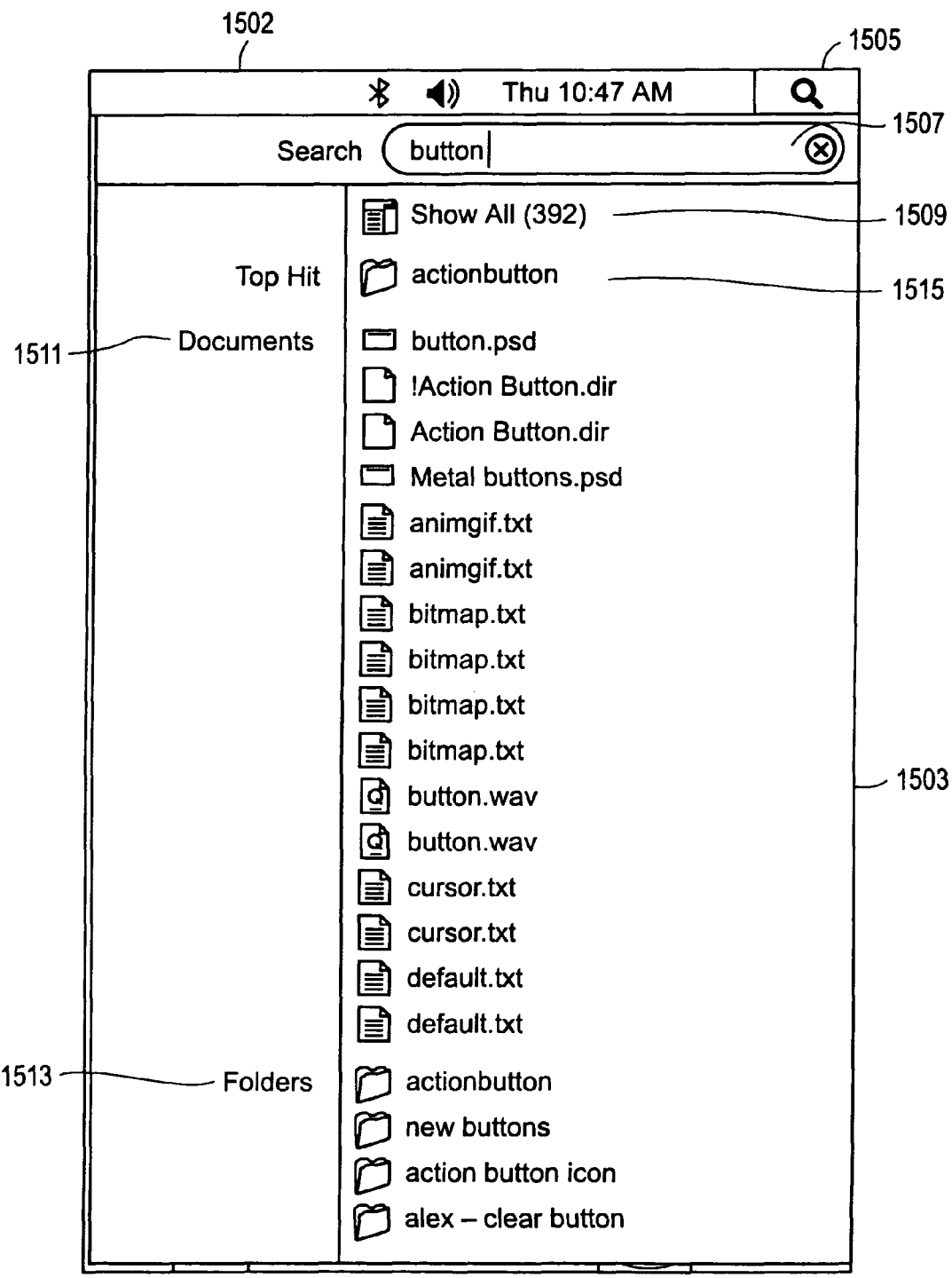
Figure 15C:
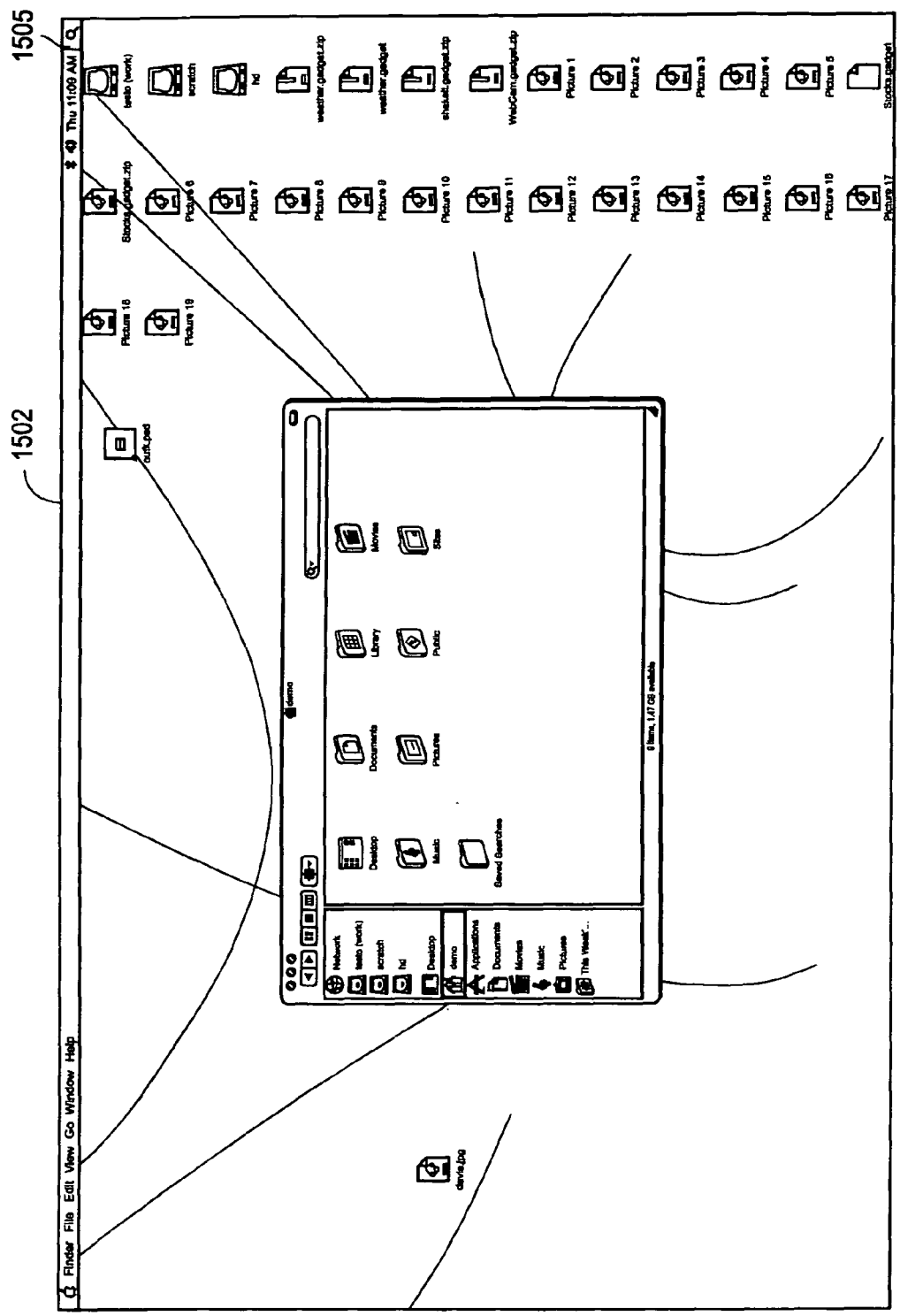
Figure 15D:
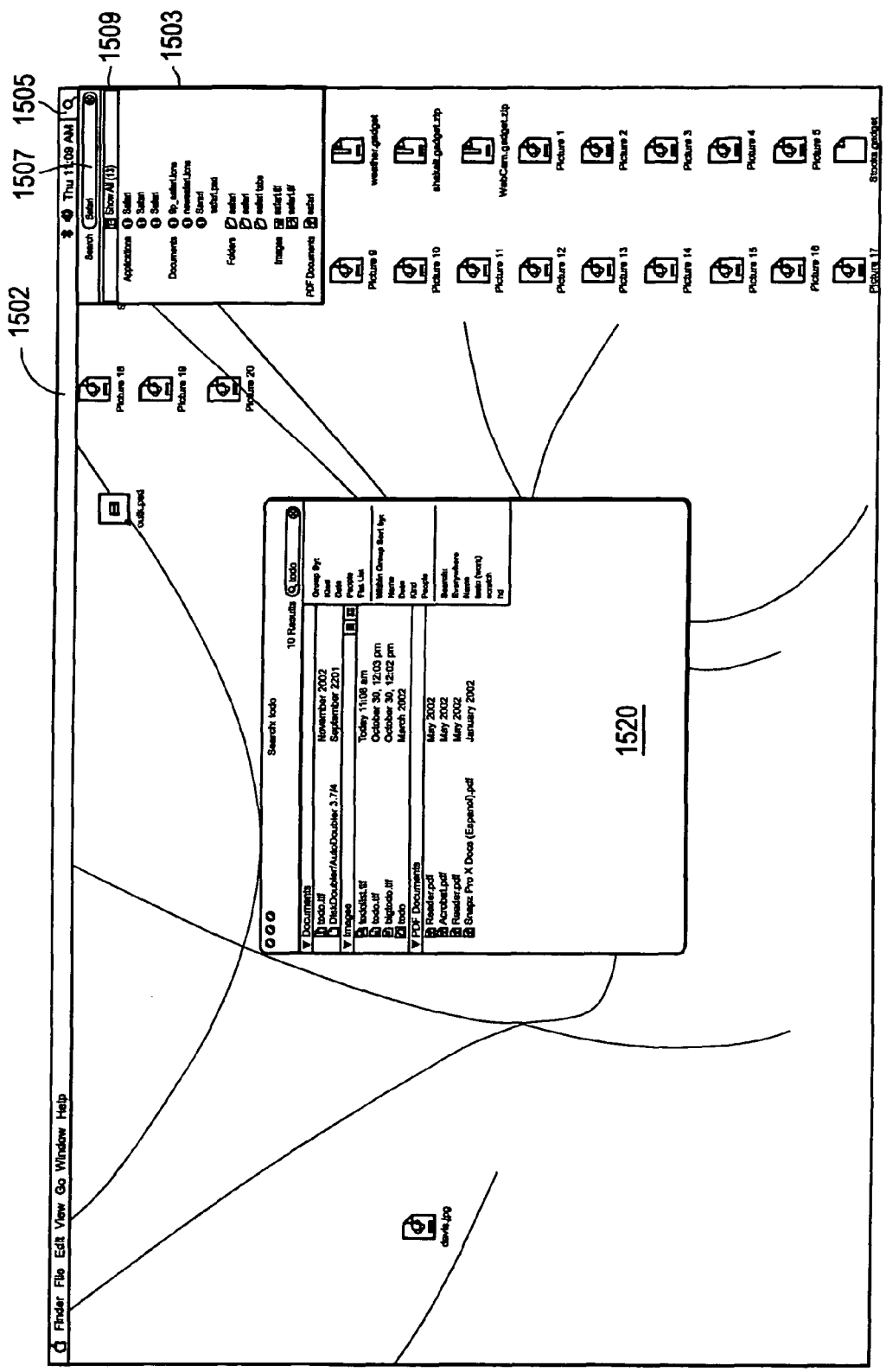

FIGS. 15A, 15B, 15C, and 15D show an example of a system wide search input user interface and search result user interface. In one particular exemplary embodiment, these user interfaces are available on the entire system for all applications which run on the system and all files and metadata, and even address book entries within an address book program, such as a personal information manager, and calendar entries within a calendar program, and emails within an email program, etc. In one exemplary embodiment, the system begins performing the search and begins displaying the results of the search as the user types text into a text entry field, such as the text entry field 1507. The search results are organized by categories and are displayed as a short list which is intentionally abbreviated in order to present only a selected number of the most relevant (scored) matches or hits to the search query. The user can ask for the display of all the hits by selecting a command, such as the "show all" command 1509. FIG. 15A shows a portion of a display controlled by a data processing system. This portion includes a menu bar 1502 which has at its far end a search menu command 1505. The user can select the search menu command by positioning a cursor, using a mouse, for example, over the search menu command 1505 and by pressing a button or by otherwise activating or selecting a command. This causes a display of a text entry region 1507 into which a user can enter text. In the example shown in FIG. 15A, which is a portion of the display, the user has entered the text "shakeit" causing the display of a search result region immediately below a "show all" command region 1509 which is itself immediately below the text entry region 1507. It can be seen that the hits or matches are grouped into categories ("documents" and "PDF documents") shown by categories 1511 and 1513 within the search result region 1503. FIG. 15B shows another example of a search. In this case, a large number of hits was obtained (392 hits), only a few of which are shown in the search result region 1503. Again, the hits are organized by categories 1511 and 1513. Each category may be restricted in terms of the number of items displayed within the search result region 1503 in order to permit the display of multiple categories at the same time within the search result region. For example, the number of hits in the documents category may greatly exceed the available display space within the search result region 1503, but the hits for this category are limited to a predetermined or dynamically determinable number of entries within the search result region 1503 for the category 1511. An additional category, "top hit" is selected based on a scoring or relevancy using techniques which are known in the art. The user may select the "show all" command 1509 causing the display of a window, such as window 1601 shown in FIG. 16A. FIG. 15C shows a display of a graphical user interface of one embodiment of the invention which includes the menu bar 1502 and the search menu command 1505 on the menu bar 1502. FIG. 15D shows another example of the search result region 1503 which appeared after a search of the term "safari" was entered into the text entry region 1507. It can be seen from the search result region 1503 of FIG. 15D that the search results are again grouped into categories. Another search result window 1520 is also shown in the user interface of FIG. 15D. It can be seen that application programs are retrieved as part of the search results, and a user may launch any one of these application programs by selecting it from the search result region, thereby causing the program to be launched.

Figure 16A:
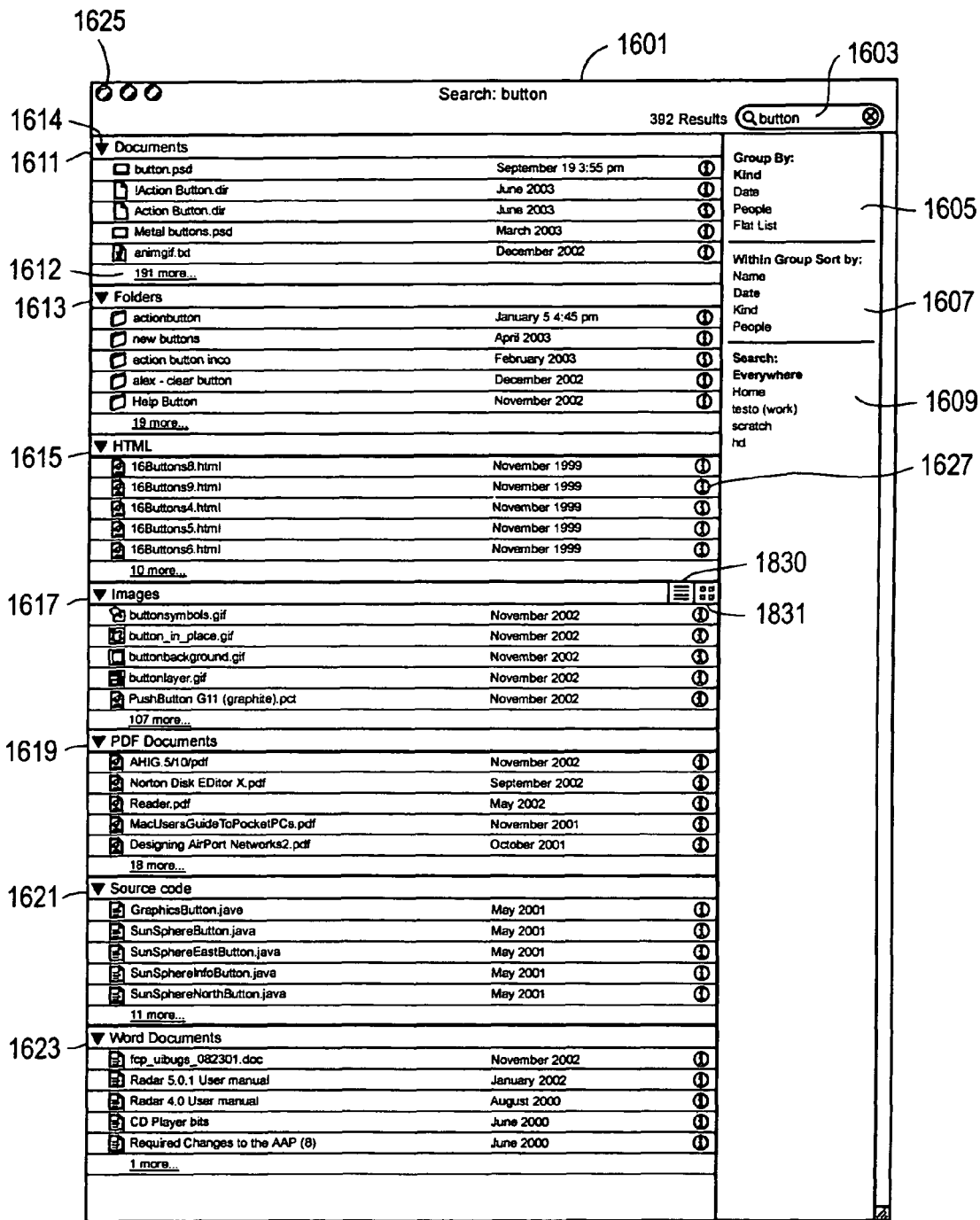
FIGS. 16A and 16B show certain aspects of embodiments of user interfaces according to the present invention.
Figure 16B:
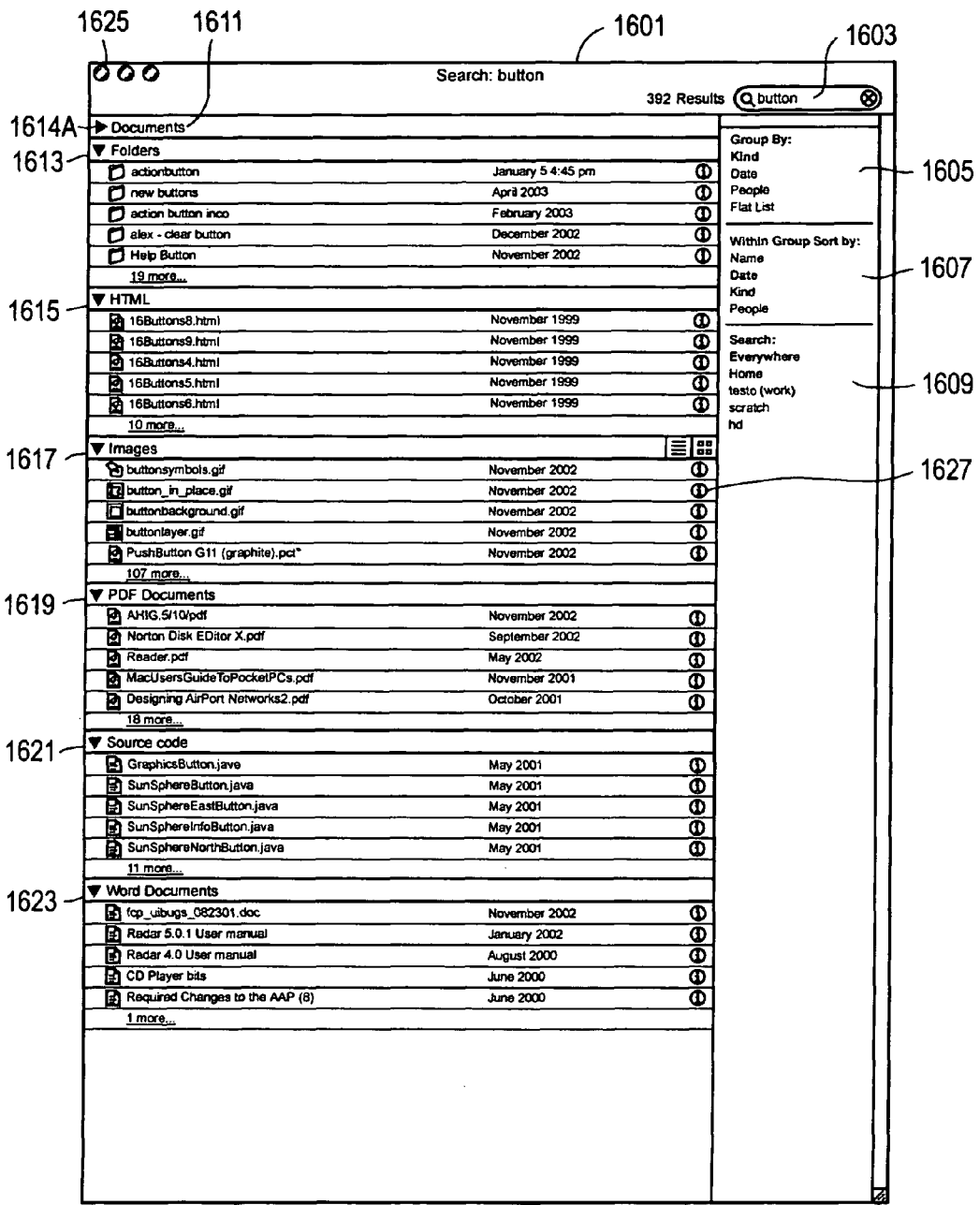
Figure 17:
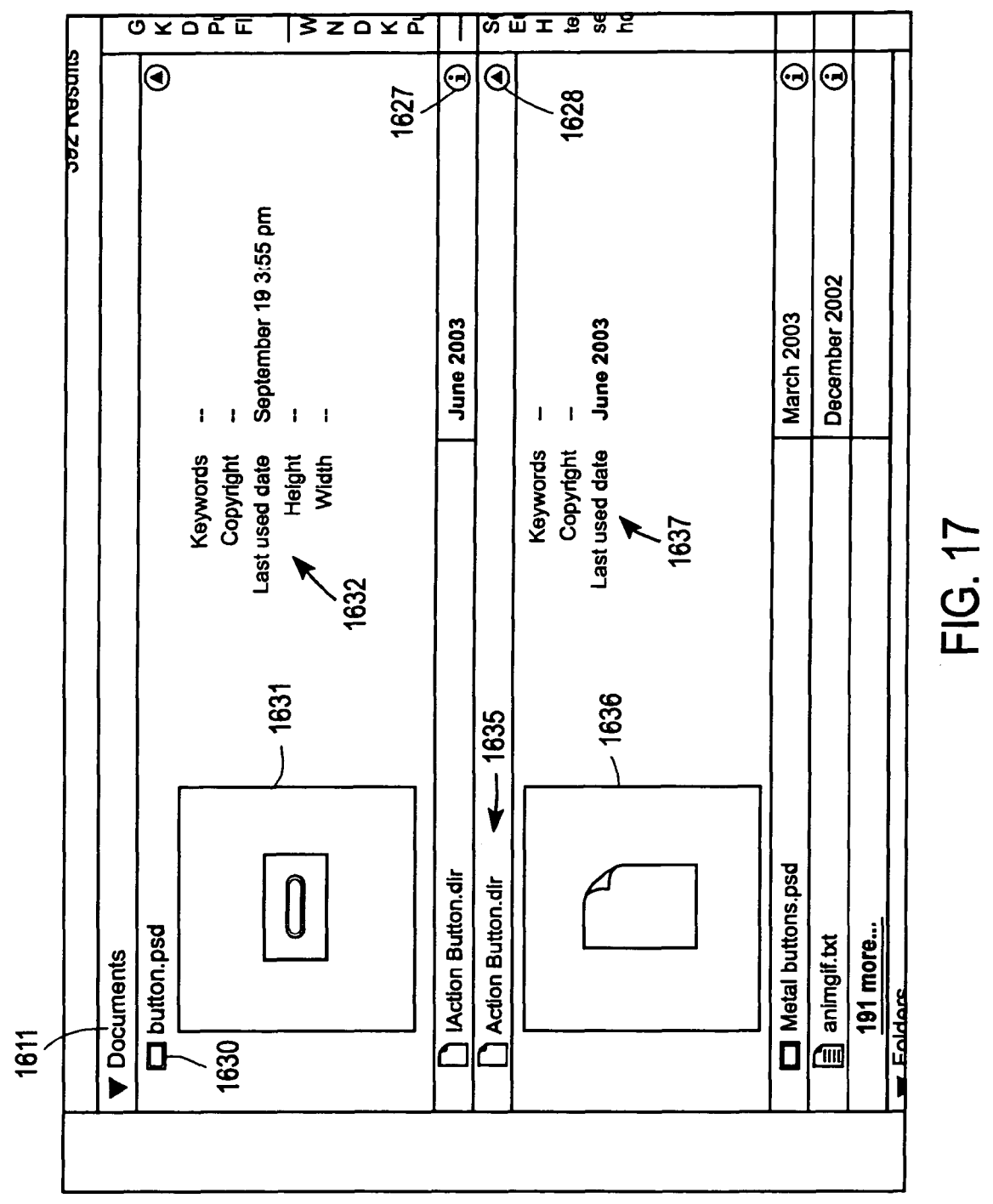

FIGS. 16A and 16B show examples of search result windows which may be caused to appear by selecting the "show all" command 1509 in FIG. 15A or 15B. Alternatively, these windows may appear as a result of the user having selected a "find" command or a some other command indicating that a search is desired. Moreover, the window 1601 shown in FIGS. 16A and 16B may appear in response to either of the selection of a show all command or the selection of a find command. The window 1601 includes a text entry region 1603, a group by menu selection region 1605, a sort by menu selection region 1607, and a where menu selection region 1609. The group by selection region 1605 allows a user to specify the manner in which the items in the search results are grouped according to. In the example shown in FIG. 16A, the user has selected the "kind" option from the group by menu selection region 1605, causing the search results to be grouped or sorted according to the kind or type of document or file. It can be seen that the type of file includes "html" files, image files, PDF files, source code files, and other types of files as shown in FIG. 16A. Each type or kind of document is separated from the other documents by being grouped within a section and separated by headers from the other sections. Thus, headers 1611, 1613, 1615, 1617, 1619, 1621, and 1623 designate each of the groups and separate one group from the other groups. This allows a user to focus on evaluating the search results according to certain types of documents. Within each group, such as the document groups or the folder groups, the user has specified that the items are to be sorted by date, because the user has selected the date option within the sort by menu region 1607. The user has also specified that all storage locations are to be searched by selecting "everywhere" from the where menu selection region 1609. Each item in the search result list includes an information button 1627 which may be selected to produce the display of additional information which may be available from the system. An example of such additional information is shown in FIG. 17 in which a user has selected the information button 1627 for item 1635, resulting in the display of an image 1636 corresponding to the item as well as additional information 1637. Similarly, the user has selected the information button for another item 1630 to produce the display of an image of the item 1631 as well as additional information 1632. The user may remove this additional information from the display by selecting the close button 1628 which causes the display of the information for item 1635 to revert to the appearance for that item shown in FIG. 16A. The user may collapse an entire group to hide the entries or search results from that group by selecting the collapse button 1614 shown in FIG. 16A, thereby causing the disappearance of the entries in this group as shown in FIG. 16B. The user may cause these items to reappear by selecting the expand button 1614A as shown in FIG. 16B to thereby revert to the display of the items as shown in FIG. 16A.

The search results user interface shown in FIGS. 16A and 16B presents only a limited number of matches or hits within each category. In the particular example of these figures, only the five top (most relevant or most highly sorted) hits are displayed. This can be seen by noticing the entry at the bottom of each list within a group which specifies how many more hits are within that group; these hits can be examined by selecting this indicator, such as indicator 1612, which causes the display of all of the items in the documents category or kind for the search for "button" which was entered into the text entry region 1603. Further examples of this behavior are described below and are shown in conjunction with FIGS. 18A and 18B. It will be appreciated that window 1601 is a closeable and resizable and moveable window and includes a close button and a resizing control 1625A.

Figure 18A:
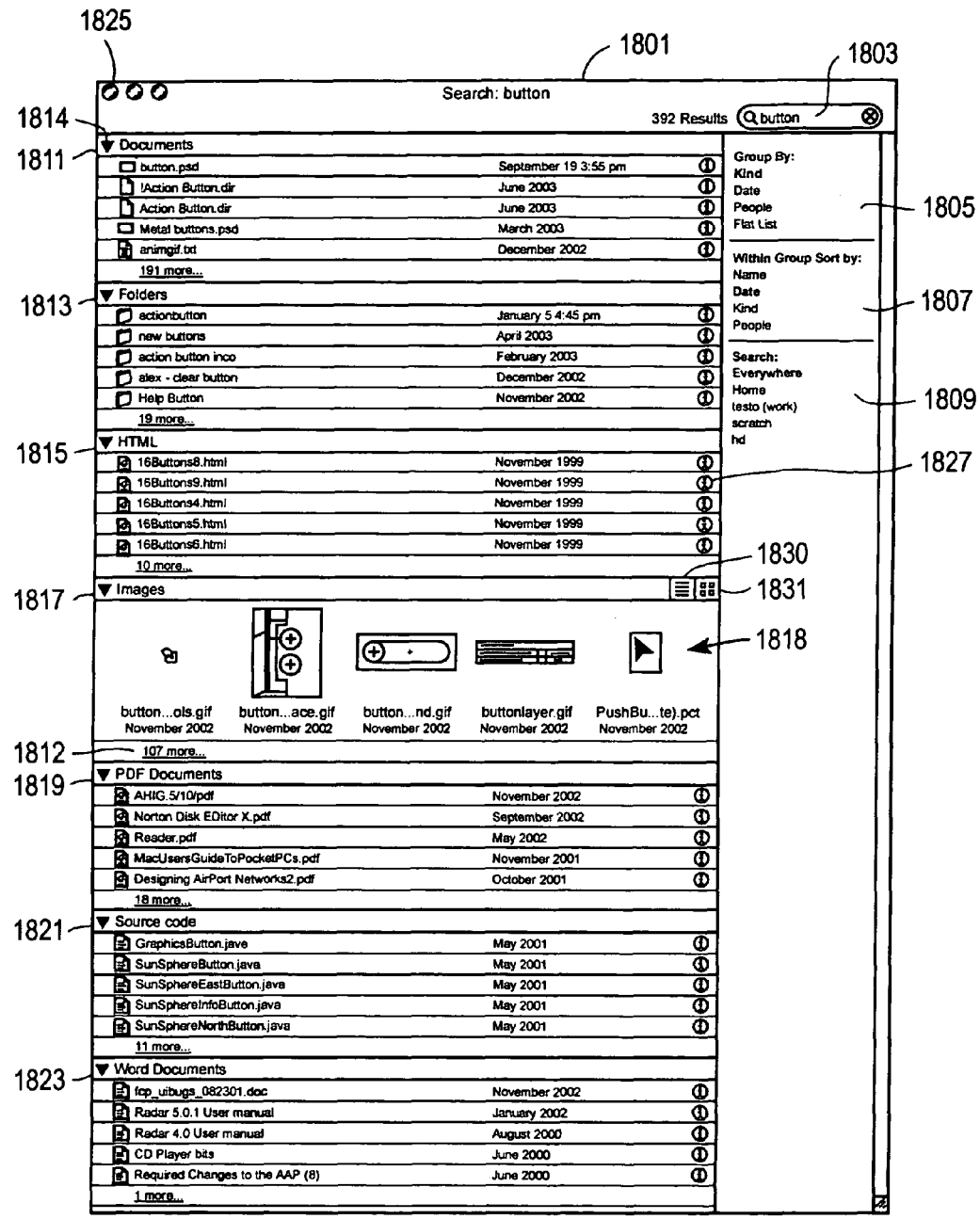
FIGS. 18A and 18B show further aspects of certain embodiments of user interfaces according to the present invention.
Figure 18B:
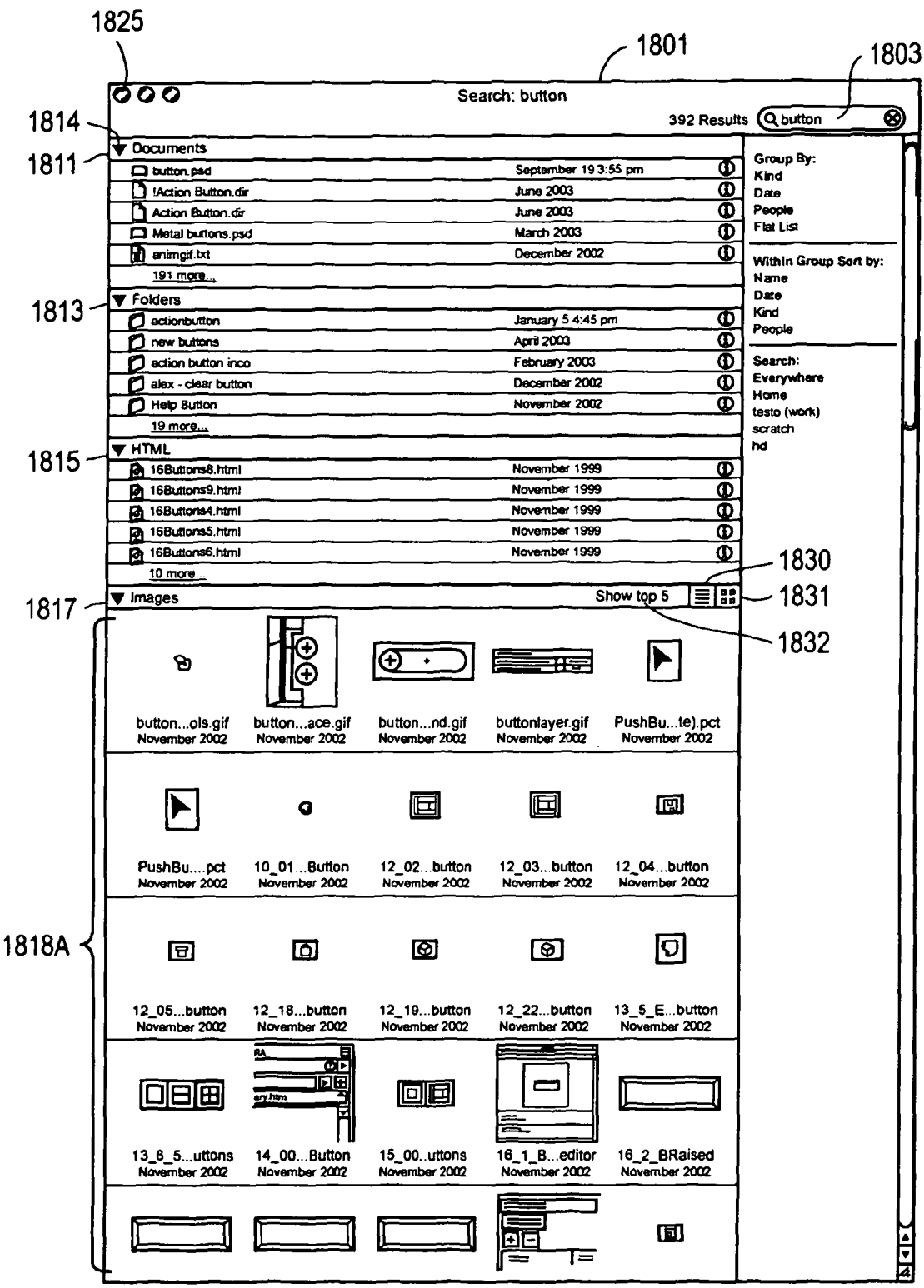

FIGS. 18A and 18B illustrate another window 1801 which is very similar to the window 1601. The window 1801 includes a text entry region 1803, a group by menu selection region 1805, a sort by menu selection region 1807, and a where menu selection region 1809, each of which function in a manner which is similar to the regions 1605, 1607, and 1609 respectively of FIG. 16A. Each item in a list view within the window 1801 includes an information button 1827, allowing a user to obtain additional information beyond that listed for each item shown in the window 1801. The window 1801 further includes headers 1811, 1813, 1815, 1817, 1819, 1821, and 1823 which separate each group of items, grouped by the type or kind of document, and sorted within each group by date, from the other groups. A collapse button 1814 is available for each of the headers. The embodiment shown in FIGS. 18A and 18B shows the ability to switch between several modes of viewing the information. For example, the user may display all of the hits within a particular group by selecting the indicator 1812 shown in FIG. 18A which results in the display of all of the images files within the window 1801 within the region 1818A. The window is scrollable, thereby allowing the user to scroll through all the images. The user can revert back to the listing of only five of the most relevant images by selecting the "show top 5" button 1832 shown in FIG. 18B. Further, the user can select between a list view or an icon view for the images portion shown in FIGS. 18A and 18B. The user may select the list view by selecting the list view button 1830 or may select the icon view by selecting the icon view button 1831. The list view for the images group is shown in FIG. 16A and the icon view for the images group is shown in FIGS. 18A and 18B. It can be seen that within a single, moveable, resizable, closeable search result window, that there are two different views (e.g. a list view and an icon view) which are concurrently shown within the window. For example, the PDF documents under the header 1819 are displayed in a list view while the images under the header 1817 are displayed in an icon view in FIGS. 18A and 18B. It can also be seen from FIGS. 18A and 18B that each image is shown with a preview which may be capable of live resizing as described in a patent application entitled "Live Content Resizing" by inventors Steve Jobs, Steve Lemay, Jessica Kahn, Sarah Wilkin, David Hyatt, Jens Alfke, Wayne Loofbourrow, and Bertrand Serlet, filed on Jun. 25, 2004, and being assigned to the assignee of the present inventions described herein, and which is hereby incorporated herein by reference.

Figure 19A:
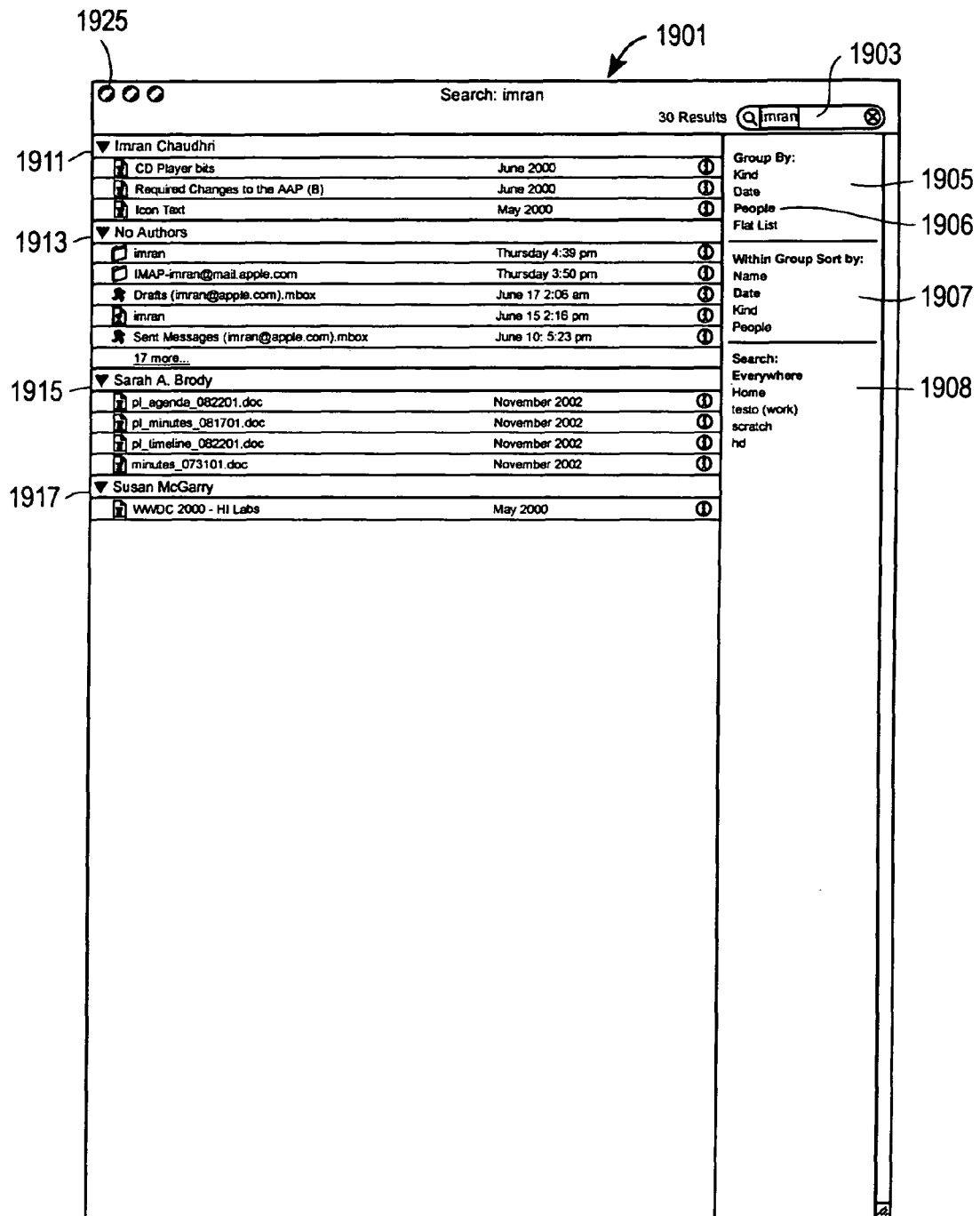
Figure 19B:
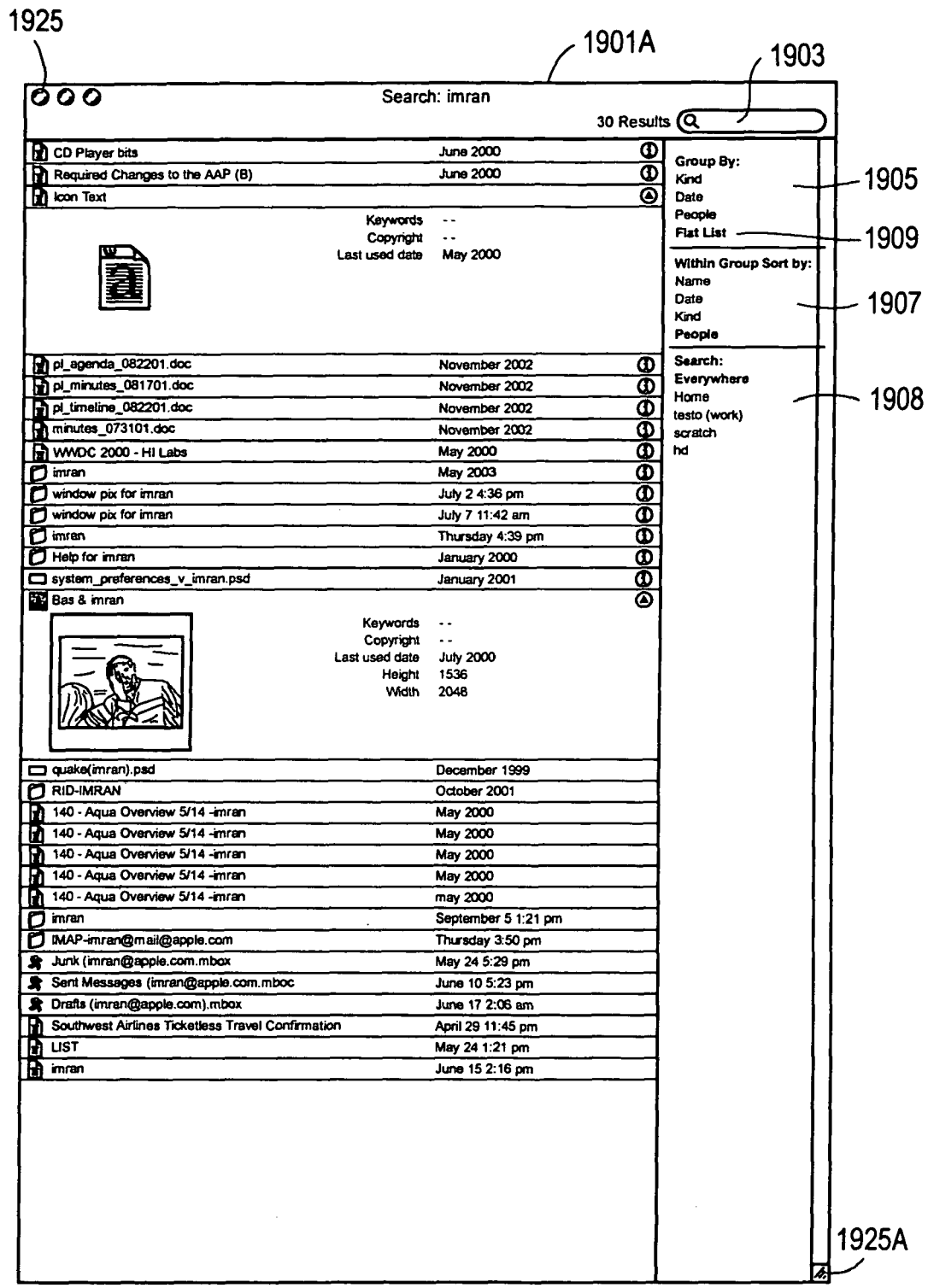

FIG. 19A shows another example of a search result window which is similar to the window 1601. The window 1901 shown in FIG. 19A includes a text entry region 1903 and a group by menu selection region 1905 and a sort by menu selection region 1907 and a where menu selection region 1908. Further, the window includes a close button 1925 and a resizing control 1925A. Text has been entered into the text entry region 1903 to produce the search results shown in the window 1901. The search results again are grouped by a category selected by a user which in this case is the people options 1906. This causes the headers 1911, 1913, 1915, and 1917 to show the separation of the groups according to names of people. Within each group, the user has selected to sort by the date of the particular file or document. The user interface shown in FIG. 19A allows a user to specify an individual's name and to group by people to look for communications between two people, for example. FIG. 19B shows another way in which a user can group a text search ("imran") in a manner which is different from that shown in FIG. 19A. In the case of FIG. 19B, the user has selected a flat list from the group by menu selection region 1905 and has selected "people" from the sort by menu region 1907. The resulting display in window 1901A is without headers and thus it appears as a flat list.

Figure 19C:
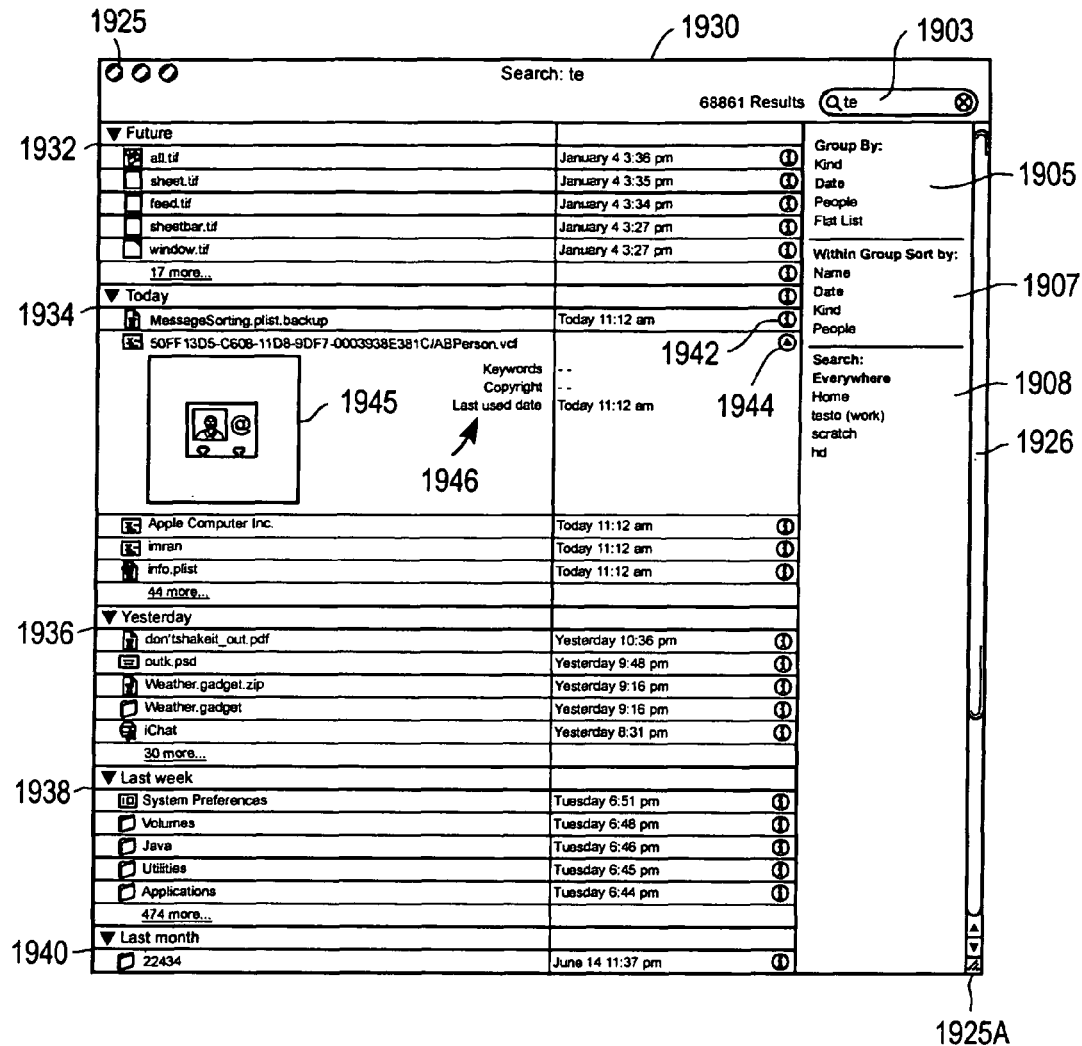

FIG. 19C shows the user interface of another search result window 1930 which includes a text entry region 1903 and the selection regions 1905, 1907, and 1908 along with a scrolling control 1926. The results shown in the window 1930 have been grouped by date and sorted within each group by date. Thus, the headers 1932, 1934, 1936, 1938, and 1940 specify time periods such as when the document was last modified (e.g. last modified today, or yesterday, or last week). Also shown within the search results window 1930 is the information button 1942 which may be selected to reveal further information, such as an icon 1945 and additional information 1946 as shown for one entry under the today group. This additional information may be removed by selecting the contraction button 1944.

Figure 19D:
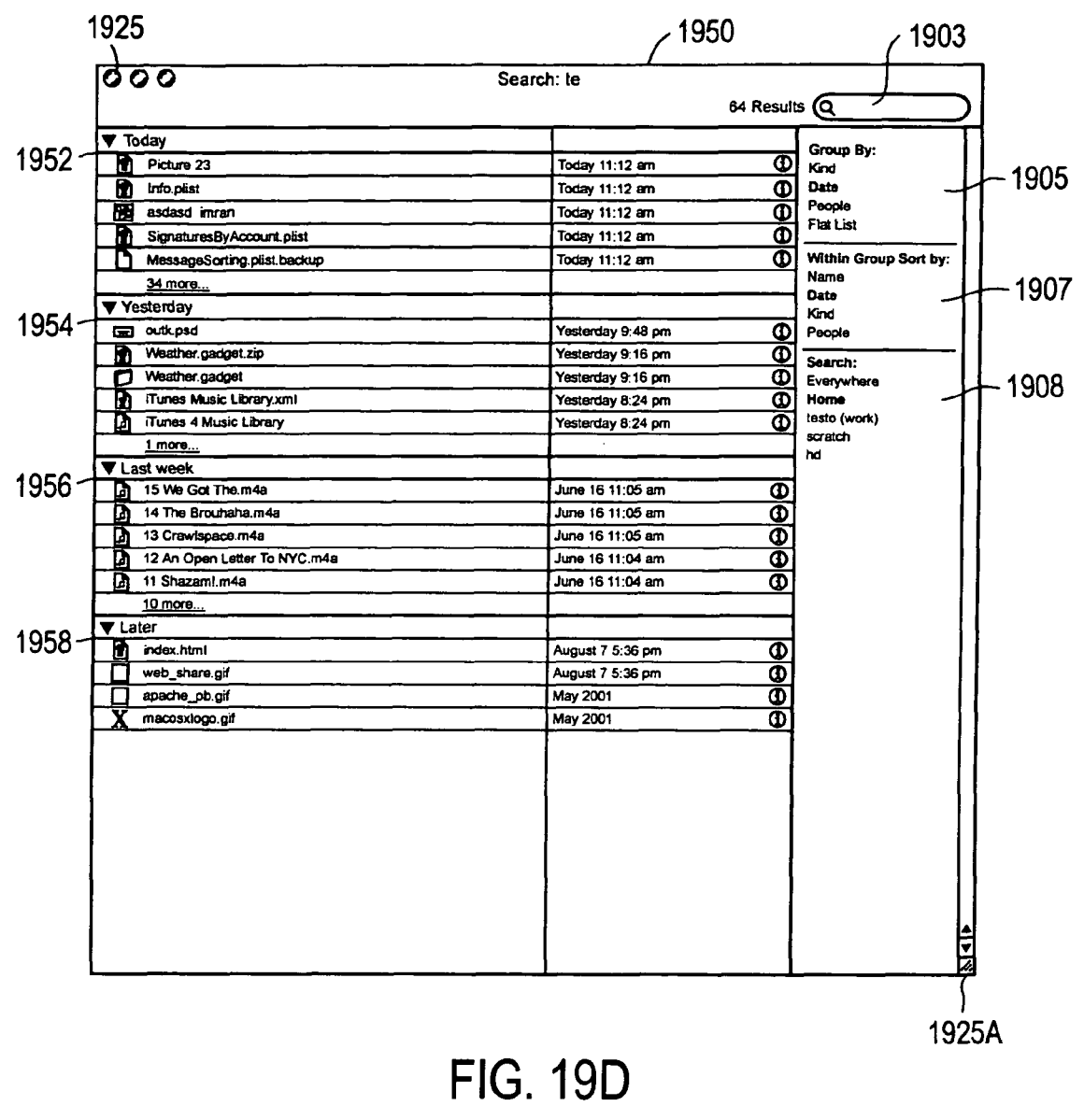

FIG. 19D shows a search result window 1950 in which a search for the text string "te" is grouped by date but the search was limited to a "home" folder as specified in the where menu selection region 1908. Time specific headers 1952, 1954, 1956, and 1958 separate items within one group from the other groups as shown in FIG. 19D.

FIG. 19E shows an alternative embodiment of a search result window. In this embodiment, the window 1970 includes elements which are similar to window 1901 such as the selection regions 1905, 1907, and a scrolling control 1926 as well as a close button 1925 and a resizing control 1925A. The search result window 1970 further includes a "when" menu selection region 1972 which allows the user to specify a search parameter based on time in addition to the text entered into the text entry region 1903. It can be seen from the example shown in FIG. 19E that the user has decided to group the search results by the category and to sort within each group by date. This results in the headers 1973, 1975, 1977, and 1979 as shown in FIG. 19E.

Figure 20:
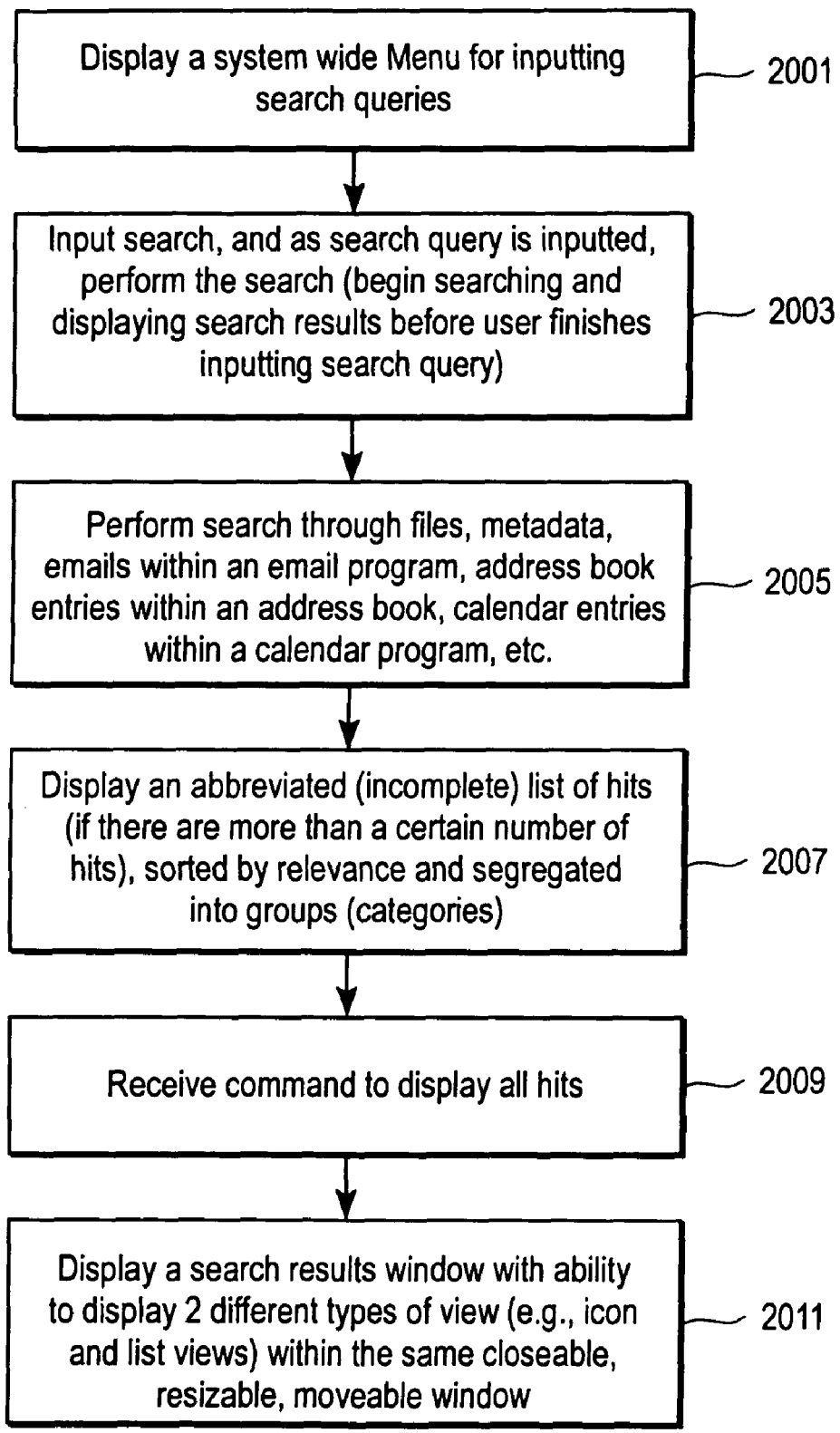
FIG. 20 is a flow chart which illustrates another exemplary method of the present invention.

FIG. 20 shows an exemplary method of operating a system wide menu for inputting search queries, such as the system wide menu available by selecting the search menu command 1505 shown in FIG. 15A or 15B, or 15C. In operation 2001, the system displays a system wide menu for inputting search queries. This may be the search menu command 1505. The user, in operation 2003, inputs a search, and as the search query is being inputted, the system begins performing and begins displaying the search results before the user finishes inputting the search query. This gives immediate feedback and input to the user as the user enters this information. The system is, in operation 2005, performing a search through files, metadata for the files, emails within an email program, address book entries within an address book program, calendar entries within a calendar program, etc. The system then, in operation 2007, displays an abbreviated (e.g. incomplete) list of hits if there are more than a certain number of hits. An example of this abbreviated listing is shown in FIG. 15B. The listing may be sorted by relevance and segregated into groups such as categories or types of documents. Then in operation 2009, the system receives a command from the user to display all the hits and in operation 2011 the system displays the search results window, such as the window 1601 shown in FIG. 16A. This window may have the ability to display two different types of views, such as an icon view and a list view within the same closeable, resizable, and moveable window. It will be appreciated that the searching, which is performed as the user is typing and the displaying of results as the user is typing may include the searching through the metadata files created from metadata extracted from files created by many different types of software programs.

Capturing Metadata and Content for an Index Database for Composite Documents

In another aspect of the invention, a data management method includes capturing metadata and non-metadata such as content from composite documents. A composite document is loosely considered in the present invention as a document having at least one subdocument (e.g. a part, a component, or an item) which differs from, usually in format, another part of the document. In effect, the document may be considered to have at least two parts, a first part which is a first document which contains another document (which may be considered the subdocument) within a container provided by the first document. The more than one subdocuments often have different file formats which are different from each other. Typical examples of composite documents are a document containing text and an image, a CAD document containing a CAD drawing and a text object, a video project containing multiple audio and video clips, an audio/video clip containing additional information about the copyright holder, an archive document containing multiple documents and directories containing multiple documents.

Figure 21:
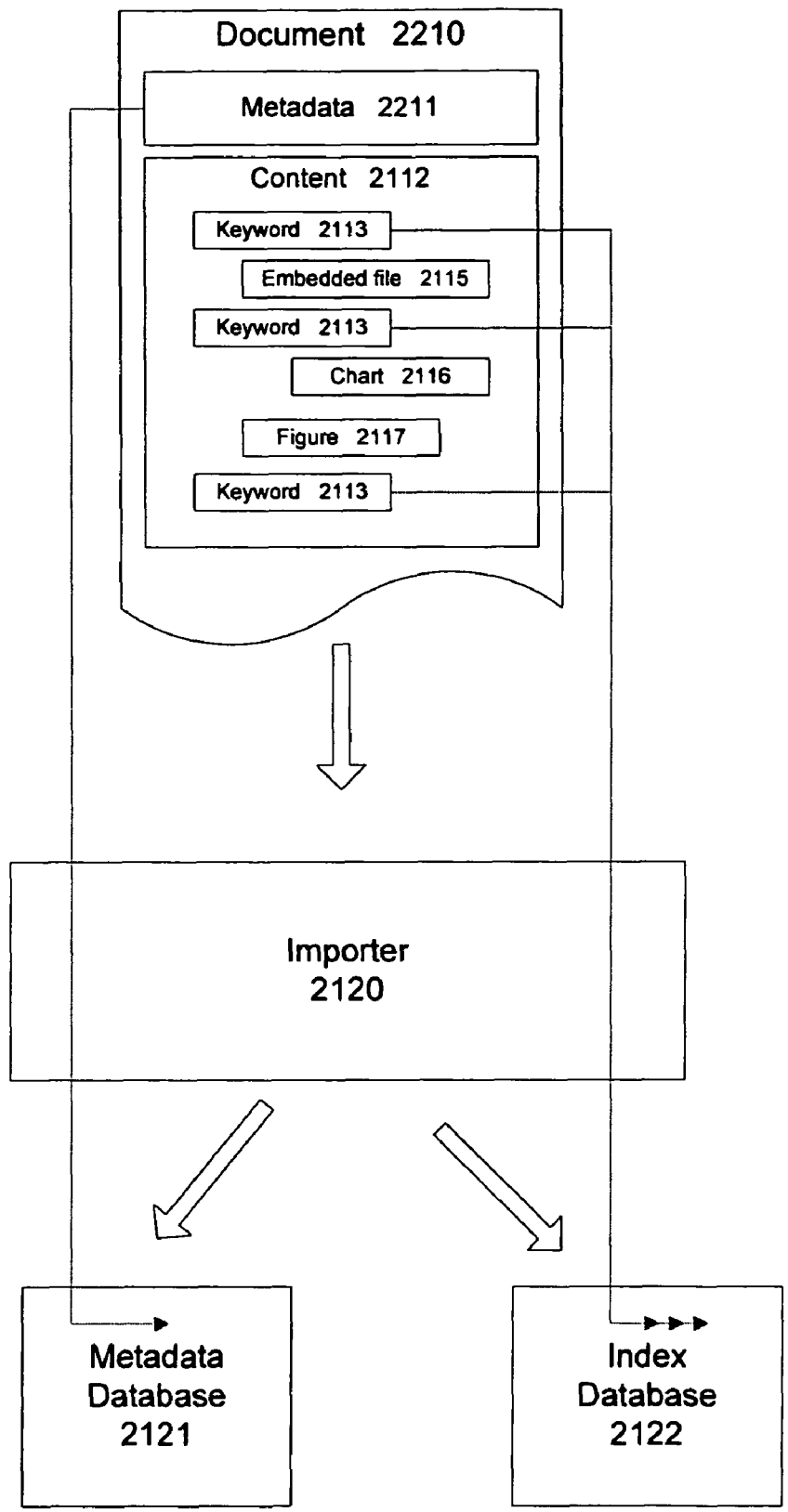
FIG. 21 shows a prior art method of capturing metadata at a single level and indexing of content at a single level.

Traditional metadata or index capturing typically addresses only one level or one type of content or data in a document. FIG. 21 shows a prior art metadata and content capturing from a document. The metadata 2111 and the content 2112 of the document 2110 is captured by an importer 2120 to a metadata database 2121 and an index database 2122, respectively. In this case, the importer 2120 handles both importing of metadata into the metadata database 2121 and capturing of content which is indexed into a full text content index database 2122. Shown in this Figure is that the metadata 2111 is within the document 2110, but the metadata 2111 can be located physically anywhere in the system with a link to the document 2110. The metadata 2111 is captured to the metadata database 2121, but other possible metadata are ignored, for example, metadata associated with the embedded file 2115, metadata associated with the chart 2116, metadata associated with the FIG. 2117, or higher embedded level metadata, such as one associated with the subdocuments of the embedded file 2115.

Further, within the content 2112 to be imported to the index database 2122, full text content and/or keywords 2113 are indexed to the index database 2122, but other possible sources of content are ignored, for example, the full text content and/or keywords associated with the embedded file 2115, the keywords associated with the chart 2116, the keywords associated with the FIG. 2117, or higher embedded level keywords, such as one associated with the subdocuments of the embedded file 2115.

An exemplary method, in an embodiment of the invention, includes capturing metadata and non-metadata (such as a content to be stored in a full text index database) successively to user-determined or system-determined or application-specified levels, preferably all levels, of subdocuments within the composite document. In one aspect, the method of data managing comprises the successive breakdown of a composite document into relevant atomic subdocuments, and metadata and non-metadata can be extracted from the atomic subdocuments before combining together the extracted information to form the metadata of the composite document. The subdocument metadata and non-metadata may be linked to their parent document and also to their children subdocuments to allow, e.g., a search operation to locate all document associations.

Figure 22A:
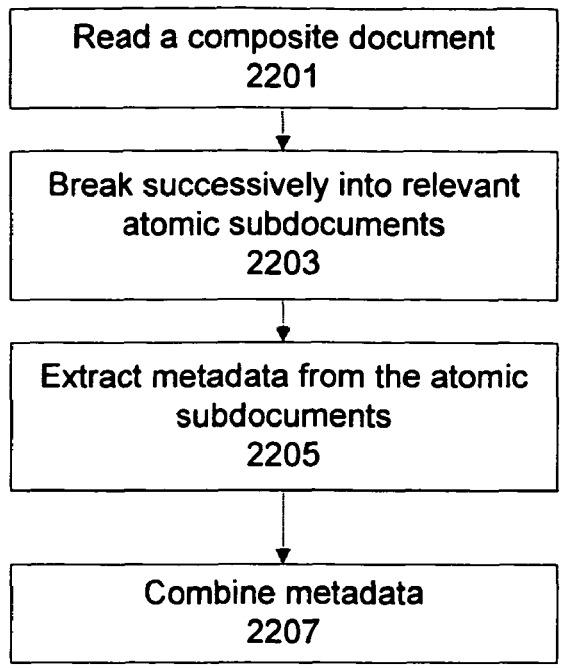
FIGS. 22A and 22B show an embodiment of the present invention for metadata capturing and indexing content, respectively.
Figure 22B:
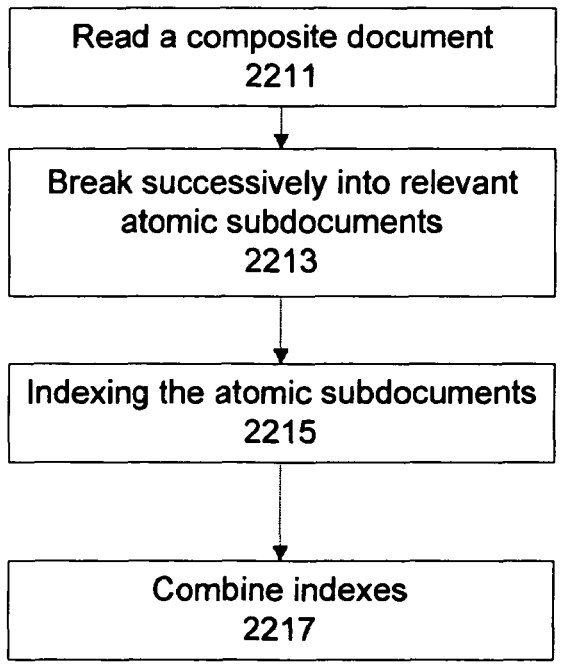

FIGS. 22A and 22B show generalized examples of one embodiment of the present invention with FIG. 22A showing a capture of metadata from a composite document and FIG. 22B showing an indexing of a composite document. The method of FIG. 22A may begin in operation 2201 in which a composite document is accessed. This access may occur as a result of a first software process (e.g. a process of an operating system's kernel or other process of the operating system) alerting or notifying a second software process (e.g. a process of a metadata processing software) that a new document has been created or that an existing document has been modified. In response to the alert or notification, the second software process, in one embodiment, performs operations 2201, 2203, 2205, and 2207. The composite document is then successively broken into relevant subdocuments of a plurality of levels of depth in operation 2203. The metadata is then extracted from the subdocuments in operation 2205, and the metadata from those subdocuments are combined to form the metadata of the composite document in operation 2207. The metadata may be stored independently with or without a link to metadata from the container or parent document, or may be added to the parent or container document metadata.

Similarly, for non-metadata such as content which is to be added to an indexed full text content database, the method of FIG. 22B may begin in operation 2211 in which a composite document is accessed. The composite document is then successively broken into relevant subdocuments of a plurality of levels of depth in operation 2213. The subdocuments are then indexed individually in operation 2215, and the indexed contents from each of the subdocuments are combined to form the indexed content of the composite document in operation 2217.

Figure 23:
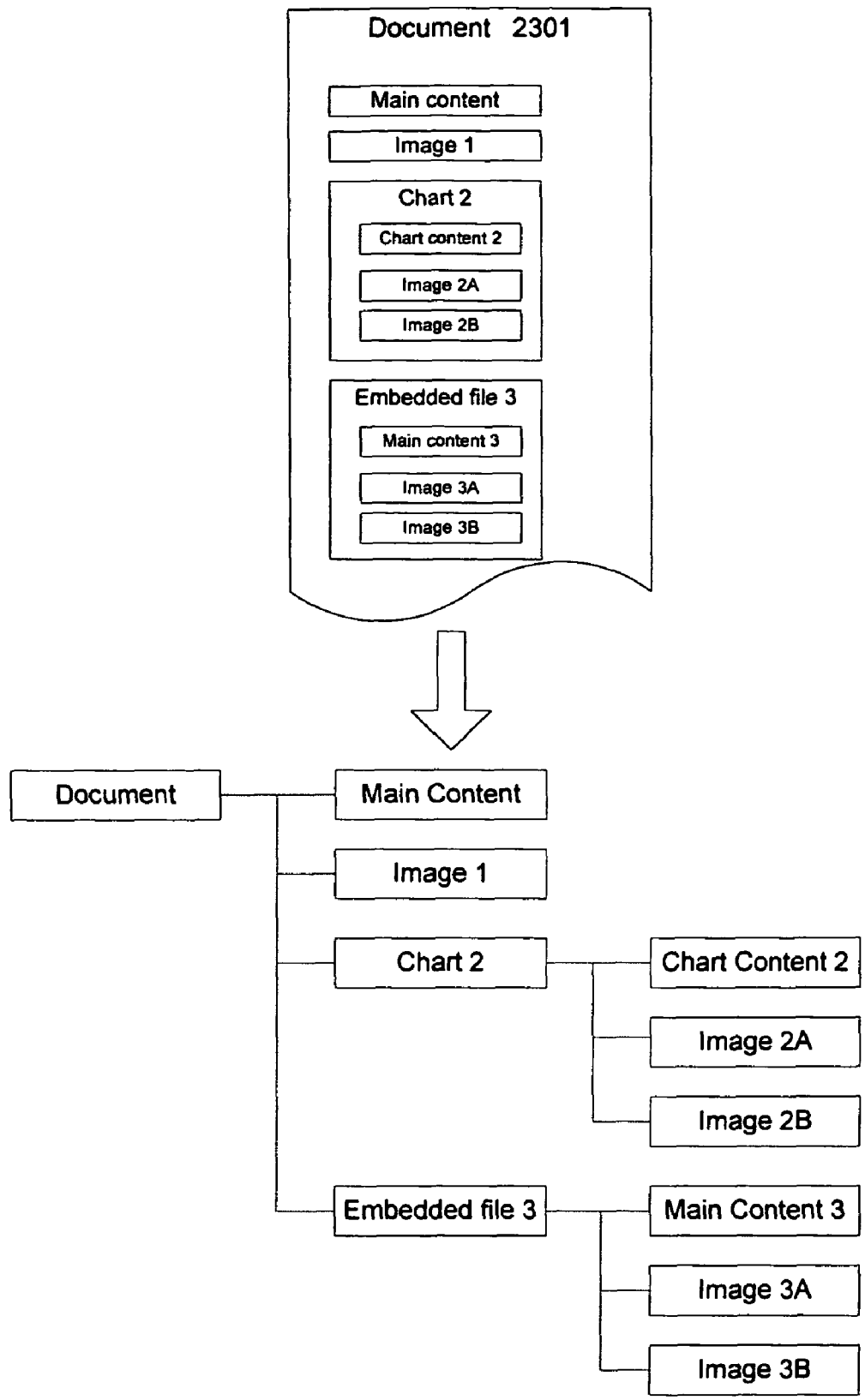
FIG. 23 illustrates a three nested level composite document according to an embodiment of the present invention.

FIG. 23 shows an embodiment including a composite document having three levels of nested documents. The composite document comprises various subdocuments including a subdocument of main content, a subdocument of image 1, a subdocument of chart 2 and a subdocument of embedded file 3. The subdocument chart 2 further has another level of subdocuments, including a chart content 2, an image 2A, and an image 2B. The subdocument embedded file 3 also has a second level of subdocuments, including a main content 3, an image 3A and an image 3B. A method of successively capturing metadata and non-metadata according to one embodiment of the invention provides the capturing of information to the last level of embedded subdocuments, including the top level of the document, the first level of subdocuments of the Main content, Image 1, Chart 2, and Embedded file 3, and the second level of subdocuments of the Chart content 2, Image 2A and Image 2B of parent document Chart 2, the Main content 3, Image 3A and Image 3B of parent document Embedded file 3. In an alternative embodiment, information from less than all levels may be captured (e.g. certain levels may be filtered and hence not captured as they are deemed to be not interesting). The subitems (e.g. items of subdocuments) are preferably identified with an association to a parent document or children documents. The capturing of metadata and non-metadata (such as content to be added to a full text index database) may be stored in a hierarchical structure to preserve the hierarchical information of the composite document. The captured metadata is preferably stored in a metadata database, and the captured non-metadata (e.g. index) is preferably stored in a non-metadata (e.g. index) database. Information of all levels of the composite document are captured, thus the metadata and non-metadata databases represent a complete picture of the composite document, permitting proper managing and searching of the data files.

Figure 24:
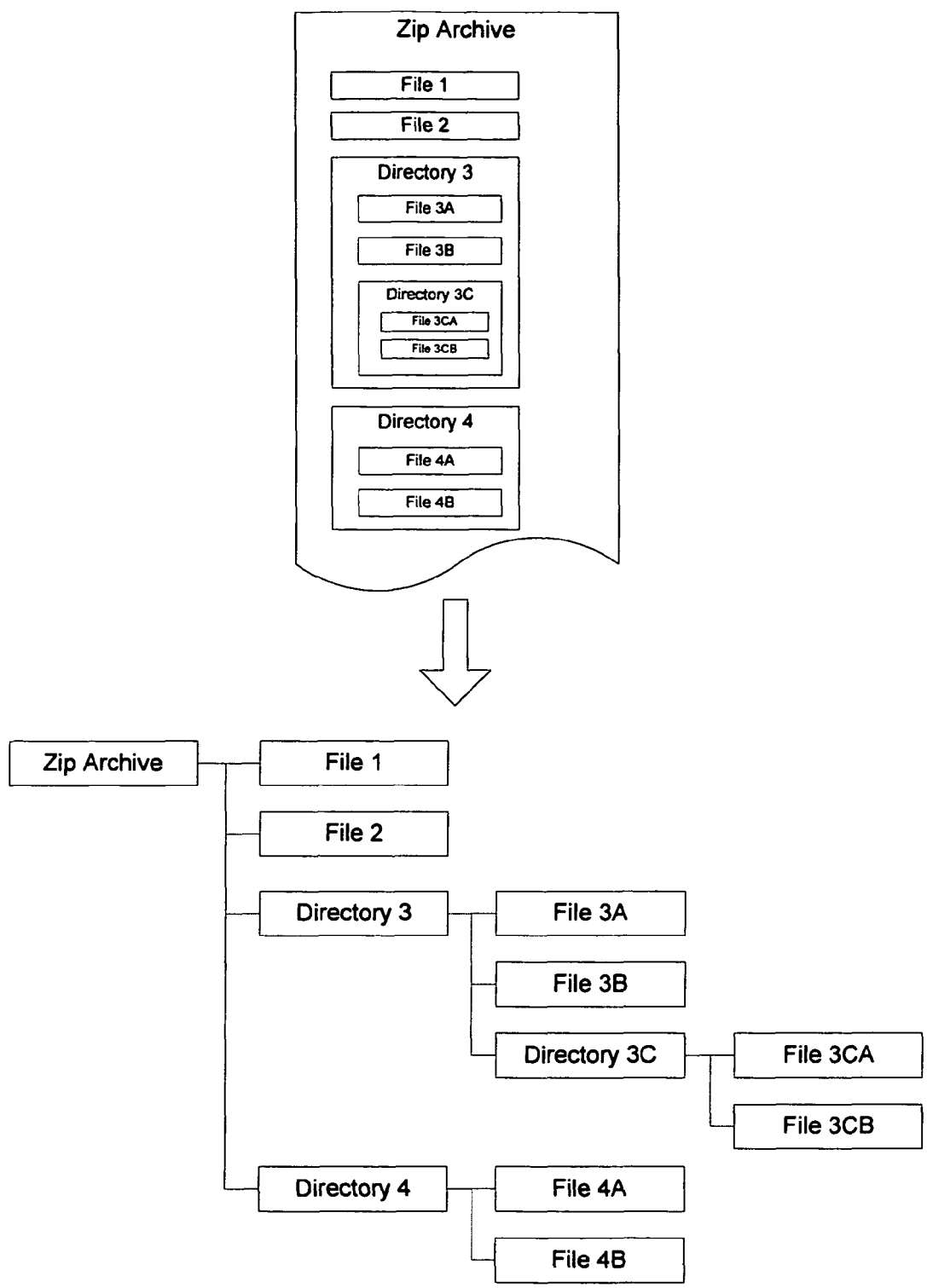
FIG. 24 illustrates a four nested level composite document according to an embodiment of the present invention.

FIG. 24 shows another embodiment including a zip archive composite document having four levels of nested documents. The zip archive comprises File 1, File 2, and Directory 3 and Directory 4. Directory 3 and Directory 4 comprise File 3A, File 3B, Directory 3C and File 4A, File 4B, respectively. Directory 3C further comprises Files 3CA and 3CB. The nested metadata capturing of the present invention allows the capturing of metadata in all four nested levels, permitting a coherent and coordinated managing of files. For examples, a search for File 3CB can deliver the document zip archive, or a deletion of File 3CA can prompt a notification of what to do with a copy of File 3CA in document zip archive.

In another aspect, the present invention distinguishes between interesting or relevant objects (e.g. subdocuments) from non-interesting or irrelevant objects. For example, a Keynote or PowerPoint presentation may contain text and images that are either part of the user's message (relevant content), or part of the presentation graphical theme such as the company logo or the company trademarked branding (irrelevant content) or even a graphical background. Often the relevancy of an object is very subjective, depending on the occasion, or depending on the target audience. The present invention provides an exemplary guideline for relevancy determination, which can be adjusted and reviewed in many situations for best performance. One criterion for relevancy determination is based on the usage or location of the object on the document. For example, if an object is used repeatedly throughout the presentation, existing in every slide of a PowerPoint presentation, it is likely that the object representing a company logo, or a presentation graphical theme, and thus is likely irrelevant, e.g. the content of the object is not interesting to most audiences. Another example is that if an object is located in a far corner (e.g. a page number in the far bottom right corner), it is likely not interesting.

The present invention, in an exemplary method, employs relevancy criterion to determine the relevancy of the subdocuments, and preferably to rank the subdocuments according to certain relevancy criterion with a certain cutoff criterion. The relevancy determination helps in eliminating non-interesting objects, stopping the collection of metadata or the indexing of non-interesting sections, resulting in a less clustered database and therefore a faster search process.

Figure 25:
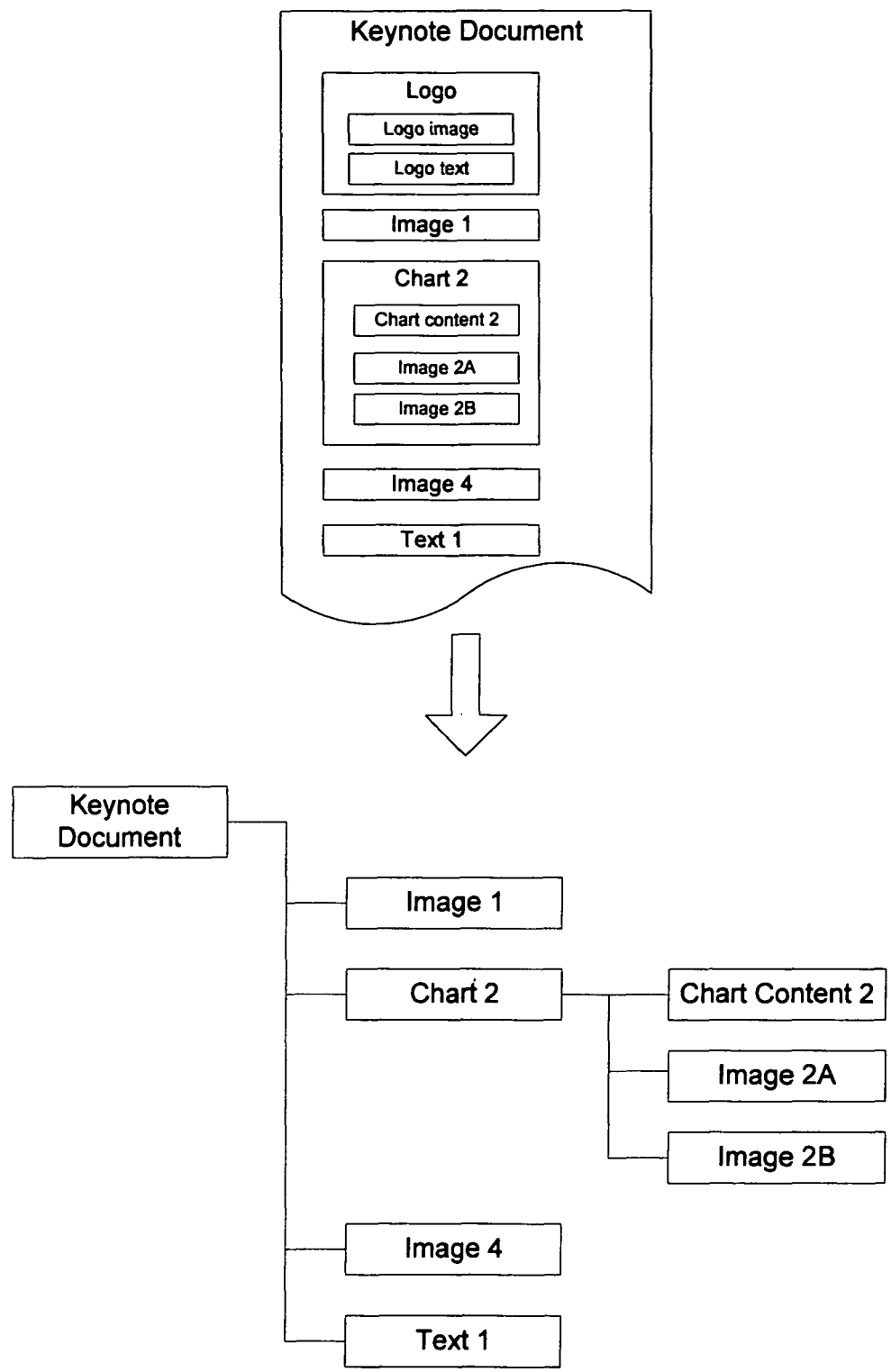
FIG. 25 illustrates a relevancy aspect for a composite document according to an embodiment of the present invention.

FIG. 25 shows an embodiment including a keynote document having an non-interesting subdocument of a company logo with image and text. Once the object is marked irrelevant, the capturing program skips that object and moves on to the next object. The resulting metadata or index will not contain this information in this example.

In one aspect, the present invention employs importers, such as plug-in importers, to read and interpret the different parts of a composite document. The importer can determine if the composite document contains any subdocuments (e.g. parts, components, objects). An importer may further comprise a relevancy process to determine the relevant subdocuments. After the identification of relevant subdocuments in a document, an importer can put the subdocument in a standard format based on their type, allowing them to be in turn imported.

The subdocuments are often in different, proprietary formats which differ from the parent document. In an embodiment, the present invention provides the invoking of several different appropriate importers for the subdocuments to read and extract information from the proprietary coded subdocuments. The calling of appropriate importers for the subdocuments is made as part of a process of an exemplary embodiment shown in FIG. 26.

Figure 26:
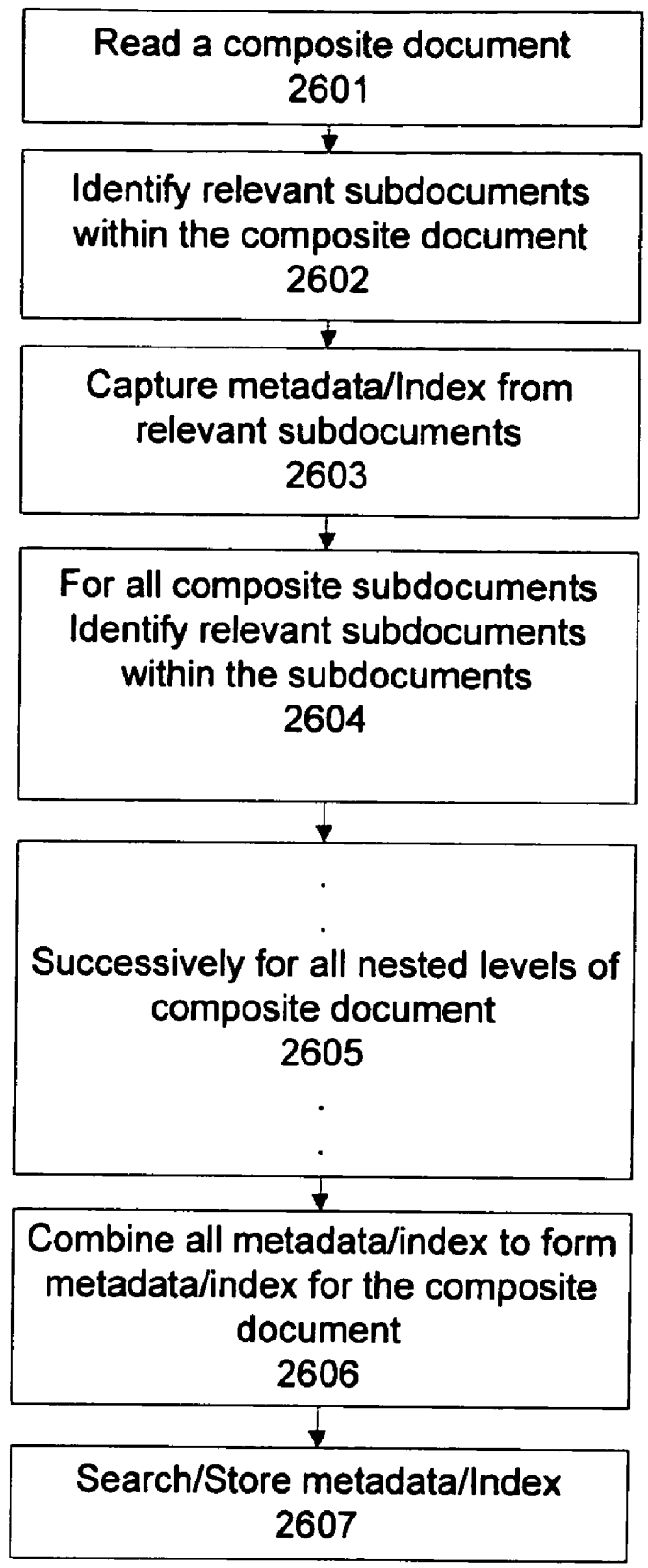
FIG. 26 shows the successive breakdown of a composite document into relevant atomic subdocuments in one aspect of the present invention.

FIG. 26 shows a generalized example of one embodiment of the present invention. In this example, the capturing metadata/index (non-metadata) occurs successively for all nested levels (or at least a plurality of levels in certain embodiments) of the composite document. The method of FIG. 26 may begin in operation 2601 in which a composite document is accessed. This composite document is made available in operation 2602 to identify all relevant subdocuments within the composite document. The metadata and index are captured from the relevant non-composite subdocuments in operation 2603 and the relevant composite subdocuments are subjected to an identification of nested subdocuments in operation 2604. The process continues successively for all nested levels of the composite document, as shown in operation 2605. After the innermost level of subdocuments, all metadata/index are combined to form a composite metadata/index for the composite document in operation 2606. The metadata/index are then stored for future searching (or immediate searching) in operation 2607.

Figure 27:
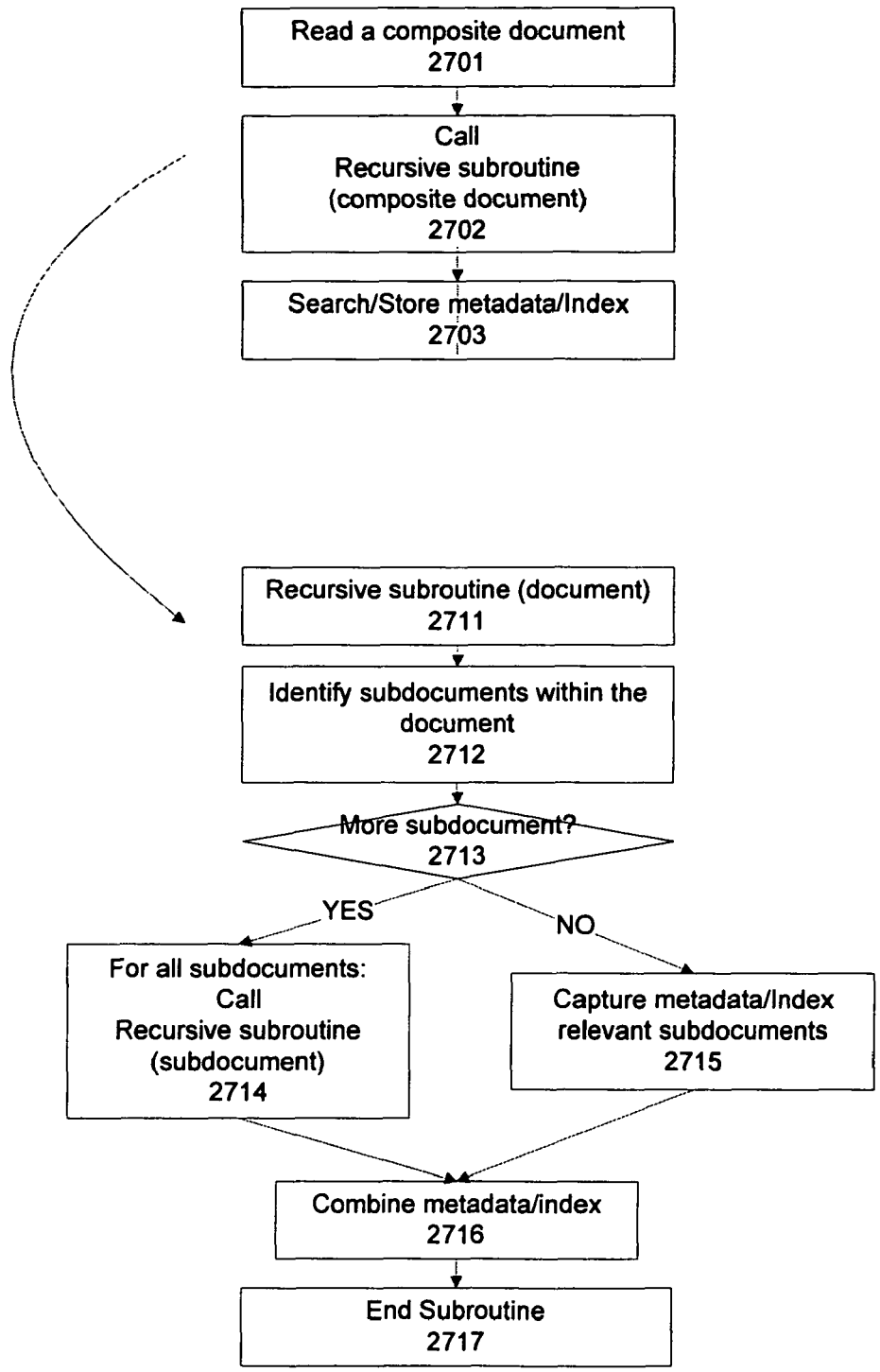
FIG. 27 shows an embodiment of a recursive breakdown of a composite document into relevant atomic subdocuments.

FIG. 27 shows a generalized example of a recursive process for the successive un-nesting of the nested subdocument levels of a composite document. The method of FIG. 27 may begin in operation 2701 in which a composited document is accessed. This composite document is made available in operation 2702 to a recursive subroutine to identify all relevant subdocuments within the composite document. When the subroutine completes, it returns the composite metadata/index. The metadata/index are then stored or searched in operation 2703. A generalized example of a recursive routine is shows with a document argument in the operation 2711. This document argument is made available in operation 2712 to identify all relevant subdocuments in one level of the argument document. Each subdocuments are then checked to see if itself is a composite document in operation 2713. If it is, then the recursive subroutine is called again in operation 2714, this time using the composite subdocument as the argument document. If it is not, then the document is a non-composite document, and metadata/index can be captured from this document, operation 2715. The subroutine passes to operation 2716 where the captured metadata/index are combined or linked (to parent or to children). The subroutine is end, and the metadata/index is returned in operation 2717.

As discussed above, the capturing of metadata or index content can occur when there is a change in the data file, such as file modification, file deletion, file creation, or file import. The capturing can occur in response to a notification of file change, coming from the OS kernel or from any software programs.

In an embodiment, as a file changes, a software component responsible for managing data files is notified, and invokes the appropriate importer for the container document, which knows how to read the file and interpret its structure. The importer therefore can determine if the document contains any components such as subdocuments. Further, if the document does contain subdocuments, the importer can determine which components are interesting, preferably based on their usage or location on the document. The importer then classifies the interesting components in formats based on their type, and then calls appropriate importers based on the type of subdocument to import the components. This process may be a recursive process, allowing the building of an arbitrarily deep and detailed hierarchy of components. As the importer imports a component of a document, it receives the extracted metadata, and then can decide to use that metadata or to add to the metadata of the parent document. The importer can also index the content (e.g. full text content of words) of the component as a sub-item of the parent document. In certain embodiments, the set of importers may interact by preparing a subpart for a format for processing by another importer. For example, an importer "A" for the parent/container document (e.g. the parent document is a Microsoft Word ".doc" file and the importer "A" is an importer for Microsoft Word ".doc" type files) is called to import metadata from the document and determines that the document has at least a subpart in a different format (e.g. a PDF format). In response, importer "A" extracts this embedded subpart from the format of "A" (".doc" format, in this example) for the type of embedded subpart so that the importer B does not know that the data it is importing was embedded in the parent/container document.

In another aspect of the invention, the composite metadata and index can be searched. In one embodiment, this search may occur concurrently or hierarchically for all the metadata/index with different levels of the composite documents. In one implementation of this method, a single search interface may be provided to search all of the nested metadata/index for all of the nested subdocuments within the composite document, thereby allowing a single search to search through all of the nested metadata/index embedded within the composite documents. Further, the single search may also search through the metadata, the indexed content, and other non-metadata and non-indexed content of the composite data files.

In another aspect of the invention, the maintaining of composite metadata and index allows a proper management of the index and the document database. In an embodiment, the subitems (i.e. the items associated with subdocuments) are identified and associated with parent documents, and vice versa, thus it is possible for a given item to search and locate all its subitems, and for a given subitem to search and locate its parent items. This capability permits proper data management, especially with linked or embedded documents. For examples, certain subitems can be deleted when the parent component is deleted or changed, or the subitems can be properly presented as such in the user interface.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a data processing system, comprising:
receiving a composite document;
breaking the composite document into multiple subdocuments of a plurality levels of depth, the subdocuments having different file types;
individually indexing the content of the multiple subdocuments and adding the content to an indexed database;
capturing metadata from the multiple subdocuments, wherein the metadata describes the content of the subdocuments and independently storing the metadata of the subdocuments into a metadata database; and,
searching the stored metadata using a search query, wherein the search is performed as the search query is being received.

2. The method of claim 1 wherein the method is a recursive process.

3. The method of claim 1 wherein the capturing of metadata is performed by a plurality of importer programs, each tailored for at least one particular file format.

4. The method of claim 1 wherein the metadata of the composite document forms a hierarchical structure.

5. The method of claim 1 wherein the capturing of metadata is performed for relevant subdocuments, wherein relevant subdocuments are specified by at least one of a position of a relevant subdocument in a presentation of the composite document and a frequency of occurrence of the relevant subdocument in the composite document.

6. The method of claim 1 wherein a first importer captures metadata from one portion of the composite document and a second importer captures metadata from another portion of the composite document, and wherein metadata is captured from a plurality of nested levels of subdocuments.

7. The method of claim 1 further comprising:
receiving a notification from an operating system element that a document has changed or been created or been deleted, and wherein the capturing is in response to the receiving of the notification.

8. The method of claim 1 further comprising:
determining a type of a subdocument having metadata and, in response to determining the type,
selecting a first software element from a group of software elements, wherein the first software element performs said capturing from the subdocument and a second software element, from the group, captures metadata from at least one portion of the composite document other than the subdocument.

9. A non-transitory machine readable storage medium containing executable program instructions for causing a data processing system to perform a method of managing data, the method comprising:
receiving a composite document;
breaking the composite document into multiple subdocuments of a plurality levels of depth, the subdocuments having different file types;

individually indexing the content of the multiple subdocuments and adding the content to an indexed database;

capturing metadata from the multiple subdocuments, wherein the metadata describes the content of the subdocuments and independently storing the metadata of the subdocuments into a metadata database; and searching the stored metadata using a search query, wherein the search is performed as the search query is being received.

10. The non-transitory machine readable storage medium of claim 9 wherein the method is a recursive process.

11. The non-transitory machine readable storage medium of claim 9 wherein the capturing of metadata is performed by a plurality of importer programs, each tailored for at least one particular file format.

12. The non-transitory machine readable storage medium of claim 9 wherein the metadata of the composite document forms a hierarchical structure.

13. The non-transitory machine readable storage medium of claim 9 wherein the capturing of metadata is performed for relevant subdocuments, wherein relevant subdocuments are specified by at least one of a position of a relevant subdocument in a presentation of the composite document and a frequency of occurrence of the relevant subdocument in the composite document.

14. The non-transitory machine readable storage medium of claim 9 wherein a first importer captures metadata from one portion of the composite document and a second importer captures metadata from another portion of the composite document, and wherein metadata is captured from a plurality of nested levels of subdocuments.

15. The non-transitory machine readable storage medium of claim 9 further comprising:

receiving a notification from an operating system element that a document has changed or been created or been deleted, and wherein the capturing is in response to the receiving of the notification.

16. The non-transitory machine readable storage medium of claim 9 further comprising:

determining a type of a subdocument having metadata and, in response to determining the type, selecting a first software element from a group of software elements, wherein the first software element performs said capturing from the subdocument and a second software element from the group captures metadata from at least one portion of the composite document other than the subdocument.

17. A data processing system comprising:

means for receiving a composite document;

means for breaking the composite document into multiple subdocuments of a plurality levels of depth, the subdocuments having different file types;

means for capturing metadata from the multiple subdocuments, wherein the metadata describes the content of the subdocuments and independently storing the metadata of the subdocuments into a metadata database; and means for searching the stored metadata using a search query, wherein the search is performed as the search query is being received.

18. The system of claim 17 wherein the method is a recursive process.

19. The system of claim 17 wherein the capturing of metadata is performed by a plurality of importer programs, each tailored for at least one particular file format.

20. The system of claim 17 wherein the metadata of the composite document forms a hierarchical structure.

21. The system of claim 17 wherein the capturing of metadata is performed for relevant subdocuments, wherein relevant subdocuments are specified by at least one of a position of a relevant subdocument in a presentation of the composite document and a frequency of occurrence of the relevant subdocument in the composite document.

22. The system of claim 17 wherein a first importer captures metadata from one portion of the composite document and a second importer captures metadata from another portion of the composite document, and wherein metadata is captured from a plurality of nested levels of subdocuments.

23. The system of claim 17 further comprising:

means for receiving a notification from an operating system element that a document has changed or been created or been deleted, and wherein the capturing is in response to the receiving of the notification.

24. The system of claim 17 further comprising:

determining a type of a subdocument having metadata and, in response to determining the type, selecting a first software element from a group of software elements, wherein the first software element performs said capturing from the subdocument and a second software element from the group captures metadata from at least one portion of the composite document other than the subdocument.

25. The method of claim 1, wherein capturing metadata from the subdocuments comprises:

extracting one of the subdocuments into a temporary file with a first type, wherein the composite document has a second type different from the first type;

selecting a metadata importer based on the first type; and capturing the metadata from the temporary file using the selected metadata importer.

26. The non-transitory machine readable storage medium of claim 9, wherein capturing metadata from the subdocuments comprises:

extracting one of the subdocuments into a temporary file with a first type, wherein the composite document has a second type different from the first type;

selecting a metadata importer based on the first type; and capturing the metadata from the temporary file using the selected metadata importer.

27. The system of claim 17, wherein capturing metadata from the subdocuments comprises:

means for extracting one of the subdocuments into a temporary file with a first type, wherein the composite document has a second type different from the first type;

means for selecting a metadata importer based on the first type; and means for capturing the metadata from the temporary file using the selected metadata importer.

28. The method of claim 1, further comprising:

receiving a command to delete a file;

determining that one of the subdocuments of the composite document is a copy of the file to be deleted;

performing a predetermined action in response to the determining.

29. The method of claim 28, wherein the predetermined action is one of notifying a user about the subdocument and deleting the one subdocument from the composite document.

30. The non-transitory machine readable storage medium of claim 9, further comprising:

receiving a command to delete a file;

determining that one of the subdocuments of the composite document is a copy of the file to be deleted;

performing a predetermined action in response to the determining.

31. The method of claim 30, wherein the predetermined action is one of notifying a user about the one subdocument and deleting the subdocument from the composite document.

32. The system of claim 17, further comprising:
means for receiving a command to delete a file;
means for determining that one of the subdocuments of the composite document is a copy of the file to be deleted;
means for performing a predetermined action in response to the determining.

33. The method of claim 32, wherein the predetermined action is one of notifying a user about the one subdocument and deleting the one subdocument from the composite document.

34. The method of claim 1 wherein the searching is begun concurrently as the search query is entered and before entry of the search query is completed.

35. The non-transitory machine readable storage medium of claim 9 wherein the searching is begun concurrently as the search query is entered and before entry of the search query is completed.

36. The system of claim 17 wherein the searching is begun concurrently as the search query is entered and before entry of the search query is completed.

* * * * *